(12) United States Patent　　　　(10) Patent No.: US 12,646,086 B2

Colalillo et al.　　　　　　　　　　(45) Date of Patent: Jun. 2, 2026

(54) METHODS, SYSTEMS, ARTICLES OF MANUFACTURE, AND APPARATUS TO DETECT PROMOTION EVENTS

(71) Applicant: Nielsen Consumer LLC, Chicago, IL (US)

(72) Inventors: Sam Colalillo, Nazareth, PA (US); Eric Rossignol, Chicago, IL (US); Anne Pietrement, Chicago, IL (US); Doreen Stahl, Chicago, IL (US); Markus Bleck, Chicago, IL (US); Kai Kopperschmidt, Chicago, IL (US); Yun Xue, Chicago, IL (US)

(73) Assignee: Nielsen Consumer LLC, Chicago, IL (US)

( * ) Notice: Subject to any disclaimer, the term of this patent is extended or adjusted under 35 U.S.C. 154(b) by 192 days.

(21) Appl. No.: 18/326,917

(22) Filed: May 31, 2023

(65) Prior Publication Data

US 2024/0078566 A1　　Mar. 7, 2024

Related U.S. Application Data

(60) Provisional application No. 63/403,140, filed on Sep. 1, 2022.

(51) Int. Cl.
　*G06Q 30/02*　　　(2023.01)
　*G06Q 30/0202*　　(2023.01)
　*G06Q 30/0211*　　(2023.01)
　*G06Q 30/0242*　　(2023.01)

(52) U.S. Cl.
　CPC ..... *G06Q 30/0202* (2013.01); *G06Q 30/0211* (2013.01); *G06Q 30/0246* (2013.01)

(58) Field of Classification Search
　CPC ........... G06Q 30/0202; G06Q 30/0211; G06Q 30/0246
　See application file for complete search history.

(56) References Cited

U.S. PATENT DOCUMENTS

2010/0169162 A1* 7/2010 Anderson .......... G06Q 30/0201
　　　　　　　　　　　　　　　　705/7.31
2012/0303414 A1* 11/2012 Dodge ................... G06Q 30/02
　　　　　　　　　　　　　　　　705/7.31
2023/0401590 A1* 12/2023 Martinez Manzano ....................
　　　　　　　　　　　　　　　　G06Q 30/0201

OTHER PUBLICATIONS

University of Chicago "Too Many Metrics" (Year: 2016).*

* cited by examiner

*Primary Examiner* — Breffni Baggot
(74) *Attorney, Agent, or Firm* — Hanley, Flight & Zimmerman, LLC

(57) ABSTRACT

Systems, apparatus, articles of manufacture, and methods are disclosed to detect promotion events. An apparatus includes interface circuitry to obtain aligned sales data corresponding to products, the products corresponding to a market and a category; computer readable instructions; and programmable circuitry to instantiate event detection circuitry to: identify product-level promotions based on the aligned sales data and corresponding baseline data for the products; and group ones of the product-level promotions to identify promotion events; and expansion circuitry to determine uplift factors for different promotion characteristics based on the market and the category; and apply the uplift factors to the product-level promotions and the promotion events to identify incremental sales.

17 Claims, 24 Drawing Sheets

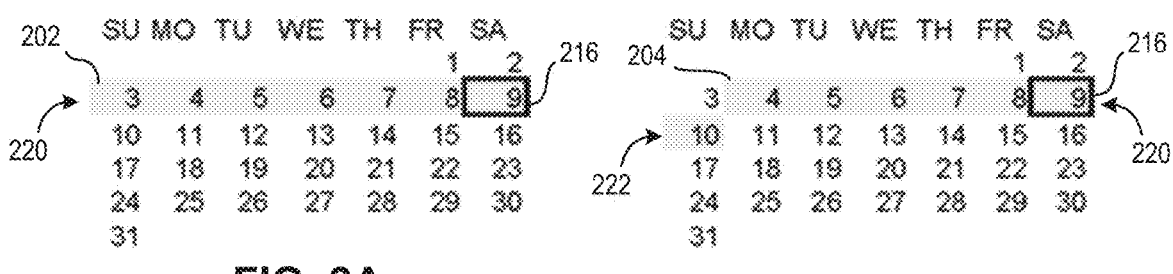
FIG. 2A          FIG. 2B
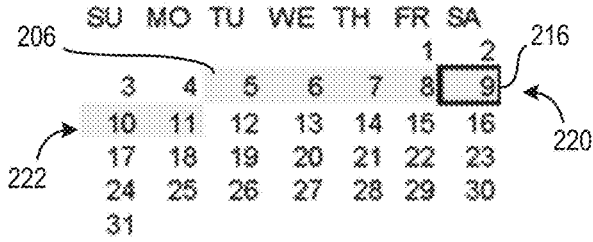
FIG. 2C
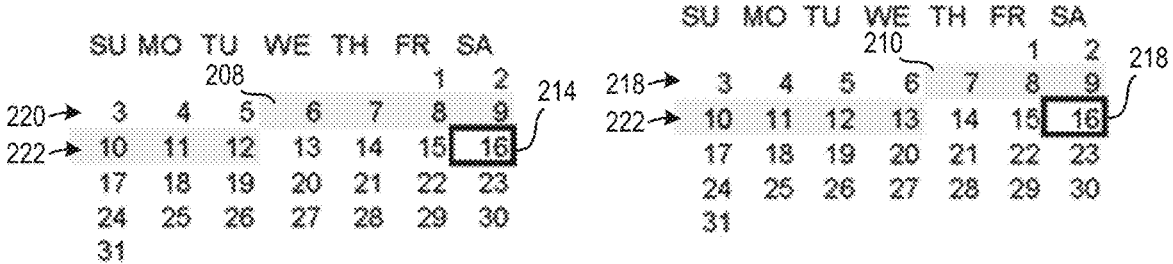
FIG. 2D          FIG. 2E
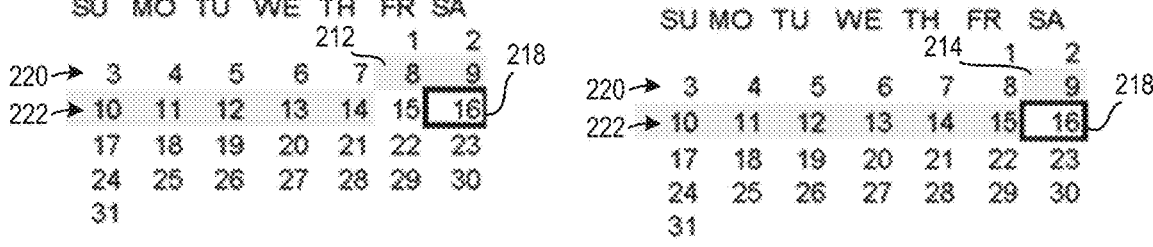
FIG. 2F          FIG. 2G

| WEEK | 1 | 2 | 3 | 4 | 5 |
|---|---|---|---|---|---|
| *REPORTING WEEK (SALES VOLUME(S)) 532* | 79 | 149 | 180 | 76 | 83 |
| *BASELINE (VOLUME) 544* | 75 | 75 | 75 | 75 | 75 |
| *INCREMENTAL (VOLUME(S)) 602* | 4 | 74 | 105 | 1 | 8 |
| *(VOLUME) MOVE 604* | 0 | 63 | 0 | 0 | 0 |
| *(VOLUME) ADD 606* | 0 | 0 | 63 | 0 | 0 |
| *NEW (VOLUME) 608* | 79 | 86 | 243 | 76 | 83 |
| OFFSET WEEK (SALES VOLUME((S)) 534 | 82 | 87 | 242 | 77 | 83 |

| STUDY ID (702A) | MARKET ID (702B) | UPC (702C) | PERIOD ID (702D) | VOLUME (702E) | VALUE (702F) | PROMOTION PRICE (702G) | DISCOUNT (702H) | REGULAR PRICE (702I) | ACV (702J) | PROMOTION WEEK (702K) | OOS WEEK (702L) |
|---|---|---|---|---|---|---|---|---|---|---|---|
| 12 | 5246995 | 48905674 | 1007 | 4029 | 12876 | 2.97 | 0.41 | 5.06 | 118692 | 1 | 0 |
| 12 | 5246995 | 22007814 | 1007 | 367 | 6321 | 2.99 | 0.41 | 5.07 | 237384 | 1 | 0 |
| 12 | 5246995 | 217978490 | 1007 | 462 | 4786 | 3.01 | 0.39 | 4.96 | 118692 | 1 | 0 |
| 12 | 5246995 | 313256399 | 1007 | 147 | 7910 | 2.99 | 0.39 | 4.92 | 118692 | 1 | 0 |
| 12 | 5246995 | 219637565 | 1007 | 652 | 12083 | 2.99 | 0.40 | 4.95 | 118692 | 1 | 0 |
| 12 | 5246995 | 182762860 | 1010 | 325 | 7109 | 10.00 | 0.14 | 11.59 | 118692 | 1 | 0 |
| 12 | 5246995 | 182762856 | 1010 | 356 | 5298 | 9.99 | 0.14 | 11.64 | 118692 | 1 | 0 |
| 12 | 5246995 | 218735710 | 1000 | 456 | 9261 | 5.96 | 0.25 | 7.99 | 118692 | 1 | 0 |
| 12 | 5246995 | 219452568 | 1000 | 385 | 9264 | 5.99 | 0.25 | 7.99 | 118692 | 1 | 0 |
| 12 | 5246995 | 218735710 | 1006 | 1569 | 15562 | 6.00 | 0.25 | 7.99 | 118692 | 1 | 0 |
| 12 | 5246995 | 219452568 | 1006 | 456 | 16917 | 6.00 | 0.25 | 7.99 | 237384 | 1 | 0 |
| 12 | 5246995 | 193891003 | 1009 | 385 | 2676 | 13.20 | 0.08 | 14.35 | 118692 | 1 | 0 |
| 12 | 5246995 | 360731113 | 1009 | 485 | 1500 | 12.99 | 0.09 | 14.20 | 118692 | 1 | 0 |
| 12 | 5246995 | 194148130 | 1009 | 147 | 8670 | 13.00 | 0.09 | 14.31 | 118692 | 1 | 0 |
| 12 | 5246995 | 360730923 | 1009 | 156 | 2383 | 12.99 | 0.09 | 14.25 | 118692 | 1 | 0 |
| 12 | 5246995 | 311904800 | 1009 | 365 | 5982 | 12.94 | 0.10 | 14.32 | 237384 | 1 | 0 |
| 12 | 5246995 | 193670541 | 1009 | 988 | 10972 | 13.00 | 0.09 | 14.35 | 118692 | 1 | 0 |
| 12 | 5246995 | 193891003 | 1010 | 655 | 6404 | 7.99 | 0.44 | 14.37 | 237384 | 1 | 0 |
| 12 | 5246995 | 360731113 | 1010 | 344 | 970 | 12.99 | 0.09 | 14.35 | 118692 | 1 | 0 |

Figure 8A:
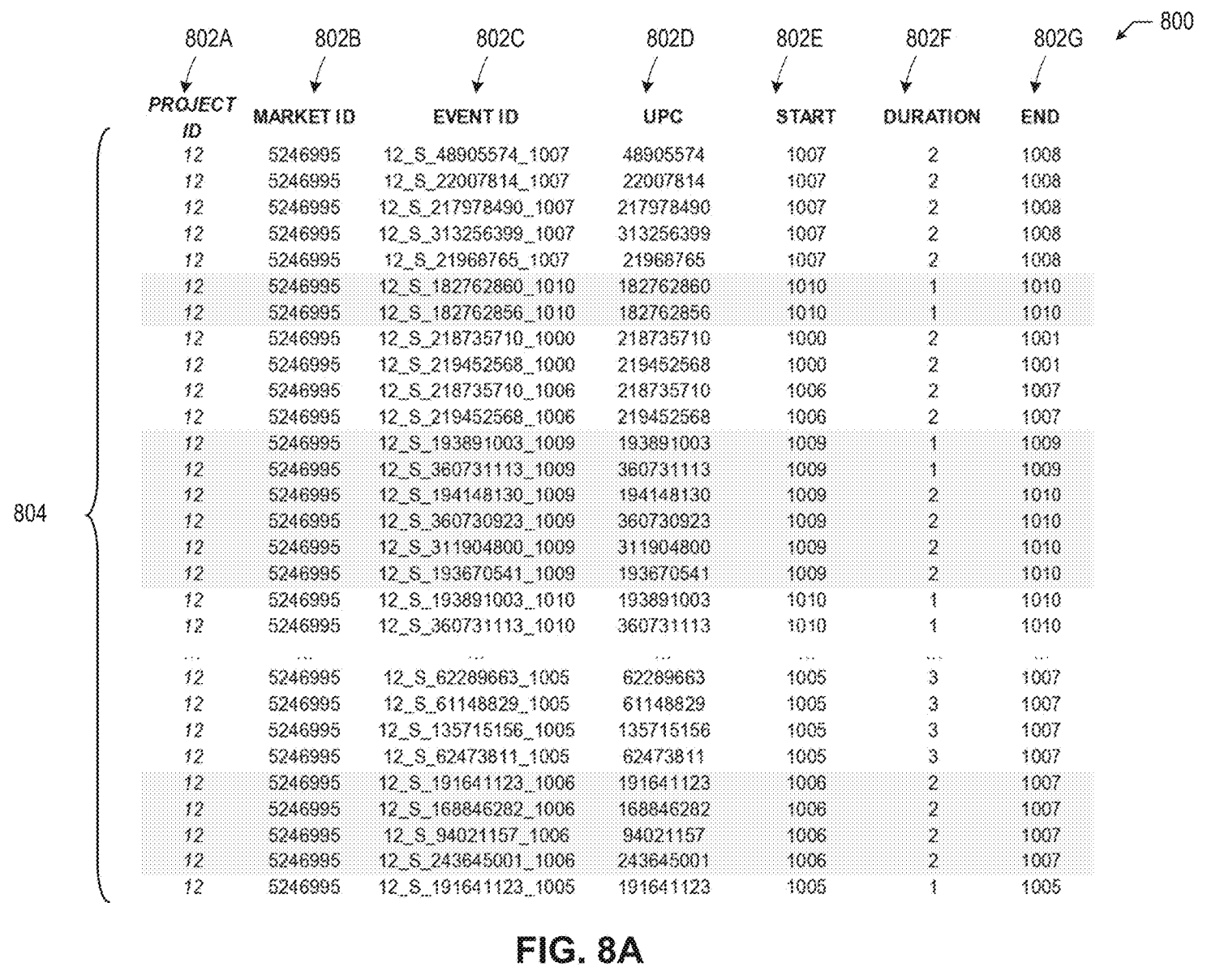

| 802A PROJECT ID | 802B MARKET ID | 802C EVENT ID | 802D UPC | 802E START | 802F DURATION | 802G END |
|---|---|---|---|---|---|---|
| 12 | 5246995 | 12_S_48905574_1007 | 48905574 | 1007 | 2 | 1008 |
| 12 | 5246995 | 12_S_22007814_1007 | 22007814 | 1007 | 2 | 1008 |
| 12 | 5246995 | 12_S_217978490_1007 | 217978490 | 1007 | 2 | 1008 |
| 12 | 5246995 | 12_S_313256399_1007 | 313256399 | 1007 | 2 | 1008 |
| 12 | 5246995 | 12_S_21968765_1007 | 21968765 | 1007 | 2 | 1008 |
| 12 | 5246995 | 12_S_182762860_1010 | 182762860 | 1010 | 1 | 1010 |
| 12 | 5246995 | 12_S_182762856_1010 | 182762856 | 1010 | 1 | 1010 |
| 12 | 5246995 | 12_S_218735710_1000 | 218735710 | 1000 | 2 | 1001 |
| 12 | 5246995 | 12_S_219452568_1000 | 219452568 | 1000 | 2 | 1001 |
| 12 | 5246995 | 12_S_218735710_1006 | 218735710 | 1006 | 2 | 1007 |
| 12 | 5246995 | 12_S_219452568_1006 | 219452568 | 1006 | 2 | 1007 |
| 12 | 5246995 | 12_S_193891003_1009 | 193891003 | 1009 | 1 | 1009 |
| 12 | 5246995 | 12_S_360731113_1009 | 360731113 | 1009 | 1 | 1009 |
| 12 | 5246995 | 12_S_194148130_1009 | 194148130 | 1009 | 2 | 1010 |
| 12 | 5246995 | 12_S_360730923_1009 | 360730923 | 1009 | 2 | 1010 |
| 12 | 5246995 | 12_S_311904800_1009 | 311904800 | 1009 | 2 | 1010 |
| 12 | 5246995 | 12_S_193670541_1008 | 193670541 | 1009 | 2 | 1010 |
| 12 | 5246995 | 12_S_193891003_1010 | 193891003 | 1010 | 1 | 1010 |
| 12 | 5246995 | 12_S_360731113_1010 | 360731113 | 1010 | 1 | 1010 |
| 12 | 5246995 | 12_S_622898863_1005 | 622898863 | 1005 | 3 | 1007 |
| 12 | 5246995 | 12_S_61148829_1005 | 61148829 | 1005 | 3 | 1007 |
| 12 | 5246995 | 12_S_135715156_1005 | 135715156 | 1005 | 3 | 1007 |
| 12 | 5246995 | 12_S_624738811_1005 | 624738811 | 1005 | 3 | 1007 |
| 12 | 5246995 | 12_S_191641123_1006 | 191641123 | 1006 | 2 | 1007 |
| 12 | 5246995 | 12_S_168846282_1006 | 168846282 | 1006 | 2 | 1007 |
| 12 | 5246995 | 12_S_94021157_1006 | 94021157 | 1006 | 2 | 1007 |
| 12 | 5246995 | 12_S_243645001_1006 | 243645001 | 1006 | 2 | 1007 |
| 12 | 5246995 | 12_S_191641123_1005 | 191641123 | 1005 | 1 | 1005 |

| PROMOTION PRICE (802H) | DISCOUNT (802I) | REGULAR PRICE (802J) | WD (802K) | WD FEATURE (802L) | SIZE (802M) | BRAND (802N) | SHORT BRAND (802O) | MANUFACTURER (802P) |
|---|---|---|---|---|---|---|---|---|
| 2.97 | 0.41 | 5.06 | 99 | 49 | 72 | FIRST BRAND | FIRST | MANUFACTURER_1 |
| 2.99 | 0.41 | 5.07 | 96 | 52 | 72 | FIRST BRAND | FIRST | MANUFACTURER_1 |
| 3.01 | 0.39 | 4.96 | 98 | 52 | 65 | FIRST BRAND | FIRST | MANUFACTURER_1 |
| 2.99 | 0.39 | 4.92 | 96 | 50 | 75 | FIRST BRAND | FIRST | MANUFACTURER_1 |
| 2.99 | 0.40 | 4.95 | 99 | 49 | 72 | FIRST BRAND | FIRST | MANUFACTURER_1 |
| 10.00 | 0.14 | 11.59 | 96 | 0 | 141 | SECOND BRAND | SECOND | MANUFACTURER_1 |
| 9.99 | 0.14 | 11.64 | 90 | 0 | 141 | SECOND BRAND | SECOND | MANUFACTURER_1 |
| 5.96 | 0.25 | 7.99 | 98 | 0 | 50 | THIRD BRAND | THIRD | MANUFACTURER_1 |
| 5.99 | 0.25 | 7.99 | 90 | 0 | 50 | THIRD BRAND | THIRD | MANUFACTURER_1 |
| 6.00 | 0.25 | 7.99 | 97 | 50 | 50 | THIRD BRAND | THIRD | MANUFACTURER_1 |
| 6.00 | 0.25 | 7.99 | 100 | 48 | 50 | THIRD BRAND | THIRD | MANUFACTURER_1 |
| 13.20 | 0.08 | 14.35 | 100 | 97 | 100 | THIRD BRAND | THIRD | MANUFACTURER_1 |
| 12.99 | 0.08 | 14.20 | 100 | 96 | 40 | THIRD BRAND | THIRD | MANUFACTURER_1 |
| 13.00 | 0.08 | 14.31 | 88 | 55 | 100 | THIRD BRAND | THIRD | MANUFACTURER_1 |
| 12.99 | 0.09 | 14.25 | 85 | 79 | 38 | THIRD BRAND | THIRD | MANUFACTURER_1 |
| 12.94 | 0.10 | 14.32 | 83 | 61 | 100 | THIRD BRAND | THIRD | MANUFACTURER_1 |
| 13.00 | 0.09 | 14.35 | 87 | 55 | 100 | THIRD BRAND | THIRD | MANUFACTURER_1 |
| 7.99 | 0.44 | 14.37 | 79 | 0 | 100 | THIRD BRAND | THIRD | MANUFACTURER_1 |
| 12.99 | 0.03 | 14.35 | 30 | 0 | 40 | THIRD BRAND | THIRD | MANUFACTURER_1 |
| 17.59 | 0.07 | 18.91 | 70 | 46 | 150 | FOURTH BRAND | FOURTH | MANUFACTURER_2 |
| 17.57 | 0.07 | 18.90 | 71 | 46 | 150 | FOURTH BRAND | FOURTH | MANUFACTURER_2 |
| 17.72 | 0.06 | 18.89 | 69 | 47 | 138 | FOURTH BRAND | FOURTH | MANUFACTURER_2 |
| 17.64 | 0.07 | 18.90 | 71 | 45 | 150 | FOURTH BRAND | FOURTH | MANUFACTURER_2 |
| 17.53 | 0.08 | 18.99 | 98 | 49 | 72 | FOURTH BRAND | FOURTH | MANUFACTURER_2 |
| 17.63 | 0.07 | 18.99 | 86 | 56 | 72 | FOURTH BRAND | FOURTH | MANUFACTURER_2 |
| 17.54 | 0.08 | 18.99 | 94 | 51 | 72 | FOURTH BRAND | FOURTH | MANUFACTURER_2 |
| 17.74 | 0.07 | 18.99 | 83 | 58 | 54 | FOURTH BRAND | FOURTH | MANUFACTURER_2 |

Figure 8C:
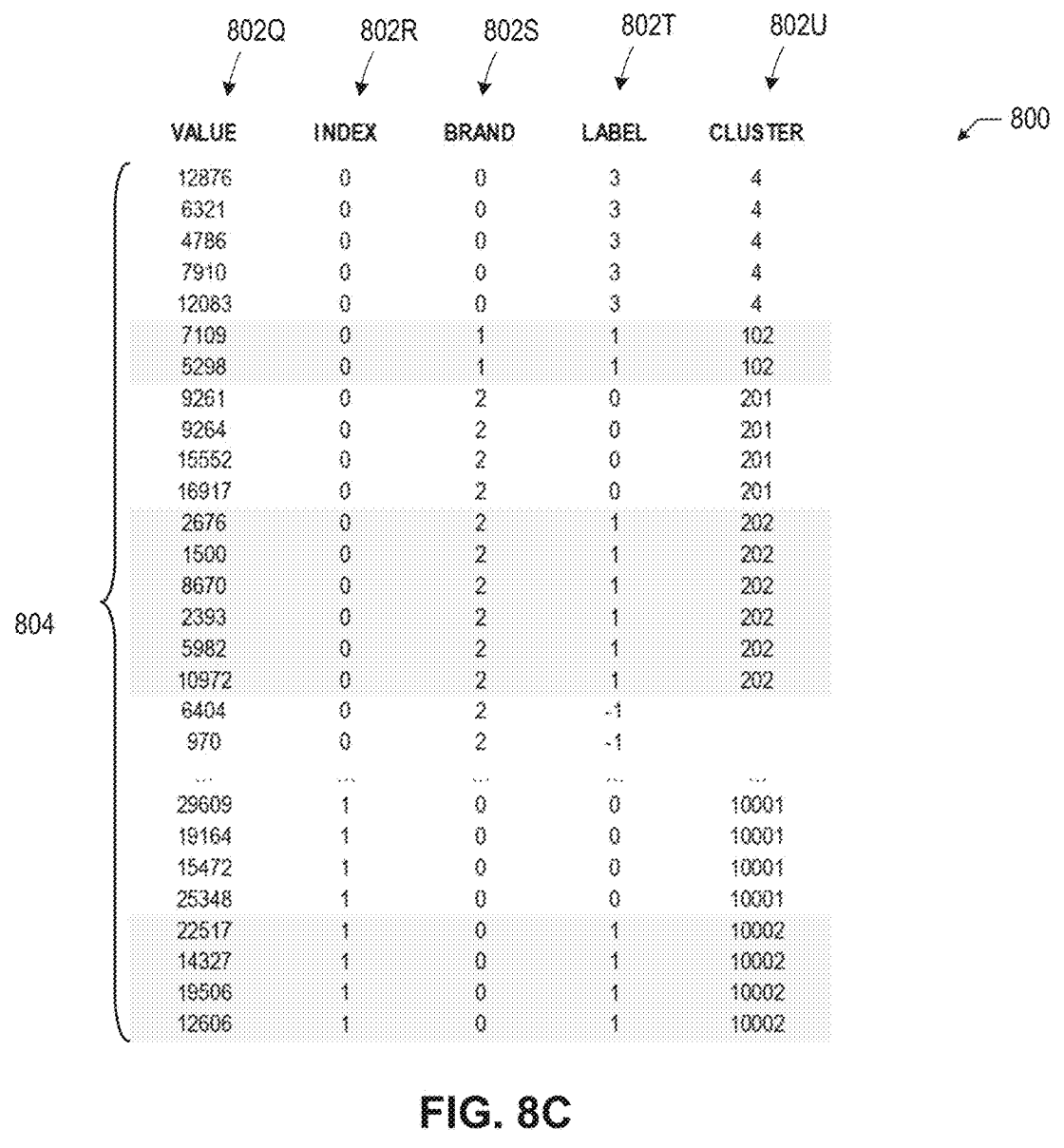

| VALUE (802Q) | INDEX (802R) | BRAND (802S) | LABEL (802T) | CLUSTER (802U) |
|---|---|---|---|---|
| 12876 | 0 | 0 | 3 | 4 |
| 6321 | 0 | 0 | 3 | 4 |
| 4786 | 0 | 0 | 3 | 4 |
| 7910 | 0 | 0 | 3 | 4 |
| 12063 | 0 | 0 | 3 | 4 |
| 7109 | 0 | 1 | 1 | 102 |
| 5298 | 0 | 1 | 1 | 102 |
| 9261 | 0 | 2 | 0 | 201 |
| 9264 | 0 | 2 | 0 | 201 |
| 16552 | 0 | 2 | 0 | 201 |
| 16917 | 0 | 2 | 0 | 201 |
| 2676 | 0 | 2 | 1 | 202 |
| 1500 | 0 | 2 | 1 | 202 |
| 8670 | 0 | 2 | 1 | 202 |
| 2393 | 0 | 2 | 1 | 202 |
| 5982 | 0 | 2 | 1 | 202 |
| 10972 | 0 | 2 | 1 | 202 |
| 6404 | 0 | 2 | 1 |  |
| 970 | 0 | 2 | 1 |  |
| 29609 | 1 | 0 | 0 | 10001 |
| 19164 | 1 | 0 | 0 | 10001 |
| 15472 | 1 | 0 | 0 | 10001 |
| 25348 | 1 | 0 | 0 | 10001 |
| 22517 | 1 | 0 | 1 | 10002 |
| 14327 | 1 | 0 | 1 | 10002 |
| 19506 | 1 | 0 | 1 | 10002 |
| 12636 | 1 | 0 | 1 | 10002 |

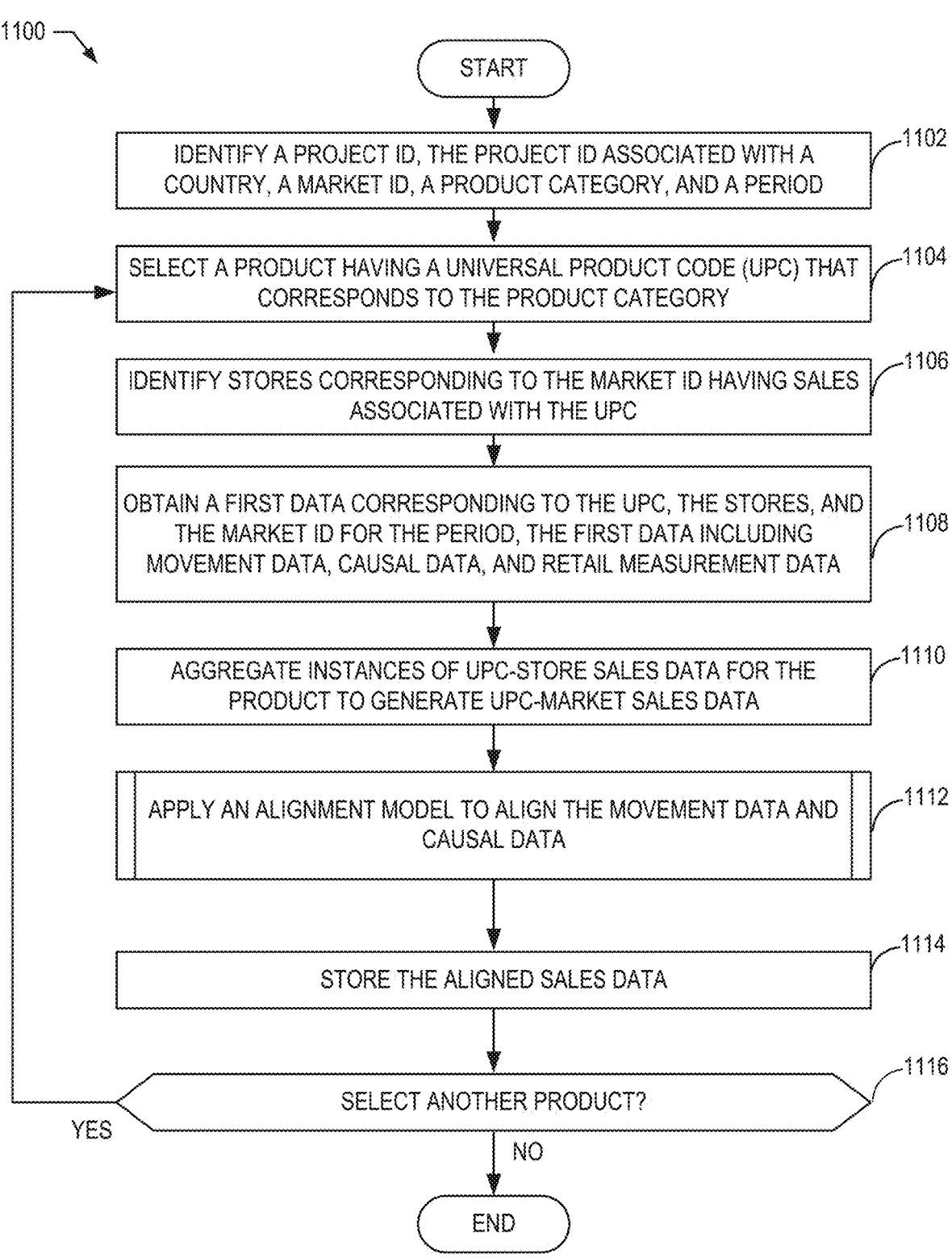

1100

START

IDENTIFY A PROJECT ID, THE PROJECT ID ASSOCIATED WITH A COUNTRY, A MARKET ID, A PRODUCT CATEGORY, AND A PERIOD ⟋1102

SELECT A PRODUCT HAVING A UNIVERSAL PRODUCT CODE (UPC) THAT CORRESPONDS TO THE PRODUCT CATEGORY ⟋1104

IDENTIFY STORES CORRESPONDING TO THE MARKET ID HAVING SALES ASSOCIATED WITH THE UPC ⟋1106

OBTAIN A FIRST DATA CORRESPONDING TO THE UPC, THE STORES, AND THE MARKET ID FOR THE PERIOD, THE FIRST DATA INCLUDING MOVEMENT DATA, CAUSAL DATA, AND RETAIL MEASUREMENT DATA ⟋1108

AGGREGATE INSTANCES OF UPC-STORE SALES DATA FOR THE PRODUCT TO GENERATE UPC-MARKET SALES DATA ⟋1110

APPLY AN ALIGNMENT MODEL TO ALIGN THE MOVEMENT DATA AND CAUSAL DATA ⟋1112

STORE THE ALIGNED SALES DATA ⟋1114

SELECT ANOTHER PRODUCT? ⟋1116

YES

NO

END

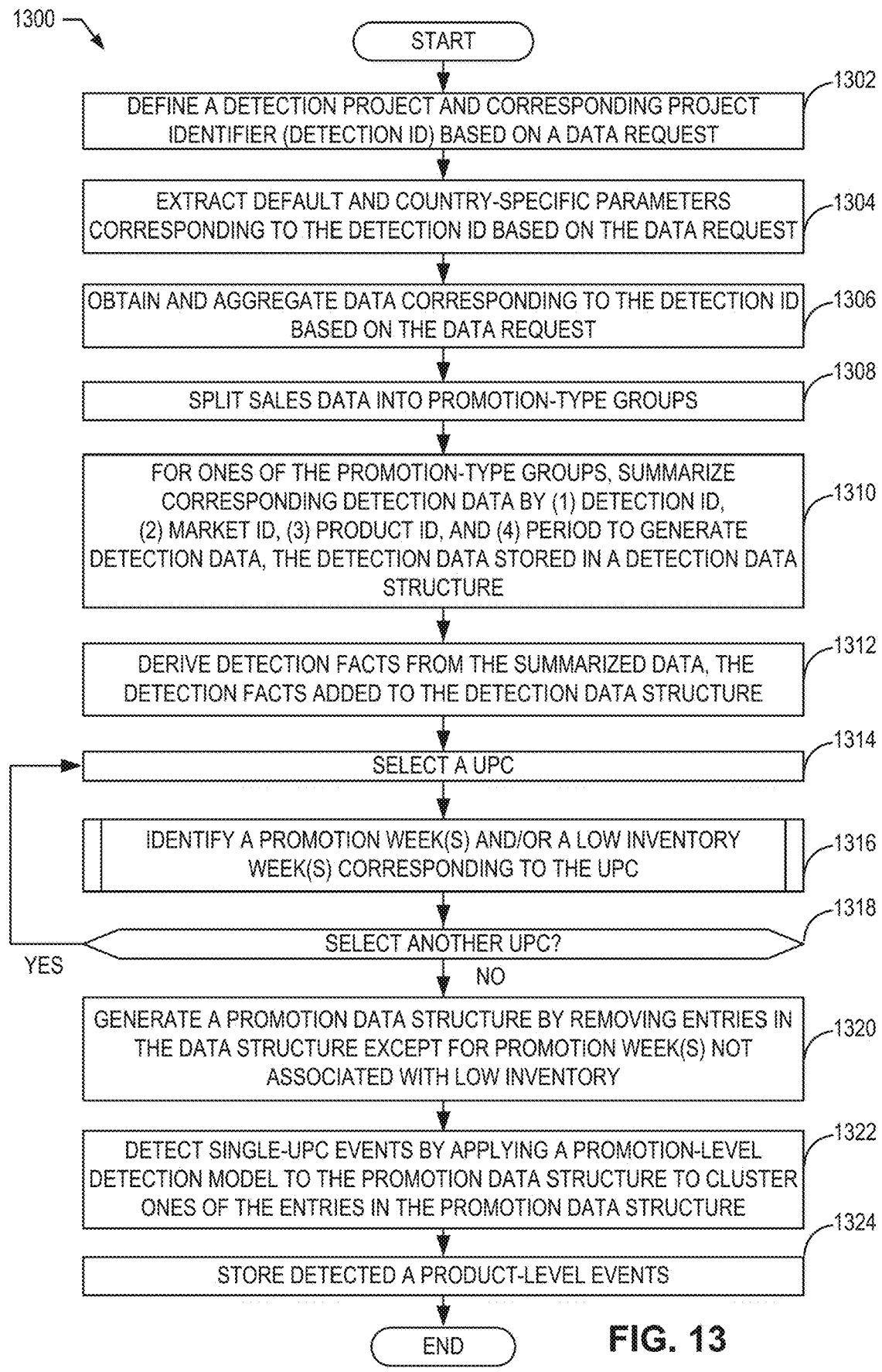

START

DEFINE A DETECTION PROJECT AND CORRESPONDING PROJECT IDENTIFIER (DETECTION ID) BASED ON A DATA REQUEST ⌐1302

EXTRACT DEFAULT AND COUNTRY-SPECIFIC PARAMETERS CORRESPONDING TO THE DETECTION ID BASED ON THE DATA REQUEST ⌐1304

OBTAIN AND AGGREGATE DATA CORRESPONDING TO THE DETECTION ID BASED ON THE DATA REQUEST ⌐1306

SPLIT SALES DATA INTO PROMOTION-TYPE GROUPS ⌐1308

FOR ONES OF THE PROMOTION-TYPE GROUPS, SUMMARIZE CORRESPONDING DETECTION DATA BY (1) DETECTION ID, (2) MARKET ID, (3) PRODUCT ID, AND (4) PERIOD TO GENERATE DETECTION DATA, THE DETECTION DATA STORED IN A DETECTION DATA STRUCTURE ⌐1310

DERIVE DETECTION FACTS FROM THE SUMMARIZED DATA, THE DETECTION FACTS ADDED TO THE DETECTION DATA STRUCTURE ⌐1312

SELECT A UPC ⌐1314

IDENTIFY A PROMOTION WEEK(S) AND/OR A LOW INVENTORY WEEK(S) CORRESPONDING TO THE UPC ⌐1316

SELECT ANOTHER UPC? ⌐1318

YES          NO

GENERATE A PROMOTION DATA STRUCTURE BY REMOVING ENTRIES IN THE DATA STRUCTURE EXCEPT FOR PROMOTION WEEK(S) NOT ASSOCIATED WITH LOW INVENTORY ⌐1320

DETECT SINGLE-UPC EVENTS BY APPLYING A PROMOTION-LEVEL DETECTION MODEL TO THE PROMOTION DATA STRUCTURE TO CLUSTER ONES OF THE ENTRIES IN THE PROMOTION DATA STRUCTURE ⌐1322

STORE DETECTED A PRODUCT-LEVEL EVENTS ⌐1324

END

FIG. 13

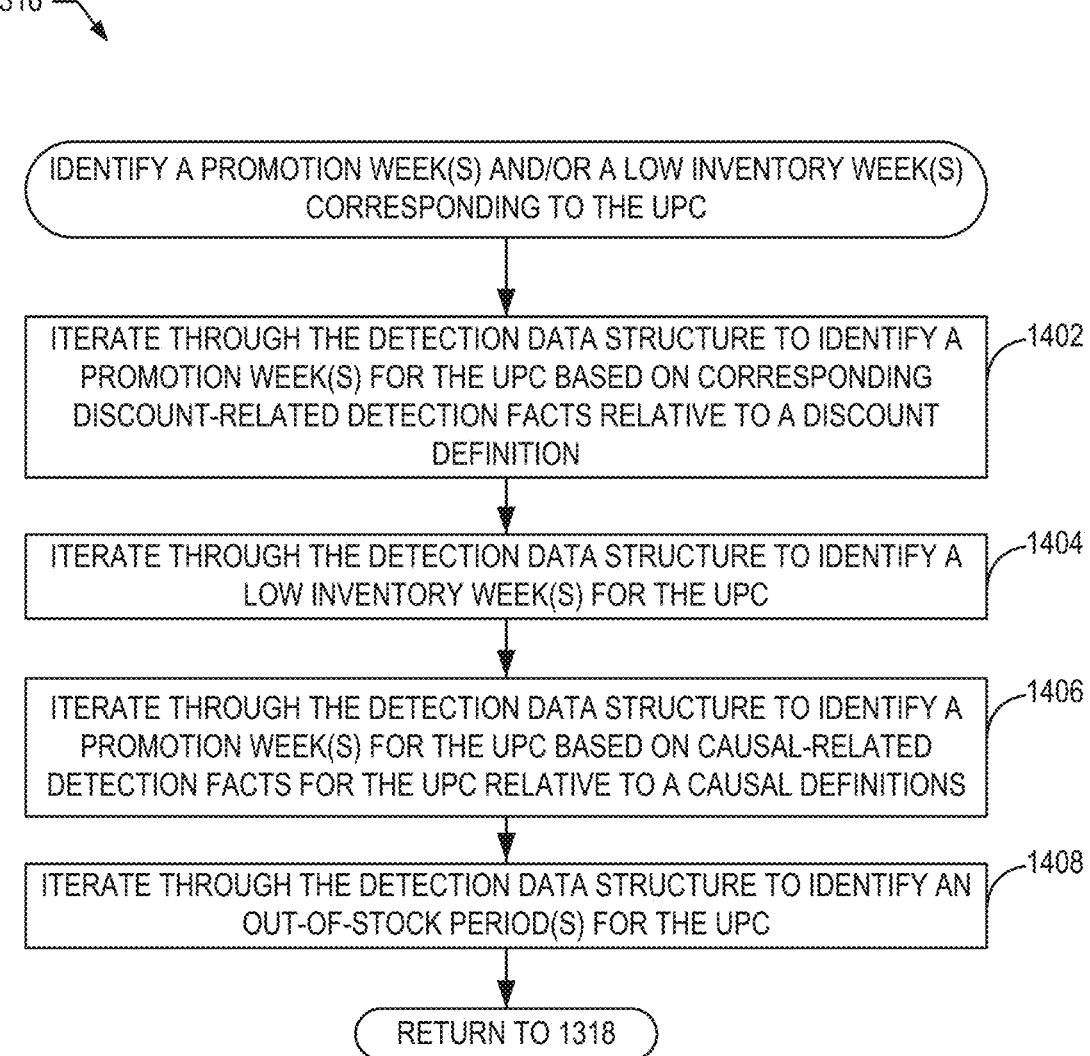

1316

IDENTIFY A PROMOTION WEEK(S) AND/OR A LOW INVENTORY WEEK(S) CORRESPONDING TO THE UPC

ITERATE THROUGH THE DETECTION DATA STRUCTURE TO IDENTIFY A PROMOTION WEEK(S) FOR THE UPC BASED ON CORRESPONDING DISCOUNT-RELATED DETECTION FACTS RELATIVE TO A DISCOUNT DEFINITION — 1402

ITERATE THROUGH THE DETECTION DATA STRUCTURE TO IDENTIFY A LOW INVENTORY WEEK(S) FOR THE UPC — 1404

ITERATE THROUGH THE DETECTION DATA STRUCTURE TO IDENTIFY A PROMOTION WEEK(S) FOR THE UPC BASED ON CAUSAL-RELATED DETECTION FACTS FOR THE UPC RELATIVE TO A CAUSAL DEFINITIONS — 1406

ITERATE THROUGH THE DETECTION DATA STRUCTURE TO IDENTIFY AN OUT-OF-STOCK PERIOD(S) FOR THE UPC — 1408

RETURN TO 1318

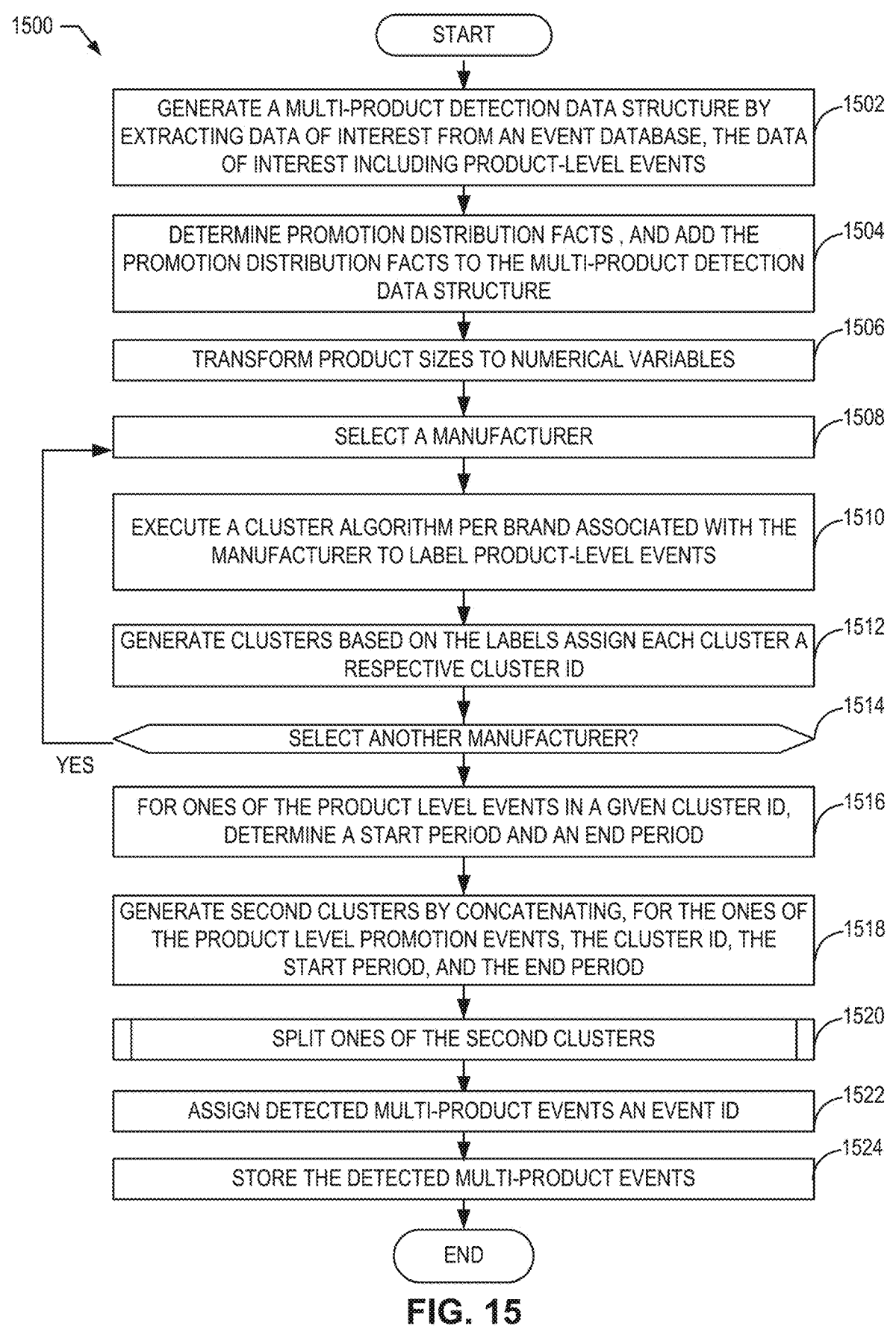

START

GENERATE A MULTI-PRODUCT DETECTION DATA STRUCTURE BY EXTRACTING DATA OF INTEREST FROM AN EVENT DATABASE, THE DATA OF INTEREST INCLUDING PRODUCT-LEVEL EVENTS ——1502

DETERMINE PROMOTION DISTRIBUTION FACTS , AND ADD THE PROMOTION DISTRIBUTION FACTS TO THE MULTI-PRODUCT DETECTION DATA STRUCTURE ——1504

TRANSFORM PRODUCT SIZES TO NUMERICAL VARIABLES ——1506

SELECT A MANUFACTURER ——1508

EXECUTE A CLUSTER ALGORITHM PER BRAND ASSOCIATED WITH THE MANUFACTURER TO LABEL PRODUCT-LEVEL EVENTS ——1510

GENERATE CLUSTERS BASED ON THE LABELS ASSIGN EACH CLUSTER A RESPECTIVE CLUSTER ID ——1512

SELECT ANOTHER MANUFACTURER? ——1514

YES

FOR ONES OF THE PRODUCT LEVEL EVENTS IN A GIVEN CLUSTER ID, DETERMINE A START PERIOD AND AN END PERIOD ——1516

GENERATE SECOND CLUSTERS BY CONCATENATING, FOR THE ONES OF THE PRODUCT LEVEL PROMOTION EVENTS, THE CLUSTER ID, THE START PERIOD, AND THE END PERIOD ——1518

SPLIT ONES OF THE SECOND CLUSTERS ——1520

ASSIGN DETECTED MULTI-PRODUCT EVENTS AN EVENT ID ——1522

STORE THE DETECTED MULTI-PRODUCT EVENTS ——1524

END

FIG. 15

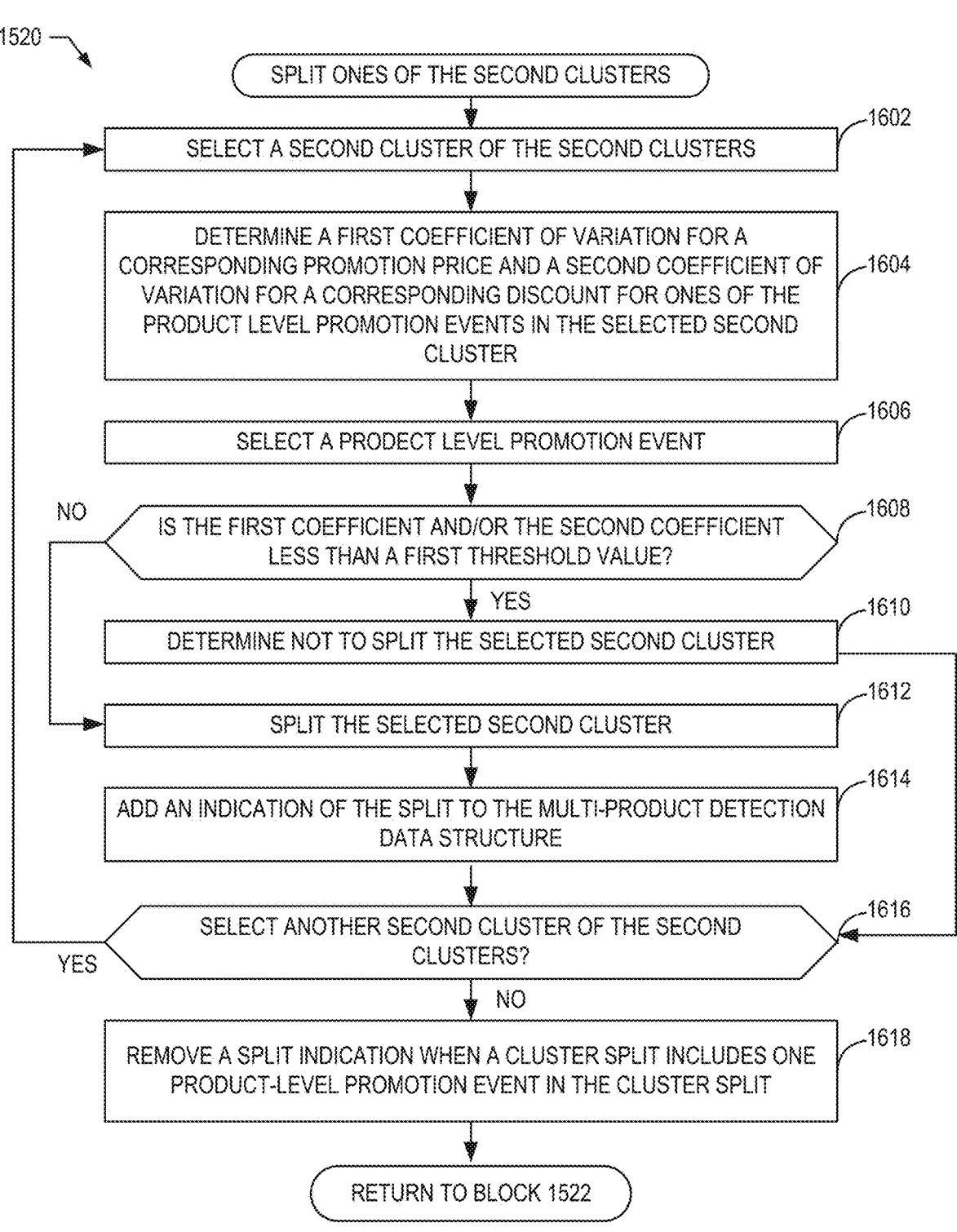

1520

SPLIT ONES OF THE SECOND CLUSTERS

SELECT A SECOND CLUSTER OF THE SECOND CLUSTERS — 1602

DETERMINE A FIRST COEFFICIENT OF VARIATION FOR A CORRESPONDING PROMOTION PRICE AND A SECOND COEFFICIENT OF VARIATION FOR A CORRESPONDING DISCOUNT FOR ONES OF THE PRODUCT LEVEL PROMOTION EVENTS IN THE SELECTED SECOND CLUSTER — 1604

SELECT A PRODECT LEVEL PROMOTION EVENT — 1606

NO — IS THE FIRST COEFFICIENT AND/OR THE SECOND COEFFICIENT LESS THAN A FIRST THRESHOLD VALUE? — 1608

YES

DETERMINE NOT TO SPLIT THE SELECTED SECOND CLUSTER — 1610

SPLIT THE SELECTED SECOND CLUSTER — 1612

ADD AN INDICATION OF THE SPLIT TO THE MULTI-PRODUCT DETECTION DATA STRUCTURE — 1614

SELECT ANOTHER SECOND CLUSTER OF THE SECOND CLUSTERS? — 1616

YES

NO

REMOVE A SPLIT INDICATION WHEN A CLUSTER SPLIT INCLUDES ONE PRODUCT-LEVEL PROMOTION EVENT IN THE CLUSTER SPLIT — 1618

RETURN TO BLOCK 1522

FIG. 16

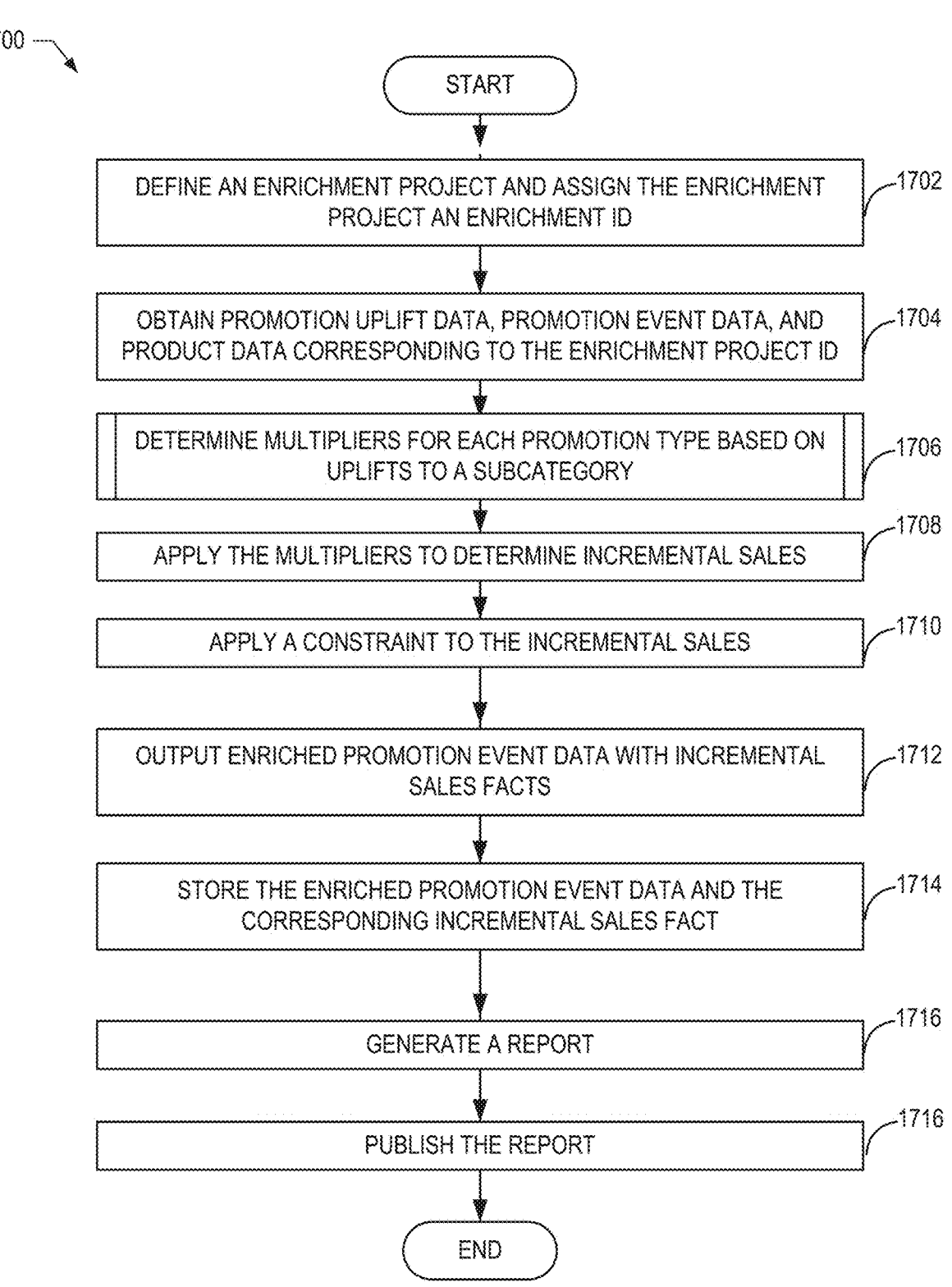

1700

START

DEFINE AN ENRICHMENT PROJECT AND ASSIGN THE ENRICHMENT PROJECT AN ENRICHMENT ID — 1702

OBTAIN PROMOTION UPLIFT DATA, PROMOTION EVENT DATA, AND PRODUCT DATA CORRESPONDING TO THE ENRICHMENT PROJECT ID — 1704

DETERMINE MULTIPLIERS FOR EACH PROMOTION TYPE BASED ON UPLIFTS TO A SUBCATEGORY — 1706

APPLY THE MULTIPLIERS TO DETERMINE INCREMENTAL SALES — 1708

APPLY A CONSTRAINT TO THE INCREMENTAL SALES — 1710

OUTPUT ENRICHED PROMOTION EVENT DATA WITH INCREMENTAL SALES FACTS — 1712

STORE THE ENRICHED PROMOTION EVENT DATA AND THE CORRESPONDING INCREMENTAL SALES FACT — 1714

GENERATE A REPORT — 1716

PUBLISH THE REPORT — 1716

END

FIG. 17

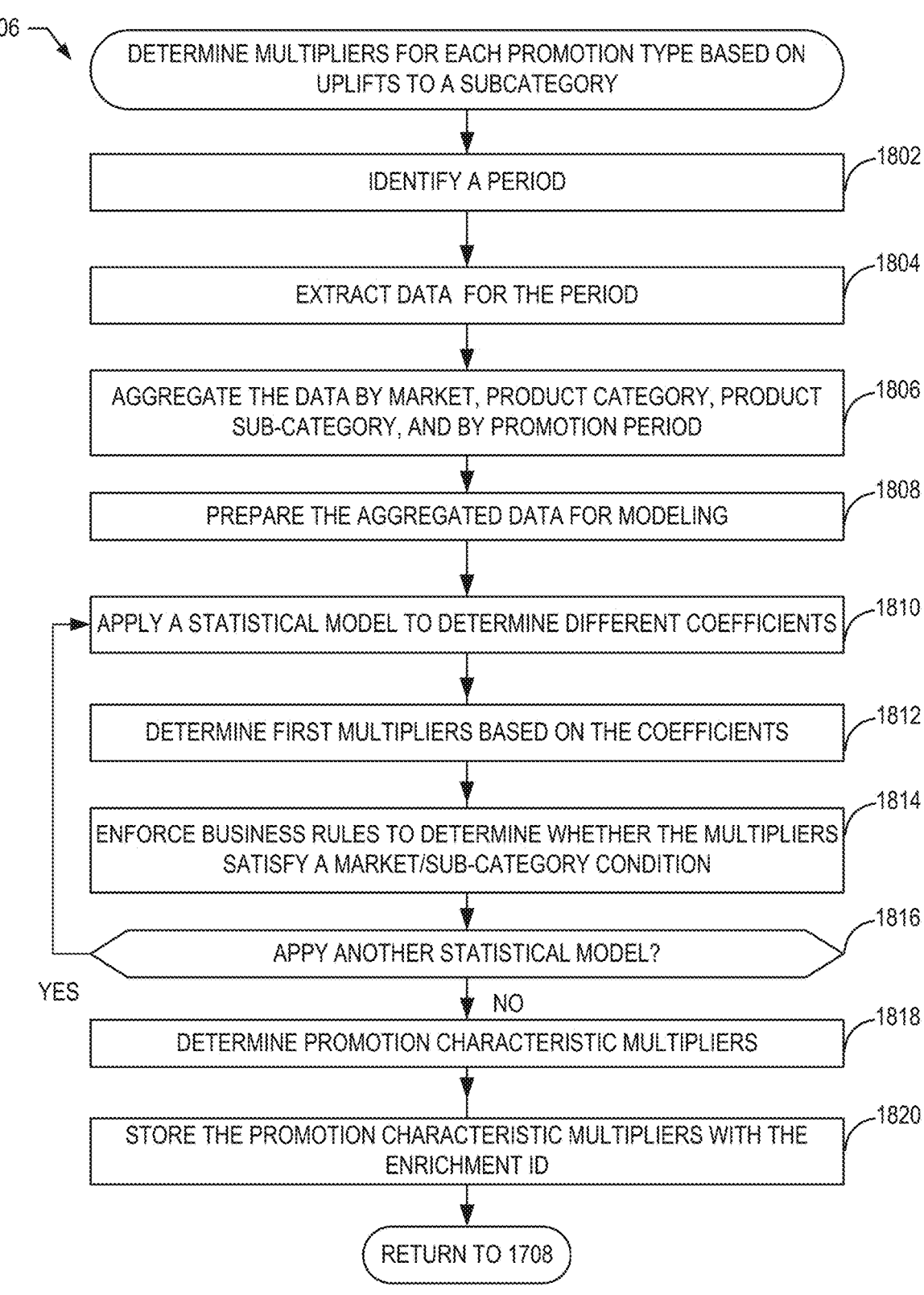

1706

DETERMINE MULTIPLIERS FOR EACH PROMOTION TYPE BASED ON UPLIFTS TO A SUBCATEGORY

IDENTIFY A PERIOD — 1802

EXTRACT DATA FOR THE PERIOD — 1804

AGGREGATE THE DATA BY MARKET, PRODUCT CATEGORY, PRODUCT SUB-CATEGORY, AND BY PROMOTION PERIOD — 1806

PREPARE THE AGGREGATED DATA FOR MODELING — 1808

APPLY A STATISTICAL MODEL TO DETERMINE DIFFERENT COEFFICIENTS — 1810

DETERMINE FIRST MULTIPLIERS BASED ON THE COEFFICIENTS — 1812

ENFORCE BUSINESS RULES TO DETERMINE WHETHER THE MULTIPLIERS SATISFY A MARKET/SUB-CATEGORY CONDITION — 1814

APPY ANOTHER STATISTICAL MODEL? — 1816

YES

NO

DETERMINE PROMOTION CHARACTERISTIC MULTIPLIERS — 1818

STORE THE PROMOTION CHARACTERISTIC MULTIPLIERS WITH THE ENRICHMENT ID — 1820

RETURN TO 1708

FIG. 18

METHODS, SYSTEMS, ARTICLES OF MANUFACTURE, AND APPARATUS TO DETECT PROMOTION EVENTS

RELATED APPLICATION

This patent claims the benefit of U.S. Provisional Patent Application No. 63/403,140, which was filed on Sep. 1, 2022. U.S. Provisional Patent Application No. 63/403,140 is hereby incorporated herein by reference in its entirety. Priority to U.S. Provisional Patent Application No. 63/403,140 is hereby claimed.

FIELD OF THE DISCLOSURE

This disclosure relates generally to the technical field of data analysis and, more particularly, to methods, systems, articles of manufacture and apparatus to detect promotional events.

BACKGROUND

Making fast and informed decisions using data is becoming increasingly mission-critical for market participants across geographies and channels, such as grocery, convenience, mass merchandise, drug, e-commerce, etc. In recent years, market analysts, retailers and/or product manufacturers have found value in the analysis of promotional events. Promotion events may exhibit particular effects that identify which promotion types and/or promotion controls are effective at meeting sales objectives.

BRIEF DESCRIPTION OF THE DRAWINGS

FIGS. 2A-2G illustrating different retailer scan weeks that are offset relative to example reporting periods

FIGS. 4A-4D are data structures illustrating data alignment issues associated with sales data from retailer stores.

FIG. 6 is another data structure illustrating an example implementation of an example alignment model disclosed herein based on the example product-level sales of FIGS. 5A-5C.

FIG. 7 illustrate example data structures for detecting product-level promotional events in accordance with teachings of this disclosure.

FIGS. 8A-8C illustrate example data structures for detecting multi-product promotional events in accordance with teachings of this disclosure.

FIGS. 9-18 are flowcharts representative of example machine readable instructions and/or example operations that may be executed, instantiated, and/or performed by example programmable circuitry to implement the promotion analysis circuitry 102 of FIG. 3.

Figure 1:
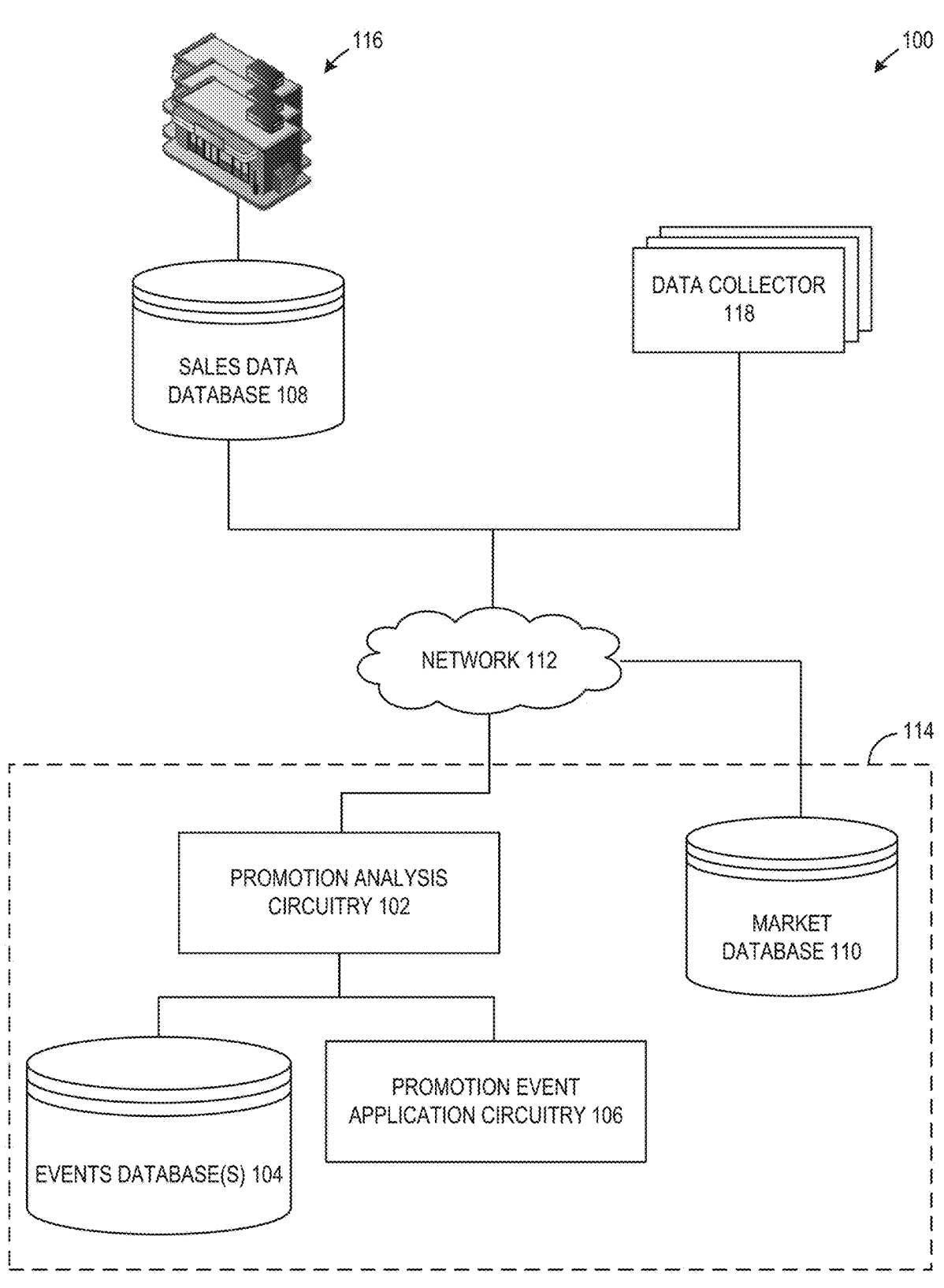
FIG. 1 is a block diagram of an example environment in which example promotion analysis circuitry operates to detect and analyze promotional events.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

DETAILED DESCRIPTION

Promotions are investments made by market participants (e.g., retailers, product manufacturers, etc.) to increase demand for products (e.g., goods or services) and drive business performance. Market participants desire to drive sales with effective promotional strategies that realize a return on investment (ROI). For example, during a run of a promotion, manufacturers typically desire to increase sales of their product(s) while retailers typically desire to increase incremental sales of the product(s) (e.g., sales of the product (s) above expected volume). As used herein, a manufacturer refers to an entity (e.g., a person, a business, a brand, etc.) that produces goods to sell, a retailer (e.g., a retail chain, a big-box retailer, a franchise, a mom-and-pop store, a seller, etc.) refers to an entity or group of entities that sells goods to consumers, and a store (e.g., a retail store, a retail establishment, a mom-and-pop store, a seller, e-commerce website or application, etc.) refers to a specific entity or establishment.

Not all promotions realize a ROI. Rather, promotions typically need to be well-planned and targeted to be effective sales drivers. To provide the market participants with a complete picture of the complex marketplace and critical knowledge of where and how to execute successful promotions, data analysts (e.g., market researchers, manufacturers, retailers, etc.) review promotional events that have run to appreciate details of the promotion execution, promotion spend (e.g., amount of investment), and promotion performance (e.g., results). To do so, data analysts collect and analyze retail measurement data to extract actionable insights that facilitate data-driven decision making for promotion planning. Retail measurement data refers to data related to one or more markets and can include (but is not limited to) product data, sales data, promotion activity data, inventory data, etc.

A data analyst (e.g., a human, an electronic device, etc.) needs a relatively large amount of data across different database dimensions to effectively understand promotion performance and execution for a product or group of products. For example, the data analyst may need information concerning which store(s) was on promotion (e.g., market dimension), when the promotional activity occurred (e.g., when a promotion started, duration of the promotion, etc.) (e.g., time dimension), which product(s) was promoted (e.g., products dimension), promotion-related facts (e.g., promotion price, lift, etc.) (e.g., facts dimension), etc. As such, the set-up work to identify promotion effectiveness is time-consuming, burdensome, voluminous (e.g., beyond the capabilities of human manual effort), and expensive for market participants. Further, this set-up work needs to be done for each product on promotion and/or for each promotion.

While manufacturers know what they spend on promotions, determining what they make on that spend (e.g., a corresponding ROI) is less clear-cut. For starters, the data they receive about what consumers buy comes from multiple sources. While manufacturers may have access to retail sales data, they must often cope with a different set of product identifiers from each retail data source, as well as differences in the unit of measure (such as case versus consumer unit). The scale of this challenge is compounded when considering problems that arise with aligning dates of promotions between the manufacturer and different retailers across potentially tens of thousands of promotions a large manufacturer runs each year. Further, manufacturers have to separate out sales that would have occurred regardless of whether a product is promoted (e.g., baseline sales), from the incremental sales driven by the promotion, as well as adjust for other drivers (e.g., weather, holidays, natural disasters, etc.).

Traditionally, market participants have evaluated performance of a promotion event in-house in a shipment and spend focused manner. For example, manufacturers may identify when one or more product shipments were made to a store, when a corresponding promotion was executed, how much investment was put into the promotion, etc. However, such a method lacks clarity on in-store promotion execution and consumer response. For example, such a method does not consider how consumer's actually experienced the promotion, whether sales were incremental, etc. Certain market participants have previously hired consulting firms to match (e.g., harmonize) the spend and shipment data with consumer response data. However, such a method is expensive and time consuming for even a few promotions. In other examples, the market participants utilize a workforce (e.g., human) to do this process manually using, for example, catalogued feature information purchased from a data vendor.

A relatively large manufacturer (e.g., The Kraft Heinz Company®, Pepsi®, etc.) can spend millions of dollars with consulting firms and hundreds of thousands of dollars on market data from vendors. In many of these cases, there remains a significant amount of manual work and a long lag time. For example, it is not uncommon for a manufacturer to see a 13 week delay between requesting promotion analysis and obtaining corresponding promotion results. These shortcomings have significantly limited market participants' ability to properly and/or timely identify successful promotions to generate promotional strategies that drive incremental sales.

Generally, when market participants (e.g., manufacturers and retailers) agree to a promotion(s), the manufacturer ships products corresponding to the promotion to the retailer based on demand planning. For example, for a given product, price point, and in-store support, the manufacturer attempts to predict how many units to ship to each store(s) based on units sold during previous, similar promotions. When these predictions are incorrect or inaccurate (e.g., based on inaccurate promotion data), the store(s) can end up with an inaccurate amount of product to sell. In some example, the store(s) receives excess product that does not sell, which contributes to food waste upon its expiration and/or wasted transportation energy when the excess food is shipped to another area. In some examples, the store(s) does not receive enough product, leading to lost sales opportunities at the shelf, reduced return on investment, and a potential loss in consumer faith and loyalty erosion.

Based on at least the foregoing, measuring promotion performance is no easy task, and grappling with understanding the effectiveness of trade promotions is something that plagues many market participants across markets. Accordingly, this technical field of research needs an improved technique (e.g. computer implemented method) for identifying promotional events and details thereof (e.g., to enable and/or otherwise facilitate promotion results data/feedback in a timely manner that is not possible with traditional techniques). Moreover, without a syndicated service that can centralize promotion results for promotional events, promotion results may not be widely consumed throughout a corresponding business organization, especially amongst those that plan the promotion events. In fact, these traditional methods do not offer a centralized, scalable, continuous system that represents promotional events in the way shoppers experience them (e.g., multiple items, an offer for a specified duration, etc.). Prior to examples disclosed herein, efficient, accurate, and cost effective promotion analysis across multiple products, multiple stores, and multiple retailers would be impractical, if not impossible.

To address the foregoing issues, example methods, systems, articles of manufacture, and apparatus are disclosed to detect and analyze promotion events based on retail measurement data. In particular, examples disclosed herein facilitate the technological (e.g., automatic) detection and analysis of a promotion event that identifies, at least, promotion execution and consumer response, in a fast and efficient manner to enable meaningful intelligence with actionable insights. For example, example promotion detection and analysis disclosed herein detects, describes, and evaluates promotion events, with promotion results delivered at different levels of granularity. Certain examples provide the market participants with promotional event results approximately one week after execution of a promotional event.

Example methods, systems, articles of manufacture, and apparatus disclosed herein detect, describe, and evaluate promotion events based on data collected from and/or generated by different sources and stored in one or more databases. For example, the database can be one or more databases operated by the market research entity that include market data (e.g., information corresponding to defined markets based on retailer, geographic location, etc.), product data (e.g., products, product attributes, categories, etc.), fact data (e.g., product sales data, price, distribution, etc.), and/or time data (e.g., when data was captured, when products were sold, etc.). A size of a database can be (e.g., excessively, relatively) large and/or complex. For example, a database related to products can include millions of products sold by hundreds of thousands of retailers, with sales data associated with each product spanning different periods of time. In some examples, the database can include data for over 50 million products collected from nearly 900,000 retailers on a period (e.g., weekly, bi-monthly, monthly, etc.) basis, enabling true market and consumer understanding and trustworthy insights. In some examples, the amount of data to retrieve and/or process makes manual detection and analysis of the promotions impractical or impossible.

Examples disclosed herein facilitate promotion detection and analysis by performing, at least, (a) data cleansing to remove or adjust erroneous and/or otherwise inaccurate sales data input, (b) event detection, and (c) data enrichment to reveal data types relevant to an analysis effort. Example data cleansing disclosed herein aligns causal data (e.g., promotion information, etc.) and movement data (e.g., point-of-sale data, retail scanner data, retail audit data, transaction data, etc.) to represent prices and volume sold during a promoted time period. In particular, disclosed examples move sales volume and sales value data corresponding to sales transactions to account for misaligned promotion activity and product movement, resulting in real prices and sales. In some examples, at least 900,000 retailers can (e.g., collectively) sell millions of products each day, making manual alignment of the data impractical or impossible. In some examples, data cleansing improves accuracy of promotion detection and analysis and reduces error. Examples disclosed herein reduce resource consumption by preventing errors that require computational resource consumption to correct, thereby conserving processing resources, facilitating faster process execution and/or helping green energy conservation initiatives.

Examples disclosed herein provide unified promotion detection across available markets and retail banners. Example event detection analyzes market by week by universal product code (UPC) level data to identify starting and ending periods of events, such as promotional events. For example, event detection disclosed herein detects a promotion week by causal information and/or by identification of a discount in point-of-sale data. Prior to examples disclosed herein, analysis of a planned promotion event was performed by numerous market participants individually. At least some of those market participants use different processes to aggregate data from different sources, which requires computing resource consumption to organize, harmonize, and calculate performance metrics, requires substantial time, and increases labor costs. Moreover, human involvement still exhibits erroneous and/or biased results, leading to reduced accuracy. Examples disclosed herein unify promotion detection across available markets and retail banner and share results to multiple market participants, resulting in significant reductions in computing resource consumption, improved accuracy of promotion metrics, and increased efficiency and efficacy of data collection and analysis.

Additionally, event detection disclosed herein applies clustering techniques to group promoted items (e.g., multiple flavors of ice cream at a similar price, or any size from a particular manufacturer at a similar percentage discount) for the market. In reality, market participants typically price and promote together the groups of products during a same promotion event. Grouping promoted product enables market participants to analyze promotions in a similar manner to how consumers experience the promotions. For example, a consumer does not experience a single flavor or variety of salad dressings at a time (e.g., thousand island, balsamic, etc.), but rather a line of 16 ounce salad dressings. Previous approaches to promotion event detection called for market participants to spend significant amounts of time and money to string together or attempt to make sense of information from different items promoted together to understand how the promotion event performed. By grouping promoted products together automatically, examples disclosed herein facilitate a more efficient and less costly approach thus improving the efficiency and efficacy at which data is collected. Further, this improves the technical field of data collection and the technological tools associated therewith by reducing and/or otherwise minimizing computing resource waste required to pool together the different information.

Example data enrichment disclosed herein analyzes a particular promotional event to generate enrichment facts for the promotion event. For example, particular offer language (e.g., "buy two, get one free"), particular (e.g., historical) price points and/or common market level price points, competitive activity, etc. Example enrichment facts for the promotion event provide unique offer details, execution details, and competitive contextual details (including in-store and in market) about events to enable true understanding of promotion events that are drivers of success.

Examples disclosed herein implement syndicated service that can centralize the processing of promotion-related information across retail establishments in a substantially similar manner to enable market participants to retrieve promotion analysis results for their respective products and/or stores and/or those of competitors from one location. Examples disclosed herein enable continuous, up-to-date performance evaluation of events to help prevent retailers and manufacturers from repeating mistakes and to adjust or augment the supply chain accordingly, thus reducing food and/or transportation waste. Disclosed examples may be used by a business, agency, organization, etc. to monitor effects of promotions on consumer buying behaviors to develop data-based marketing strategies, allocate specific marketing efforts to particular geographies, improve sales metrics, and/or otherwise improve business operations.

Upon detection of events, promotional trends and/or key performance indicators are exposed to improve promotion decisions in the future. For instance, examples disclosed herein facilitate awareness of particular pack sizes that are more popular, or particular offer language that is dominating a category, etc. Example methods, systems, articles of manufacture, and apparatus disclosed herein allow new conclusions to be drawn from data that otherwise would not be readily apparent with traditional techniques. Examples disclosed herein apply technological (e.g., automatic) analysis of a promotion event that help market participants prioritize and scale efficient event types, repeat events the truly drive incremental sales by learning what matters to consumers, focusing on meaningful modifications to previous event and/or generate new events, learn from other success stories while avoiding mistakes made by competitors, etc. Disclosed systems, methods, apparatus, and articles of manufacture are accordingly directed to one or more improvement(s) in the technological field of market research.

FIG. 1 is a block diagram of an example environment 100 in which example promotion analysis circuitry 102 operates to detect and analyze promotional events that occurred in different markets. In particular, the promotion analysis circuitry 102 implements promotion detection and analysis for one or more stores (e.g., retail stores, retailer establishments, etc.) and/or other sellers in one or more markets to analyze effects of promotions on sales volume/value of products using the example methods, systems, articles of manufacture, and apparatus described herein. In some examples, the promotion analysis circuitry 102 is implemented by one or more servers. For example, the promotion analysis circuitry 102 can correspond to a physical processing center including servers. In some examples, at least some functionality of the promotion analysis circuitry 102 is implemented via an example cloud and/or Edge network (e.g., AWS®, Microsoft® Azure™, etc.). In some examples, at least some functionality of the promotion analysis circuitry 102 is implemented by different amounts and/or types of electronic devices.

The promotion analysis circuitry 102 includes or is otherwise communicatively coupled to an example events database 104 and example promotion event application circuitry 106. The events database 104 is structured to store promotion results and/or corresponding data generated by the promotion analysis circuitry 102. In particular, the events database 104 stores (e.g., persists) promotion event results that identify promotion events across time periods, markets, stores, products, etc., including execution and performance of the promotional events. In some examples, the events database 104 stores data used to generate the promotion event results, such as, but not limited to, aligned sales data, detected product-level and event-level promotions, and details of the detected promotions.

In some examples, the promotion event results' include event enrichment data that describes, at least, a promotion offer(s) (e.g., language, pack, etc.), execution(s) (e.g., display location/type, feature images, most common price), and competitive contextual details (e.g., activity and/or prices leading up to and during a promotion, including in-store, remaining market, and/or in competitive markets). In some examples, the promotion event results include category expansion data that evaluate a promotion event by deriving a measure of how much the event benefited a respective product category (e.g., beverage, pet food, supplements, alcohol, personal care, etc.) in terms of sales uplift (e.g., an amount of sales earned above expected volume). In some examples, the promotion event results include additional and/or alternative information, such as trends identified in promotion data, promotion anniversaries (e.g., same promotion execution year over year), product swaps, time shifts, new promotions, etc.

The events database 104 can be used by market participants to evaluate sales, price, promotion and other marketing activity together for a more complete overview of factors that can impact sales. In particular, the promotion event application circuitry 106 facilitates access to the events database 104 by the market participants, enabling the market participants to evaluate promotions across markets, products, product categories, competitors, etc. In some examples, the promotion event application circuitry 106 is implemented as an application (e.g., program, software, algorithm). In some examples, the promotion event application circuitry 106 implements an example platform (e.g., platform as a service, etc.) through which market participants can review promotional events. In some examples, the promotion event application circuitry 106 allows market participants access to granular, accurate market data alongside other business critical datasets in one platform.

In particular, the promotion analysis circuitry 102 is structured to implement a syndicated service that can centralize the processing of promotion-related information from retail establishments in a substantially similar manner to enable market participants to retrieve promotion analysis results for their respective products and/or stores and/or those of competitors from one location (e.g., the promotion event application circuitry 106). The promotion event application circuitry 106 of FIG. 1 is a centralized platform that can be used to access information stored in the events database(s) 104. The promotion analysis circuitry 102 provides unified promotion language while representing local execution. That is, the promotion event application circuitry 106 facilities display of detected events in an approachable user interface that focuses on important events and updates across a market participant's product as well as those of competitors (e.g., competitive items). Accordingly examples disclosed herein provide accurate and details of promotional events executed in a market with little to no input from the market participants, saving the market participants significant costs, time, and resource consumption.

To detect promotion activity and analyze completed promotional events, the promotion analysis circuitry 102 receives, processes, and/or unifies data from different sources to create and accurately detect promotion events that actually occurred in a market and deliver promotion event results in line with how the promotion events are planned. To do so, the promotion analysis circuitry 102 obtains information associated with one or more points of sale (e.g., a Website, a storefront, a warehouse, a distribution center, etc.). In particular, the promotion analysis circuitry 102 is communicatively coupled to an example sales data database 108 and an example market database 110 (via an example network 112). The promotion analysis circuitry 102 receives, retrieves, and/or otherwise obtains information (e.g., purchase data, point-of-sale volume data, seller demographic/descriptive data, stock keeping unit (SKU) number, product universal product code (UPC) and/or other product identifier code, etc.) from the sales data database 108 and/or the market database 110 and analyzes the information to determine promotion execution and consumer response. The analysis results can be used to determine an extent to which promotional activity contributed to past sales for different retailer stores and/or an extent to which the promotional activity may affect future sales.

The sales data database 108 is structured to collect and/or store point-of-sale (POS) sales data indicative of products sold in respective example stores 116. As used herein, sales data for a product includes, at least, sales volume (e.g., units), which refers to a number or amount of units sold in a given time period, and sales value (e.g., total sales), which refers to a monetary worth of the sales volume in the time period. For the sake of simplicity, examples disclosed herein are discussed with an assumption that the POS sales data corresponds to scan data associated with an electronic POS scanner system. However, the POS sales data can correspond to any sales data (e.g., sales volume, sales value, etc.) representing products sold at a store over a particular period of time, such as retail audit data, consumer panel sales data, etc. The POS sales data is raw data collected by a POS terminal during sales transactions, and needs to be processed and analyzed to reveal actionable insights. Each product in the POS sales data may be associated with a stock keeping unit (SKU), which is a unique code that a respective store 116 assigns to the respective product. That is, a SKU is unique to the product and to the store 116.

In the illustrated example, the sales data database 108 is communicatively coupled to the stores 116 and/or any other monitored seller stores to collect sales data therefrom. Each of the stores 116 may persist sales data in local servers (not shown) that are communicatively coupled to POS terminals at checkout counters used to perform sales transactions. In this manner, sales data from all transaction logs can be communicated to the sales data database 108 in an automated manner with minimal or no human interaction. In this example, the stores 116 provide daily, product-level sales data for storage in the sales data database 108 on a period (e.g., weekly) basis. For example, the stores 116 can provide the daily product-level sales data for a given Monday through Sunday (e.g., a movement week extending Monday through Sunday) on the respective Sunday. However, the stores 116 can provide the sales data based on any periodic and/or aperiodic basis and at different levels of granularity (e.g., daily, weekly, etc.).

The market database 110 includes analyzed and/or processed data (e.g., based on raw data that was collected from a plurality of sources). For example, the market database 110 may be associated with a market research entity that collects, cleanses, and/or aggregates market information from different sources and stores corresponding retail measurement data in the market database 110. The market data in the market database 110 of FIG. 1 is collated into different dimensions including (but not limited to) a market dimension, a product dimension, a facts dimension, and a time dimension. The time (e.g., period) dimension can include an indication of a data period(s) during which a product was purchased by a consumer, how frequently data is received from a source (e.g., weekly, monthly, etc.), etc. In some examples, each period is associated with a respective, unique period identifier (ID).

The market dimension includes an indication of where product purchases are made (e.g., country, region, province, city, etc.) and can be organized according to characteristics of stores within each market, such as channels (e.g., drug, mass merchandise, convenience, grocery, etc.), geographical areas (e.g., a country, regions in a country, etc.), etc. In some examples, the markets in the market dimension are predefined, each being associated with a respective, unique market identifier (ID). In some examples, a market includes one or more stores, each of which is associated with a respective, unique store identifier (ID).

The facts dimension can include metrics for respective markets, stores, and/or periods, such as how much product was sold during a period, sales value, value share, product price, baseline data, regular price, etc. In some examples, the metrics (e.g., facts) are captured to facilitate analysis of sales performance across products, markets, and/or time. As used herein, a baseline (e.g., baseline data, base data, etc.) refers to expected sales (e.g., volume, value, etc.) for a respective product in the absence of promotional activity. That is, the baseline for a product is a statistically calculated measure to determine the expected sales for the product. The baseline data is based on non-promotional historical sales data prior to a given promotional event that can indicate what sales would likely have occurred during a promotion period if the promotion had not been run. In some examples, the baseline data is used to identify promotional sales and determine incremental sales, sales uplift, promotional efficiency, etc.

The product dimension can include characteristics and/or attributes used to arrange or organize products, such as product classifications (e.g., category, manufacturer, brand) and/or physical attributes of the products (e.g., segments) (e.g., size, flavor, packaging type). In some examples, the product dimension includes product information indicative of products and/or services offered for sale by respective retailers. For example, the product dimension can include a plurality of products with corresponding details including, but not limited to, product-level hierarchy information, product descriptions, market breakdown, total weekly sales value and units sold, distribution values, etc. In some examples, the market database 110 includes data for over 50 million products. In some examples, products stored in the market database 110 are associated with more than 5,000 product facts (e.g., characteristics, data, etc.) with detailed and enhanced data, including volume, share, distribution, price, promotion, etc. In some examples, product information can be accessed by market, store, category, period, channel, region, province, city, manufacturer, etc.

In some examples, each product is associated with at least one respective, unique product identifier (ID) such as (but not limited to) a universal product codes (UPCs), international article numbers (EANs), SKUs, barcodes, etc. A UPC is a unique code assigned to a particular product that remains constant, regardless of where and/or how a product is sold. In other words, the term "UPC" refers to a specific product (e.g., item, service, good, etc.) that can be sold across periods, markets, and stores. The UPC for the product can be associated with other identifiers for the product used by other entities such that the UPC can be identified by the promotion analysis circuitry 102 across different data sets from different resources. In particular, the promotion analysis circuitry 102 can identify a product in the POS sales data by identifying a UPC that corresponds to a particular SKU.

In some examples, a UPC in the product dimension of the market database 110 can be associated with several prices, each corresponding to a different offering time (e.g., a different week) at which the product's price was lower or higher than usual. For example, week-long product promotion involving a reduced price will be reflected in a week-price data set stored in association with the UPC. The promotion analysis circuitry 102 can utilize price data for the UPC in the sales data database 108 for a particular period and corresponding UPC price data in the market database 110 to identify promotion events in the sales data. For example, if a UPC price identified in the sales data is lower than a previous price for the UPC indicated in the market database 110, the promotion analysis circuitry 102 can flag the UPC for the period as a promoted UPC.

In some examples, the promotion analysis circuitry 102, the events database 104, the promotion event application circuitry 106, and/or the market database 110 of FIG. 1 are implemented by an example market research entity (MRE) 114, which is an entity that collects and/or analyzes market data to generate actionable insights. For example, the MRE 114 of FIG. 1 can extract data from the market database 110 and provide the data in a data structure that can be manipulated. In particular, the data structure provides or facilitates functions (e.g., select columns, filter, join, aggregate, etc.) that allow the promotion analysis circuitry 102 to detect and analyze promotion events. In some examples, the MRE 114 of FIG. 1 is implemented by one or more servers, such as a physical processing center, an example cloud or Edge network (e.g., Amazon Web Services® (AWS)). In some examples, the MRE 114 includes a cloud-based architecture that integrates data assets and analytics into a platform.

The environment 100 of FIG. 1 also includes example data collectors 118, which are communicatively coupled to the market database 110 via the network 112. In particular, the data collectors 118 are electronic devices and/or persons associated with electronic devices. The data collectors 118 collect and transmit data to the market database 110, such as causal data identifying causal promotions for one or more products at one or more points of sale (e.g., the stores 116). The causal data can include, but is not limited to, feature promotion data (e.g., newspaper feature advertisement data, etc.), in-store (and/or other point of sale, such as online website) promotions such as displays, other marketing efforts/activity to increase sales (e.g., through television and/or other media advertising, etc.), etc. For example, the causal data can include offer type, offer language, requirements for the promotion, etc. The causal data can be manually gathered, reviewed, and/or entered into the into the market database 110 (e.g., by the data collectors 118) and/or can be automatically extracted based on POS sales data (by the promotion analysis circuitry 102 and/or another electronic device).

In this example, the causal data is coded (e.g., correlated, etc.) in the market database 110. For example, causal data for a particular promotion can be associated with corresponding information (e.g., a product(s), a period(s), a store(s) market, etc.) in the same and/or another database. Thus, the promotion can be associated with a corresponding product ID (e.g., UPC), store ID, and/or market ID in the market database 110, enabling flagging of promotions in sales data provided by the stores 116. In some examples, the promotion analysis circuitry 102 can use the causal data to identify whether a product was on promotion for a particular period (e.g., based on a store the product is sold in). A product is considered "on-promotion" if there is an observed presence of at least one promotion activity (e.g., promotion trigger) in store in which the product in sold. As used herein, promoted or promotional sales refer to product sales associated with promotional activity, while non-promoted sales are product sales sold through stores without promotion activity.

Promotions can vary by country, market, retailer, etc. with regard to promotional types, how promotion is defined, promotion mechanics, promotion characteristics, etc. Examples of promotions include, but are not limited to, display, feature, temporary price reduction (TPR), promoted barcode, cashback, gift with purchase, etc. As used herein, a display refers to a temporary selling exhibit at a temporary location (e.g., at the front of the store, at the end of an aisle, etc.) where retailers make a deliberate effort to call attention to a specific product to drive sales. As used herein, a feature refers to a retailer-specific communication that highlights or advertises a specific item(s) with the intent to drive sales. As used herein, a TPR refers to a temporary decrease in the price of an item (e.g., a discount). In some examples, display type promotions and feature type promotions are considered causal promotions. Typically, TPRs are identified in market data provided by retailers while features and displays can be identified by data collectors. As used herein, a promotion type refers to one of display, feature, TPR, or promoted barcode, while promotion mechanics (sometimes referred to herein as promotion characteristics and/or promotion schedules) refers to one or more promotion types utilized for a promotion run.

FIGS. 2A-2G illustrate example retailer scan weeks (e.g., movement weeks) 202-214, respectively, indicative of product sales at an example store. In particular, the example retailer scan weeks 202-214 (illustrated in the highlighted days) represent sales data for different, offset seven day periods. The retailer scan weeks 202-214 are typically determined by the store and consistent across time. Movement data (e.g., sales data, product volume/value sales data) in the retailer scan weeks 202-214 typically aligns with the stores own internal POS data and with the stores own internal reports.

FIGS. 2A-2G also illustrate example reporting weeks 216, 218. In this example, the reporting weeks 216, 218 correspond to respective seven day periods leading up to the outlined blocks. That is, the outlined blocks correspond to an end of a period at which sales data for the seven day period is summarized e.g., by the promotion analysis circuitry 102), commonly referred to as a week ending (WE). In particular, the promotion analysis circuitry 102 summarizes the movement data in the retailer scan weeks 202-214 into the reporting weeks 216, 218. Typically, the reporting weeks 216, 218 are defined in a consistent matter across time such that a reporting week 216, 218 covers a same amount of time regardless of when a given reporting week 216, 218 is generated. For example, a year may include 52 reporting weeks defined as a given Monday to a subsequent Sunday. Doing so enables consistent aggregation across by the promotion analysis circuitry 102 across stores, retailers, markets, time periods, etc.

In some examples, data obtained from different sources align with the reporting week 216, 218 as defined by the promotion analysis circuitry 102. For example, FIG. 2A illustrates an example retailer scan week 202 that extends from Sunday until Saturday in an example first calendar week 220. FIG. 2A also illustrates example reporting week 216 that summarizes movement data for the retailer scan week 202. The reporting week 216 summarizes sales data that extends from the Sunday until the Saturday in the first calendar week 220. Thus, the retailer scan week 202 aligns with the reporting week 216 such that no day of the retailer scan week 202 offset (e.g., before or after) relative to the reporting week 216.

In some examples, however, data obtained from other sources may not align with the reporting week 216, 218 as defined by the promotion analysis circuitry 102. That is, sales data in a given retailer scan week as provided by the store may be misaligned relative to a respective reporting week. FIG. 2B, for example, illustrates another example retailer scan week 204 that extends from the Monday in the first calendar week 220 through a Sunday in an example second calendar week 222. Similarly, FIG. 2C illustrates another retailer scan week 206 that extends from the Tuesday in the first calendar week 220 through the Monday in the second calendar week 222. Thus, the retailer scan weeks 204, 206 of FIGS. 2B and 2C include sales that occurred after the reporting week 216. This misalignment can result in inaccurate and/or ineffective insights that are extracted from the retail scan data.

In some examples, the promotion analysis circuitry 102 can "clean" the movement data in the retailer scan weeks 204, 206 of FIG. 2B-2C such that the movement data aligns with the reporting week 216. That is, the promotion analysis circuitry 102 can move certain sales data datapoints corresponding to the Sunday and/or the Monday in the second calendar week 222 to the reporting week 216 summary. In other words, the promotion analysis circuitry 102 aligns retailer scan weeks 202, 204, 206 that run from Sunday-Saturday, Monday-Sunday, and/or Tuesday-Monday in the first and second calendar weeks 220, 222 to the Saturday in the first calendar week 220. Considerations for alignment of movement data can include a number of calendar days represented by movement within each reporting week and timing of receipt of the movement data.

FIGS. 2D-2G illustrate another example reporting week 218 that corresponds to a Saturday in the second calendar week 222. FIG. 2D illustrates an example retail scan week 208 extends from the Wednesday in the first calendar week 220 through Tuesday in the second calendar week 222. FIG. 2E illustrates another example retail scan week 210 that extends from the Thursday in the first calendar week 220 through Wednesday in the second calendar week 222. FIG. 2F illustrates yet another example retail scan week 212 that extends from the Friday in the first calendar week 220 through Thursday in the second calendar week 222. Similarly, FIG. 2G illustrates yet another example retail scan week 214 that extends from the Saturday in the first calendar week 220 through Friday in the second calendar week 222. Thus, each of the retail scan weeks 208-214 in FIGS. 2D-2G includes more days in the second calendar week 222 than the first calendar week 220.

In some examples, the promotion analysis circuitry 102 cleans the movement data in the retail scan weeks 208-214 of FIG. 2D-2G such that the movement data aligns with the reporting week 218 in the second calendar week 222. That is, the promotion analysis circuitry 102 can move certain sales occurring on the Wednesday, Thursday, Friday, and/or Saturday in the first calendar week 220 to the reporting week 216 summary of the second calendar week 222. In other words, the promotion analysis circuitry 102 aligns the retail scan weeks 208-214 of FIG. 2D-2G to the Saturday in the second calendar week 222 (e.g., towards the ends of the respective movements week retail scan weeks 208-214). In some examples, upon alignment of the retail scan weeks 202-214 with the reporting weeks 216, 218, the promotion analysis circuitry 102 stores the aligned POS sales data in the sales data database 108 for subsequent use. For example, the promotion analysis circuitry 102 may replace original POS sales data in the sales data database 108 provided by the stores (e.g., stores 116 of FIG. 1) with the aligned POS sales data.

Figure 3:
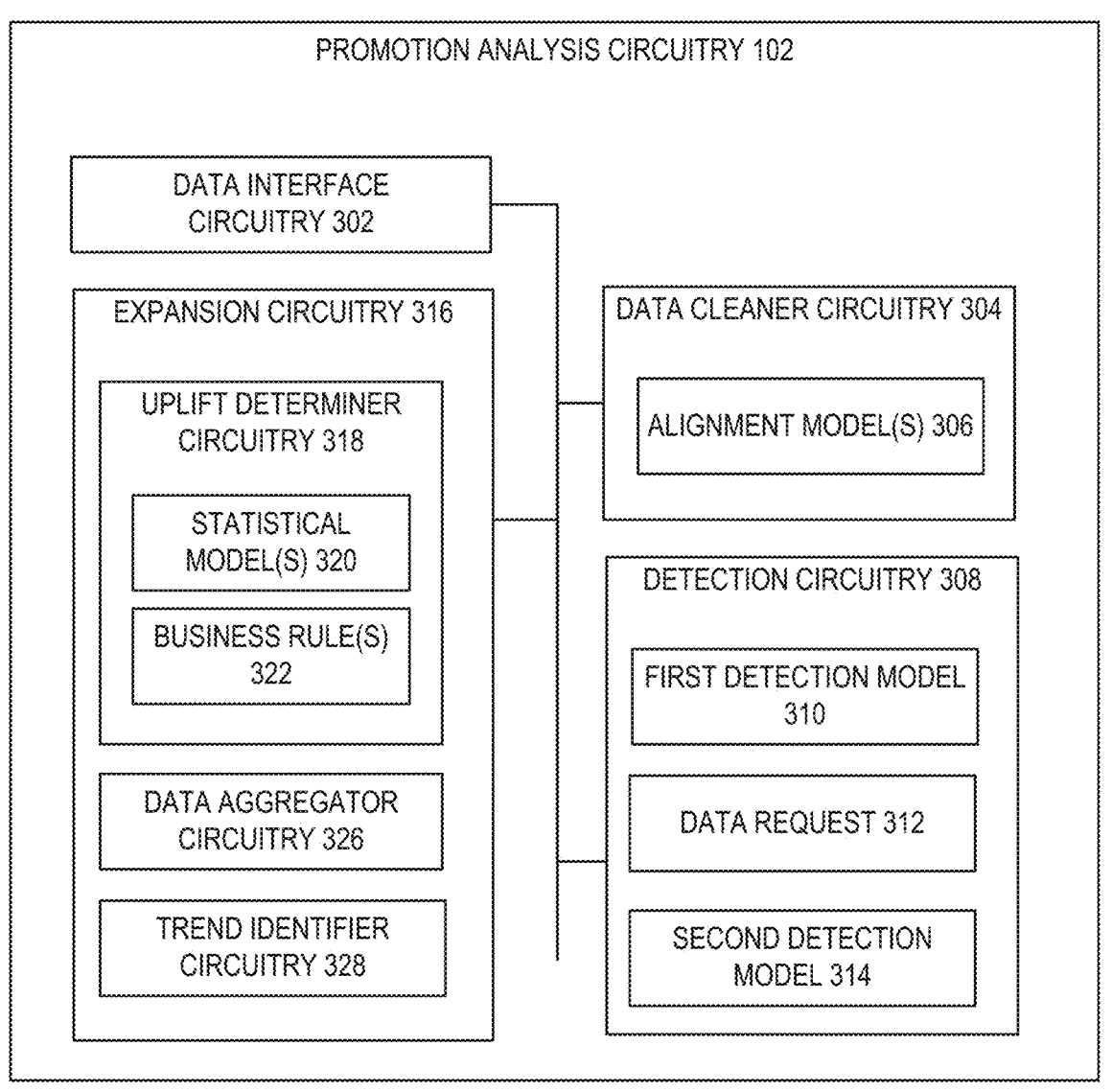
FIG. 3 is a block diagram of an example implementation of the promotion analysis circuitry of FIG. 1.

FIG. 3 is a block diagram of an example implementation of the promotion analysis circuitry 102 of FIG. 1 to detect and analyze promotional events. The promotion analysis circuitry 102 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the promotion analysis circuitry 102 of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers.

The promotion analysis circuitry 102 includes example data interface circuitry 302, which is structured to provide an interface through which the promotion analysis circuitry 102 can obtain (e.g., extract, receive, retrieve, etc.) data from the sales data database 108 (FIG. 1), the market database(s) 110 (FIG. 1), and/or another database(s). In some examples, the data interface circuitry 302 is instantiated by programmable circuitry executing interface instructions and/or configured to perform operations such as those represented by the flowchart(s) of FIGS. 9, 11, 13, 15, and 17-18.

The promotion analysis circuitry 102 includes example data cleaner circuitry 304, which is structured to adjust misaligned POS sales data obtained from the sales data database 108. In particular, the data cleaner circuitry 304 is structured to align causal data and product movement data to represent product volume (e.g., units) and value sold during a promotion run. In this example, the data cleaner circuitry 304 aligns the causal and movement data at both a store level and a market level. In some examples, the data cleaner circuitry 304 aligns the causal data and movement data at the store level or the market level. In some examples, the data cleaner circuitry 304 is instantiated by programmable circuitry executing data cleaner instructions and/or configured to perform operations such as those represented by the flowchart(s) of FIGS. 9-12.

The data cleaner circuitry 304 of FIG. 3 is structured to perform or execute data alignment projects, each of which correspond to a particular country, a particular product category and/or subcategory, a particular market, and a particular period(s). As used herein, the period(s) refers to a reporting period as defined by a market research entity (e.g., MRE 114) unless specifically stated otherwise. For the sake of simplicity, examples discussed below assume that a period as defined by the MRE 114 is a last day of a series of seven consecutive days for which sales data is summarized (unless specifically stated otherwise). However, it is understood that examples are not limited thereto. Rather, the period can refer to any period of time during which sales data is available (e.g., an hour, a day, a month, bi-month, a year, etc.). In some examples, the data cleaner circuitry 304 defines (e.g., creates, etc.) a data alignment project for execution, and assigns the data alignment project a unique project ID. Thus, a particular period may be associated with multiple project IDs corresponding to different countries, markets, and product categories.

In the illustrated example of FIG. 3, the promotion analysis circuitry 102 includes one or more example alignment models 306. As noted above, promotions can be defined differently depending on, for example, a country in which the promotion was run. In some examples, different ones of the alignment models 306 can correspond to different respective countries. In some examples, the data cleaner circuitry 304 of FIG. 3 identifies a project ID for a data alignment project and identifies which alignment model 306 to utilize for the given data alignment project based on the project ID. In some examples, the data cleaner circuitry 304 includes one alignment model 306 for which parameters can be adjusted based on data corresponding to the project ID.

The data cleaner circuitry 304 obtains sales data from the sales data database 108 and retrieval measurement data from the market database 110 based on the project ID. For example, the data cleaner circuitry 304 can obtain, via the data interface circuitry 302, sales data corresponding to the period, UPCs associated with the product category, and store IDs associated with the market ID. In some examples, the sales data includes sales data for different product/store combinations (e.g., product-store, UPC-store, etc.). For example, the sales data can include UPC-store level data, such as (but not limited to) UPC-store volume data, corresponding UPC-store value data, and UPC-store causal indicators (e.g., display and/or feature indicators, other causal indicators, etc.).

Further, the data cleaner circuitry 304 obtains, via the data interface circuitry 302, certain retail measurement data from the market database 110 that corresponds to the UPCs associated with the product category ID and to the store IDs associated with the market ID. In some examples, the retail measurement data includes UPC-store baseline data, such as (but not limited to) UPC-store baseline volume data, UPC-store baseline value data, UPC-store baseline price data, etc. In some examples, the sales data and the retail measurement data obtained for the project ID is provided in a data structure, such as (but not limited to) a data frame (e.g., a table having rows and columns, etc.), a spreadsheet, a data cube, and/or another type of data structure in which to manipulate data.

In operation, the data cleaner circuitry 304 of FIG. 3 adjusts or realigns misaligned UPC-store sales data in the data structure for the project ID. That is, for different UPC and store ID combinations, the data cleaner circuitry 304 applies the alignment model 306 to identify and realign the respective misaligned UPC-store sales data. In some examples, the alignment model 306 identifies misaligned UPC-store sales data based on promotion activity occurring at the store for the UPC. The promotional activity can be, for example, causal activity (e.g., a display and/or a feature), a TPR, etc. In particular, the data cleaner circuitry 304 is structured to move incremental sales driven by a particular promotion to a reporting week that includes an indicator (e.g., a flag) for the particular promotion.

As discussed in relation to FIGS. 2A-2G, the promotion analysis circuitry 102 is structured to align sales data with respective reporting weeks. In some examples, however, stores run promotions that are non-aligned relative to the retail scan/reporting weeks. For example, a retail scan week provided by a store may run from a given Sunday to a following Saturday. In some such examples, the store may run a promotion that extends from a middle the retail scan week (e.g., a Wednesday) until a middle of a following retail scan week (e.g., a following Tuesday). That is, a promotion period (e.g., a promotion week) is offset relative to the retail scan week. During a promotion, more units of a product are typically sold relative to a non-promotion period. Thus, it is important to align the promotion week with the retail scan week.

Figures 4A, 4B, 4C, 4D:
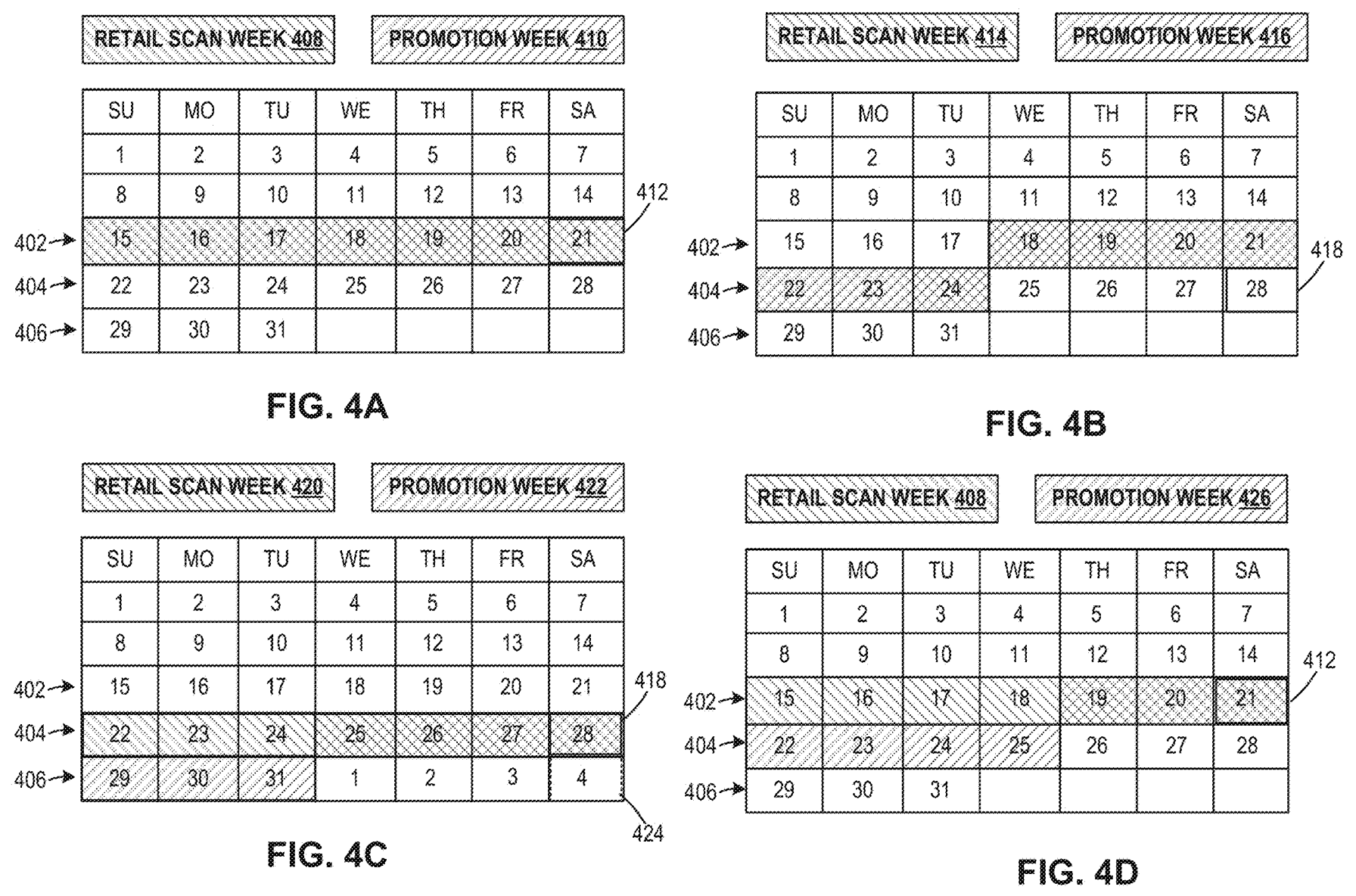

To illustrate misalignment of UPC sales data with promotional activity, FIGS. 4A-4D show an example first calendar week 402, an example second calendar week 404, and an example third calendar week 406, each of which extends from Sunday to Saturday. As illustrated in FIG. 4A, an example retail scan week 408 extends from Sunday in the first calendar week 402 to Saturday in the first calendar week 402. The retail scan week 408 is aligned with an example promotion week 410, which also extends through the first calendar week 402. Thus, sales data reflected in the retail scan week 408 will accurately reflect sales in view of promotional activity during the promotion week 410. Further, the retail scan week 408 and the promotion week 410 both align with an example reporting week 412. In this example, the data cleaner circuitry 304 of FIG. 3 would not need to re-align the sales data corresponding to the retail scan week 408 with the promotion week 410 nor the reporting week 412.

FIG. 4B illustrates another example retail scan week 414 and another example promotion week 416, each of which extend from a Wednesday in the first calendar week 402 to a Tuesday in the second calendar week 404. Thus, the retail scan week 414 is aligned with the promotion week 416 and sales data reflected in the retail scan week 414 will accurately reflect sales in view of promotion activity during the promotion week 416. In this example, the data cleaner circuitry 304 of FIG. 3 would not need to re-align the sales data corresponding to the retail scan week 408 with the promotion week 410. However, the data cleaner circuitry 304 may determine to align the retail scan week 414 and promotion week 416 with the reporting week 418, which summarizes sales in the second calendar week 404.

FIG. 4C illustrates another example retail scan week 420, which extends from a Sunday in the second calendar week 404 to a Saturday in the second calendar week 404, and another promotion week 422, which extends from a Wednesday in the second calendar week 404 to a Tuesday in the third calendar week 406. As illustrated, the retail scan week 420 is misaligned relative to the promotion week 422, but aligned relative to the reporting week 418. That is, the retail scan week 420 includes four days of sales data that align with the promotion week 422 and which are represented in the reporting week 418. The reporting week 418 would typically include a causal promotion flag. However, three days of sales data from the promotion week 422 are in another example reporting week 424 corresponding to a Saturday in the third calendar week 406. In this example, the reporting week 424 would typically include a TPR flag due to a lower sales value that would be reflected in the reporting week 424. Accordingly, the data cleaner circuitry 304 may determine to move at least some volume and value sales data from another example retail scan week 420 that corresponds to the third calendar week 406 to the reporting week 418 to account for the misaligned retailer scan week 420 and promotion week 422. In doing so, all seven days of the promotion week 422 can be captured in one reporting week 418 for better insight into promotional effectiveness.

FIG. 4D illustrates the retail scan week 408 of FIG. 4A (extending through the first calendar week 402), which is aligned relative to the reporting week 412 of FIG. 4A. FIG. 4D also illustrates another example promotion week 426 that extends from a Thursday in the first calendar week 402 to a Wednesday in the second calendar week 404, which is misaligned relative to the retail scan week 408 and the reporting week 412. That is, the retail scan week 408 includes three days of sales data that align with the promotion week 426 and which are represented in the reporting week 412. In particular, the reporting week 412 includes a first day of the promotion (e.g., the Thursday in the second calendar week 404) and two days that are generally considered the busiest trade days (e.g., Friday and Saturday). However, four days of sales data from the promotion week 426 are in the subsequent reporting week 418 corresponding to a Saturday in the second calendar week 404. Accordingly, the data cleaner circuitry 304 may determine to move at least some volume and value sales data from the retail scan week 408 of FIG. 4D to the reporting week 412 to account for the misaligned retailer scan weeks 408 and promotion weeks 426.

Referring again to FIG. 3, at least one goal of the data cleaner circuitry 304 is to move misaligned promotional sales to a reporting week having a corresponding promotional flag. Using the sales data and the retail measurement data corresponding to the project ID, the data cleaner circuitry 304 selects a first UPC (e.g., of the UPCs associated with the product category) having sales data associated with a first store ID (e.g., of the store IDs associated with the market ID), and identifies corresponding first UPC-store volume and first UPC-store value data. Further, the data cleaner circuitry 304 identifies first UPC-store baseline volume and value data. The data cleaner circuitry 304 determines an actual price (e.g., an observed price, a real price, etc.) for the first UPC as sold at the first store based on a ratio of the first UPC-store value to the first UPC-store volume. As used herein, actual price refers to a calculated priced for a particular period based on sales data for the period. Similarly, the data cleaner circuitry 304 determines a baseline price (e.g., a base price, a theoretical price, etc.) for the first UPC based on a ratio of the first UPC-store baseline value to the first UPC-store baseline volume. That is, the baseline price is a statistical measure based on historical sales corresponding to the first store.

In some examples, the data cleaner circuitry 304 determines whether the UPC was promoted during the period corresponding to the project ID. For example, the data cleaner circuitry 304 can determine whether the UPC-store sales are associated with a causal promotion based on causal data in the POS sales data (e.g., a promotion indicator provided by a POS system), based on causal data in the market database 110 (e.g., provided by the data collectors of FIG. 1), and/or based on the UPC-store sales data. For example, the data cleaner circuitry 304 can determine whether a TPR (e.g. a discount) can be identified in the UPC-store sales data. The TPR is identified when POS sales data shows a (e.g., pre-defined, threshold) reduction from the actual price relative to the baseline price. In particular, the data cleaner circuitry 304 can determine an example promotion price index (ppi) in a manner consistent with example Equation (1) (e.g., function, algorithm, etc.). The data cleaner circuitry 304 can identify a discount in a manner consistent with example Equation (2).

$$ppi = \frac{\text{actual price}}{\text{baseline price}} \qquad \text{Equation (1)}$$

$$\text{discount} = 1 - ppi \qquad \text{Equation (2)}$$

The ppi and/or the discount can be compared to respective threshold values, which may vary by market, country, etc., to identify a discount. In some examples, an example ppi threshold is approximately 0.95 and an example discount threshold is appropriately 0.05 or 5%. However, the ppi threshold and/or the discount threshold is not limited thereto, and can be higher or lower depending on the market, country, etc.

When the data cleaner circuitry 304 identifies a promotion that is not indicated in the UPC-store sales data, the data cleaner circuitry 304 adds such a flag, which is to be included in an aligned sales data set. For example, when the data cleaner circuitry 304 of FIG. 3 determines the UPC-store sales data corresponds to a causal promotion for the period, the data cleaner circuitry 304 flags the UPC-store sales data as associated with a causal promotion. In some examples, the data cleaner circuitry 304 flags UPC-store sales data as associated with a TPR promotion type when the ppi satisfies a ppi threshold and/or the discount satisfies the discount threshold but no causal promotion is identified.

The data cleaner circuitry 304 of FIG. 3 is structured to input a (e.g., misaligned) data set(s) associated with the project ID into the alignment model(s) 306, with an indication of the country, a level of granularity (e.g., store level or market level), and a shift direction (e.g., forward shift or backwards shift). The shift direction refers to whether the alignment model 306 is to move promotional sales to a given week from (a) a previous week (e.g., a forward shift) or (b) a subsequent week (e.g., a reverse shift). For example, when the previous week if flagged as a TPR and the given week is flagged as a causal promotion, the data cleaner circuitry 304 can determine to shift promotional sales of the previous week forward to the given week. In some examples, the data cleaner circuitry 304 can determine to shift promotional sales from a subsequent week backwards to the given week, such as when the given week is flagged as display type promotion and the subsequent week is flagged as a TPR type promotion due to misalignment. When the shift direction is backwards shift, the data set is re-sorted (e.g., reversed) to be in a forward format. Thus, both directions can be handled in the same manner, with the data sets being reverse. Unless explicitly stated otherwise, examples discussed herein assume a shift is a forward shift.

At the store level, the data set includes the UPC-store sales data and the corresponding retail measurement data. Thus, the store-level data set can include, at least, UPC-store sales volume, UPC-store sales value, UPC-store baseline volume, and UPC-store baseline value. At each level of granularity, the alignment model(s) 306 is executed twice, once to align UPC-store volume and once to align UPC-store value. That is, the UPC-store volume is moved independently of the UPC-store value. For the sake of simplicity, examples discussed below are described for execution of the UPC-store volume alignment. However, it is understood the UPC-store value alignment is similarly executed.

In operation, the alignment model 306 determines an example sales increment(s) (inc) corresponding to the first UPC and the first store ID based on the first UPC-store sales data. In particular, the alignment model 306 determines an example UPC-store volume increment by subtracting the UPC-store volume from the UPC-store baseline volume. Typically, the UPC-store baseline volume is less than or equal to the UPC-store volume, leading to positive sales increments. In some examples, the UPC-store baseline volume can be higher than the UPC-store sales volume, indicating negative increments. In some such examples, the data cleaner circuitry 304 sets the corresponding incremental data to zero because negatives increments are not desired.

When a promotional week and a retail scan week are misaligned, the alignment model 306 as applied by the data cleaner circuitry 304 identifies UPC-store volume missing from a flagged promotional week and moves the missing UPC-store sales volume from an adjacent week to the promotion week, being careful to leave at least the UPC-store baseline volume in the adjacent week. The alignment model 306 determines how much volume (e.g., how many units) is missing from the promotional week based on the sales increment data (e.g., the UPC-store volume increment) as well as an example promotional week importance weighted adjustment (PWIWA). The PWIWA represents a percentage of promotional sales that are correctly flagged in the promotional week. For example, promotional sales are correctly flagged when the promotional sales align with causal data.

To determine the PWIWA, a daily percentage of sales of a total week per country is needed. In some examples, the daily percentage can be determined based on household panel data and/or other sales data that is available on a daily level. In some examples, the daily percentage is stored in the market database 110 and obtained by the promotion analysis circuitry 102. When the alignment model 306 determines that one or more days are correctly flagged, the alignment model 306 adds corresponding daily percentages to the PWIWA. In a promotional flagged week, the sales increment (inc) is defined as a real increment (ri) times the PWIWA (p). That is, the real increment (ri) is defined by a function consistent with example Equation (3).

$$ri = \frac{inc}{p} \qquad\qquad \text{Equation (3)}$$

The alignment model 306 determines an example missing increment (mi) (e.g., missing incremental volume and/or missing incremental value), which is sales increments missing from a promotional flagged week due to misalignment of a promotion and a reporting week. In particular, the alignment model 306 determines the missing increment (mi) in a manner consistent with example Equation (4). In some examples, the missing increment can be determination can be simplified using an example factor (f), which is represented by example Equation (5).

$$mi = (1 - p) \cdot ri = \frac{1 - p}{p} \cdot inc \qquad \text{Equation (4)}$$

$$f = \frac{(1 - p)}{p} \qquad\qquad \text{Equation (5)}$$

The alignment model 306 of FIG. 3 adds UPC-store sales data only to promotional flagged weeks, but can take UPC-store sales data from adjacent promotional and/or non-promotional weeks. Further, the alignment model 306 of FIG. 3 moves less than the UPC-store baseline volume from the adjacent week. Based on the foregoing, the alignment model 306 compares the missing incremental volume determined for the period corresponding to the project ID with an increment volume associated with the adjacent (e.g., previous) period to determine an amount of volume to move from the previous week to the promotional flagged week. In particular, the alignment model 306 determines to a minimum of (a) the UPC-store volume increment of the adjacent week, and (b) the missing increment of the promotional flagged week. Because the UPC-store volume increment from the previous week corresponds to the previous week's UPC-store sales volume less the UPC-store baseline volume, the data cleaner circuitry 304 leaves at least the UPC-store baseline volume in the previous week.

The minimum of the UPC-store volume increment of the adjacent week and the missing increment of the promotional flagged week is moved from the adjacent week and added the promotional flagged week, and flagged as promotional sales in the period to which they are moved. Accordingly, all identified UPC-store sales volume corresponding to the same UPC, store ID, and week are flagged as the same promotion, before and after execution of the alignment model 306. In doing so, the alignment model 306 generates accurate UPC-store-period sales data. The data cleaner circuitry 304 of FIG. 3 stores the aligned UPC-store-period sales data corresponding to the project ID in the events database 104. In some examples, the data cleaner circuitry 304 stores other data corresponding to the project ID in the market database 110, such as the determined incremental data, the promotion flag(s), etc.

The data cleaner circuitry 304 of FIG. 3 applies the alignment model 306 to the original UPC-store value to determine new UPC-store value data (e.g., a new value). Using the new UPC-store volume and value, the data cleaner circuitry 304 can identify a new price (e.g., a new actual price). The actual price from the original UPC-store sales data, hereinafter referred to as the original actual price, can be quite different from the new actual price. This is at least partially because the original actual price is a mixture of promotional and non-promotional prices due to misalignment. For a single promotion that spans multiple weeks, it is expected that the original actual prices of the first and last weeks of the promotional period will change after the alignment model 306 (relative to adjacent prior and subsequent weeks, respectively), but not in other weeks. In some examples, these price inconsistencies result because UPC-store volume and value are moved independently of each other.

In some examples, the data cleaner circuitry 304 addresses these inconsistencies by applying an altered (e.g., modified) baseline algorithm to account for long promotions. To do so, the new actual price and the original actual price are considered when determining the missing increments, the move, and the add. For example, the data cleaner circuitry 304 can determine whether the aligned sales data satisfies pricing criteria. In some examples the pricing criteria is determined in a manner consistent with example Equations (6)-(9). In particular, the data cleaner circuitry 304 can determine whether a new volume (e.g., new volume and a new value satisfy an example Equation (6) to ensure that a "new" actual price is not greater than the corresponding baseline price. For example, when Equation (6) is not satisfied, the data cleaner circuitry 304 can determines a new value that satisfies Equation (6). The data cleaner circuitry 304 can redefine the new actual price in a manner consistent with example Equation (7). This definition replaces inequality (8). In doing so, the data cleaner circuitry 304 ensures that the ppi is not greater than one.

$$\text{new volume} \geq \frac{\text{new value}}{\text{baseline price}} \qquad \text{Equation (6)}$$

$$\text{new actual price} \geq \frac{\text{new value}}{\text{new volume}} \qquad \text{Equation (7)}$$

Further, a reporting week that does not include a promotion indicator (e.g., a non-promotion week, certain TPR weeks, etc.) should not have a new actual price that is lower than the original actual price. If possible, the new actual price of a TPR week should be approximately equal to the baseline price (e.g., at or close to the baseline price). Thus, new volume and new value for TPR and non-promotion weeks can be determined in a manner consistent with example Equation (8). In particular, actual price refers to the "new" actual price (e.g., which depends on whether example Equation (6) is satisfied by the new value and new volume). Typically, these equations are implemented during alignment for the UPC-store value.

$$\text{new value} \geq \text{new volume} * \text{actual price} \qquad \text{Equation (8)}$$

For promotional sales, promotional weeks that are flagged as feature and/or display should have a new actual price that is the same or lower than the original actual price. Thus, the data cleaner circuitry 304 identify whether the new value in a promotion week is consistent with example Equation (9). When Equation (9) is not satisfied, the data cleaner circuitry 304 can redefine "new" actual price in a manner consistent with Equation (7).

$$\text{new value} \leq \text{new volume} * \text{actual price} \qquad \text{Equation (9)}$$

In some examples, the alignment model 306 is structured to split or categorize a TPR promotion into a first portion (e.g., promotional TPR (TPRp)) and a second portion (e.g., non-promotional TPR (TPRn)). This is because the TPR promotion does not always exist due to misalignment, but can also exist as a promotion. In some stores, for example, TPR is the only promotion type utilized. To determine whether a TPR flagged week is a promotion, the previous and next weeks can be consulted. For example, when the previous week relative to a given TPR week is not a promotion (e.g., excluding a TPR-type promotion) and the next week relative to the given TPR week is a promotion (including a TPR-type promotion), the given TPR week is not designated as a promotion. Otherwise, the given TPR week is identified as a promotion and not a side effect of the misalignment. The detection circuitry 308 treats promotion type TPR, TPRp, as a causal promotion. Thus, sales can be moved from, and added to, the TPRp-flagged promotion week. A new actual price of a TPRp should be equal to or less than the original actual price prior to alignment. In some examples, the TPR is split only during an alignment process. For example, after the alignment model 306 is executed, the TPRp and TPRn are flagged back to TPR. In addition, TPRn flagged weeks that have a new ppi greater than 0.95 can be flagged as non-promotional weeks.

After the data cleaner circuitry 304 executes the alignment model 306 for the first UPC and the first store ID, the data cleaner circuitry 304 of FIG. 3 is structured to select a second store ID (of the store IDs associated with the market ID). Further, the data cleaner circuitry 304 is structured to identify corresponding second UPC-store volume, second UPC-store value data, and second UPC-store retail measurement data. The data cleaner circuitry 304 applies the alignment model 306 to the second UPC-store sales data to second UPC-store volume and to align second UPC-store value. In particular, the data cleaner circuitry 304 iteratively selects another store ID of the store IDs associated with the market ID and having sales of the UPC, and applies the alignment model 306 accordingly to determine new UPC-store volume and value data.

Further, the data cleaner circuitry 304 selects another UPC of the UPCs corresponding to the product category of the project ID and iterates through stores corresponding to the market ID, applying the alignment model 306 to each combination such that the data cleaner circuitry 304 cleans all the UPC sales data in the market for the period. The data cleaner circuitry 304 can iterate through UPCs associated with the product category of the project ID and through stores associated with the market to generate UPC-store-period data for the project ID. Further, the data cleaner circuitry 304 stores the aligned UPC-store sales data in the events database 104 and/or the market database 110 with an indication of the project ID.

As noted above, the data cleaner circuitry 304 of FIG. 3 is also structured to align movement and causal data at a market level. To do so, the data cleaner circuitry 304 aggregates (e.g., summarizes, projects, etc.) UPC-store sales data for a given project ID to a market level. In particular, the data cleaner circuitry 304 identifies a project ID for which to execute a market-level alignment process and generates market-level sales data. Similar to alignment at the store level, the market level alignment process is applied at the product (UPC) level. In some examples, the data cleaner circuitry 304 performs market-level alignment when the data cleaner circuitry 304 has iterated through each store associated with the market ID and which has sales data associated with a given UPC. In some examples, the data cleaner circuitry 304 performs market-level alignment when the data cleaner circuitry 304 has iterated through each UPC that corresponds to a product category for the project ID. In some examples, the data cleaner circuitry 304 performs market-level alignment in response to another trigger (e.g., a time-based trigger, an event based trigger, etc.).

In some examples, the data cleaner circuitry 304 selects a UPC associated with the project ID, identifies instances of aligned UPC-store-period data for the UPC, and aggregates the instances of the aligned UPC-store-period data to generate the market-level sales data for the UPC (e.g., UPC-market sales data). For example, the data cleaner circuitry 304 can identify and aggregate instances of UPC-store volume data for the product to generate UPC-market volume data. Similarly, the data cleaner circuitry 304 can identify and aggregate instances of UPC-store value data for the product to generate UPC-market value data.

Similar to the store-level granularity, the data cleaner circuitry 304 is structured to input a misaligned data set(s) associated with the project ID into the alignment model(s) 306, with an indication of the country, the level of granularity (e.g., market level), and a shift direction (e.g., forward shift or backwards shift). At the market level, the misaligned data set includes the UPC-market sales data and the corresponding retail measurement data. Thus, the market-level misaligned data set can include, at least, UPC-market sales volume, UPC-market sales value, UPC-market baseline volume, and UPC-market baseline value. As noted above, the alignment model(s) 306 is executed twice, once to align UPC-market volume and once to align UPC-market value. For the sake of simplicity, examples discussed below are described for execution of the UPC-market volume alignment. However, it is understood the UPC-market value alignment is similarly executed.

In operation, the alignment model 306 determines sales increments (inc) for the UPC-market sales data, including a UPC-market incremental volume and/or a UPC-market incremental value (e.g., by subtracting the UPC-market volume/value from the respective UPC-market baseline volume/value). Typically, the UPC-market baseline volume is less than or equal to the UPC-market volume, but can be higher in some examples (e.g., indicating negative increments). In these cases, the increments can be set to zero. The alignment model 306 as applied by the data cleaner circuitry 304 determines missing volume from a flagged promotional week based on the sales increment (e.g., the UPC-market incremental volume) and the example promotional week importance weighted adjustment (PWIWA). In particular, the alignment model 306 determines the missing increment in a manner consistent with the example Equations (3)-(6), above. Using the PWIWA, the sales increments of the promotional flagged week, and increments from an adjacent week, the data cleaner circuitry 304 determines total move for the UPC-market.

On the store level for a given period, each UPC-store combination includes one promotional flag that identifies the promotion mechanism (e.g., display only, feature only, TPR only, display and feature, display and TPR, feature and TPR, etc.). In some examples, different stores in a market may run different promotions for the UPC in a given period, and/or for different durations (e.g., extending over multiple periods). Thus, at the market level, a given period can be associated with more than one promotion flag. Each of the UPC-store combinations for the market and the period that include a promotion flag, also include a weight for each respective promotion. On the market level, the weights are used to determine how much UPC-market volume is moved from and/or added to the promotional types. The weights, which are relevant only for the market level, describe a percentage of a respective promotion of all promotions for the period and the market. For example, the data cleaner circuitry 304 determines an average length of each promotion at a store level to include in a weight of a given promotion. Doing so can prevent or reduce a tendency of the alignment model 306 to move more TPR sales into display and/or feature promotional sales on the market level relative to the UPC-store-period level. Thus, when applying the alignment model 306 at the market level, the data cleaner circuitry 304 takes more volume/value from the causal promotions and less from a TPR.

In some examples, the data cleaner circuitry 304 splits promotional sales associated with a TPR-type promotion into promotional TPR (TPRp) and non-promotional TPR (TPRn). The data cleaner circuitry 304 cannot utilize adjacent weeks on market level to determine a sales move value for TPR-type promotions. As such, the data cleaner circuitry 304 splits an identified TPR into TPRn and TPRp based on percentages. To determine an example percentage of TPRn (pTPRn), the data cleaner circuitry 304 utilizes store level data for each UPC and store. For all TPR sales per week, item, and market, TPRn and TPRp are determined in a manner consistent with example Equations (10) and (11).

$$TPR_n = TPR * pTPRn \qquad\qquad \text{Equation (10)}$$

$$TPR_n = TPR * (1 - pTPRn) \qquad\qquad \text{Equation (11)}$$

For each promotion identified, the data cleaner circuitry 304 determines an example move value using a respective total move and corresponding weight. The add part for the feature and/or display promotions is also determined with the total move and the weight. The alignment model 306 compares the missing increments to the sales increments. In particular, the alignment model 306 identifies a minimum of (a) the increments of the previous week or (b) the missing increments of the promotional flagged week, and determines to move the identified minimum from the previous week to the promotional flagged week. In the promotional flagged week, the added increments are flagged as promotional sales for the period to which they are moved. The new volume and value are determined by adding the add part and subtracting the move part for each UPC-market-period. Accordingly, all identified UPC-store sales volume corresponding to the same UPC, the same market, and the same week are flagged as the same promotion, before and after execution of the alignment model 306. In doing so, the alignment model 306 generates accurate UPC-market-period sales data.

The data cleaner circuitry 304 of FIG. 3 stores the aligned UPC-market-period sales data in the events database 104. In some examples, the data cleaner circuitry 304 iterates through each product corresponding to the product category having sales in the market ID corresponding to the project ID. In some examples, the data cleaner circuitry 304 stores other data corresponding to the project ID in the market database 110, such as the determined incremental data, the promotion flag(s), etc.

In some examples, the promotion analysis circuitry 102 includes means for aligning movement and causal data. For example, the means for aligning movement and causal data may be implemented by the data cleaner circuitry 304. In some examples, the data cleaner circuitry 304 may be instantiated by programmable circuitry such as the example programmable circuitry 1912 of FIG. 19. For instance, the data cleaner circuitry 304 may be instantiated by the example microprocessor 2000 of FIG. 20 executing machine executable instructions such as those implemented by at least blocks 900, 912, 1100, 1108 of FIGS. 9-12. In some examples, the data cleaner circuitry 304 may be instantiated by hardware logic circuitry, which may be implemented by an ASIC, XPU, or the FPGA circuitry 2100 of FIG. 21 configured and/or structured to perform operations corresponding to the machine readable instructions. Additionally or alternatively, the data cleaner circuitry 304 may be instantiated by any other combination of hardware, software, and/or firmware. For example, the data cleaner circuitry 304 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The promotion analysis circuitry 102 is structured to detect product-level promotional events (e.g., single-UPC events) using the aligned sales data and to group ones of the single-UPC events having similar execution to identify event-level promotions (e.g., multi-product events). In particular, the promotion analysis circuitry 102 includes example detection circuitry 308, which is structured to detect single-UPC events and durations thereof at a store-level granularity using internal and/or external promotion data, with results deliverable at a market level. The detection circuitry 308 includes an example an example first (e.g., product-level) detection model(s) 310, which is applied by the detection circuitry 308 to search aligned UPC-market-period sales data to identify consistent execution in promotion support and price offer to detect start and end points of the single-UPC events. Further, the detection circuitry 308 of FIG. 3 is structured to detect multi-product events by grouping together single-UPC events in similar reporting periods having similar metrics. In some examples, the detection circuitry 308 is instantiated by programmable circuitry executing event detector instructions and/or configured to perform operations such as those represented by the flowchart(s) of FIGS. 13-16.

The detection circuitry 308 is structured to perform or execute one or more detection projects, each of which can correspond to a particular country. In some examples, the detection circuitry 308 of FIG. 3 defines (e.g., creates, etc.) a detection project for which to execute a detection process, and assigns a respective, unique project ID to the detection project (e.g., hereinafter referred to as an detection ID to make clear that the detection process is separated from a project ID associated with a data alignment project). In particular, the detection circuitry 308 of FIG. 3 defines a detection project by identifying the country, and selecting a particular market (e.g., a market ID) and a particular product category corresponding to the country. In some examples, the country is used to define a database and/or dimension of a database from which to extract data for the detection process.

In particular, the detection circuitry 308 provides the detection project definition and data extraction details at the beginning of the detection process to extract the parameters that are needed. In some examples, the parameters are provided in an example data request(s) 312 (e.g., a data structure, a file, etc.). For example, the data request 312 may be a dictionary, such as a dictionary of key-value pairs that defines which data is to be extracted for the detection project. As noted above, promotions may be defined differently depending on, for example, a country in which the promotion was run. In some examples, the detection circuitry 308 extracts parameters for the detection process based on the selected country. In the illustrated example of FIG. 3, the detection circuitry 308 includes one or more example data requests 312, each of which can correspond to a respective country.

The data request 312 can include example detection parameters (e.g., default parameters and/or country-specific parameters), which are parameters that do not need to be changed from one detection project to another. In some examples, the default parameters include (but are not limited to) an example maximum event length, which can be bounded by an example minimum number of weeks (e.g., 3) to identify an event and/or an example maximum number of weeks (e.g., 16) to identify an event. In some examples, the maximum event length is based on a percentile of event lengths for the market and the product category (e.g., based on historical data). For example, the maximum event length can be calculated based on a 99th percentile and/or another percentile of events lengths per category-market. In other words, the maximum event duration for a category can be determined by market-category event behavior rather than, for example, historical data for a particular product. For example, sunscreen may be associated with longer promotions in a Midwest region of the United States during the summer relative to other products and/or markets. It is understood, however, that the data request 312 can include additional or alternative detection parameters defined in other manners.

In some examples, the country-specific parameters include an example TPR limit (e.g., 0.95). In some examples, the country-specific parameters include an example discount definition (e.g., greater than or equal to 0.05), an example discount minimum (e.g., 0.05), an example discount maximum (e.g., 0.70), and/or an example discount tolerance (e.g., 0.15). In some examples, the country-specific parameters include an example promotion distribution minimum (e.g., 0.05) and/or an example promotion distribution tolerance (e.g., 0.60). In some examples, the country-specific parameters include an example causal promotion minimum (e.g., 0.05), an example causal promotion maximum (e.g., 0.05) and/or an example causal promotion tolerance (e.g., 0.60). In some examples, the country-specific parameters include an example minimum incremental ratio.

The data request 312 can also include example detection ID-specific parameters that specify data to be extracted to run a project. In some examples, the detection ID-specific parameters include the country, the detection ID, the selected product category, the selected market (e.g., market ID), and a corresponding remaining (e.g., competitive) market (e.g., to obtain the category-market percentile). In some examples, the remaining market is associated with a competitive market ID. In some examples, the detection ID-specific parameters include an example end period (e.g., a last period to be analyzed), which is associated with a period ID available in the market database 110. For example, the end period can be a most recent reporting period for which an alignment process has been completed. However, the end period can be any desired period for which sales data is available. In some examples, the detection ID-specific parameters include a number of weeks (e.g. 26) in which to detect the single-UPC events. This is a duration of the detection period.

The detection circuitry 308 is structured to obtain, via the data interface circuitry 302, data corresponding to the data request 312. For example, the detection circuitry 308 obtains the data corresponding to the data request 312 from the events database 104 and/or the market database 110. In particular, the detection circuitry 308 obtains (e.g., aligned) sales data from the events database 104 as well as retail measurement data and/or causal data from the market database 110. That is, the detection circuitry 308 obtains all available UPC-store-period sales data from the events database 104 that is associated with the data request 312. Further, the detection circuitry 308 obtains baseline data and/or causal data that corresponds to the UPC-store-period sales data extracted from the events database 104. In this example, the detection circuitry 308 is further structured to extract UPC-store-period all commodity value (ACV) data for each UPC and period ID corresponding to the detection project. As used herein, ACV represents total sales of a store across all products for a given period.

In some examples, the detection circuitry 308 obtains the sales data, the retail measurement data, and/or the causal data by product (e.g., UPC), by store (e.g., store IDs associated with the market ID), and by period (e.g., period ID) such that the data is extracted and stored in an organized manner. That is, the data is extracted and/or organized by UPC, store ID, and period ID. Further, the detection circuitry 308 of FIG. 3 prepares the extracted data for detection process. For example, the detection circuitry 308 of FIG. 3 aggregates (e.g., summarizes) the extracted UPC-store-period sales data to the market level (e.g., UPC-market-period) to generate detection data. That is, the detection circuitry 308 sums, for each UPC-market-period combination, respective extracted UPC-store-period volumes to generate detection data volumes. Similarly, the detection circuitry 308 sums, for each UPC-market-period combination, respective extracted UPC-store-period values to generate detection data values. In some examples, the detection circuitry 308 generates an example data structure such as, but not limited to, a data frame, a hash table, a data cube, a graph, etc. in which to store detection data. For example, the data structure can be a data frame in which each column corresponds to a variable and each row corresponds to a particular a period (e.g., period ID) and a particular product (e.g., UPC) corresponding to the detection ID and the market ID.

The detection circuitry 308 of FIG. 3 splits (e.g., divides, separates, classifies, etc.) the extracted sales data according to a promotion type. For example, the detection circuitry 308 can split the extracted sales data into different promotion-type groups including (but not limited to) feature only (e.g., feature without display), display only (e.g., display without feature), display and feature (e.g., DF), TPR only (e.g., without feature or display), any TPR (e.g., TPR with or without feature and/or display), etc., each of which can be added as a respective column in the data frame. In some examples, the different promotion groups are based on the promotion indicators in the sales data and/or based on specific country.

Using the promotion-type groups, the detection circuitry 308 aggregates (e.g., summarizes) the sales data by combinations of (1) detection ID, (2) market ID, (3) UPC, and (4) period ID to generate the additional detection data. In doing so, the aggregated detection data is sorted by UPC and period ID for the particular detection ID and market ID selected for the detection project. For example, the detection circuitry 308 aggregates UPC-store-period volumes and UPC-store-period values for the different promotion types and stores the resultant detection data in respective columns and rows in the data frame. In some examples, the detection data includes feature-only volume (e.g., sum of sales volume of the stores selling the UPC on feature without display), feature-only value (e.g., sum of sales value of the stores selling the UPC on feature without display), DF volume (e.g., sum of sales volume of the stores selling the UPC on feature and display), DF value (e.g., sum of sales value of the stores selling the UPC on feature and display), display-only volume (e.g., sum of sales volume of the stores selling the UPC on display without feature), display-only value (e.g., sum of sales values of the stores selling the UPC on display without feature), TPR-only volume (e.g., sum of sales volume of the stores selling the UPC on TPR without display and/or feature), TPR-only value (e.g., sum of sales value of the stores selling the UPC on TPR without display and/or feature), any TPR volume (e.g., sum of sales volume of the stores selling the UPC on TPR with or without display and/or feature), and any TPR value (e.g., sum of sales value of the stores selling the UPC on TPR with or without display and/or feature), promotion volume (e.g., sum of sales volume of the stores selling the UPC on any promotion), and promotion value (e.g., sum of sales value of the stores selling the UPC on any promotion).

The detection circuitry 308 splits the extracted baseline data into promotion-type based groups, and aggregates UPC-store-period baseline volumes and UPC-store-period baseline values for each detection ID, market ID, UPC, and period ID combination corresponding to the detection project based on the promotion-type-based groups. Thus, the data frame can additionally include columns for feature-only baseline volume, feature-only baseline value, DF baseline volume, DF baseline value, display-only baseline volume, display-only baseline value, TPR-only baseline volume, TPR-only baseline value, any TPR baseline volume, any TPR baseline value, promotion baseline volume, and promotion baseline value.

The detection circuitry 308 splits the extracted ACV data into promotion-type-based groups, and aggregates the UPC-store-period ACV data for each detection ID, market ID, UPC, and period ID combination corresponding to the detection project based on the promotion-type-based groups. The data frame can include columns for ACV (e.g., sum of ACV of the stores selling the UPC), ACV feature (e.g., sum of ACV of the stores selling the UPC on feature, with or without display), and ACV promotion (e.g., sum of ACV of the stores selling the UPC on any promotion).

At this stage, the data frame includes a number of line items, each of which corresponds to a particular UPC, market ID, and period. Using the data in the data frame, the detection circuitry 308 derives additional detection facts (e.g., metrics) for each detection ID, market ID, UPC, and period ID and stores the additional detection facts in respective columns of the data frame. The detection facts are used to group line items (e.g., UPC-market-period combinations) corresponding to the same UPC and market that have consistent execution in support and price offer to detect start and end points of promotion events. In particular, for each detection ID, market ID, UPC, and period ID combination, the detection circuitry 308 determines and/or identifies an example promotion price (e.g., a ratio of promotion value to promotion volume), an example discount, an example percent of promotional baseline units (e.g., a ratio of promotion baseline units to baseline units), a percent of display-only baseline units (e.g., a ratio of display-only promotion baseline units to baseline units), an example percent of feature-only baseline units (e.g., a ratio of feature-only promotion baseline units to baseline units), and an example percent of DF baseline units (e.g., a ratio of DF promotion baseline units to baseline units).

The detection circuitry 308 iterates through the data frame to identify promotion weeks. The detection circuitry 308 can identify a promotion week based on a discount and/or based on causal data. In particular, the detection circuitry 308 identifies the promotion week(s) by comparing a discount variable(s) in the data frame to a discount parameter(s) in the data request 312. For example, the detection circuitry 308 identifies a given line item as a discount week when a corresponding value in a discount column of the data frame satisfies the discount parameter(s) in the data request 312. When the detection circuitry 308 identifies the discount week, the detection circuitry 308 tags the given line item as a promotion week.

The detection circuitry 308 is structured to detect low UPC inventory (including out-of-stock) for a discount week. In some examples, the detection circuitry 308 identifies a given line item as a low inventory week when a respective UPC-market-period sales volume is less than or equal to an example factor (e.g., 0.1) times a corresponding UPC-market-period baseline volume. In some examples, the detection circuitry 308 flags the corresponding row a low inventory week upon such detection.

When the detection circuitry 308 does not determine that a given line item is associated with discount week and/or when the line item is not associated with a low inventory, the detection circuitry 308 identifies whether the line item is associated with causal week. In particular, the detection circuitry 308 of FIG. 3 identifies the line item as a causal week when (a) a summation of a corresponding percent of feature-only baseline volume, a corresponding a percent of DF baseline volume, and a corresponding percent of display-only baseline volume satisfies the discount parameters in the data request 312, (b) a corresponding promotion volume satisfies the incremental ratio parameters in the data request 312 times the respective promotion baseline volume, and (c) a summation of display-only sales volume, feature-only sales volume, and DF sales volume satisfies the incremental ratio parameters in the data request 312 times a summation of display-only baseline volume, feature-only baseline volume, and DF baseline volume. When the detection circuitry 308 identifies the causal week, the detection circuitry 308 tags the corresponding row as a promotion week.

The detection circuitry 308 iterates through the line items of the data frame and tags line items associated with a promotion week. In this example, the detection circuitry 308 removes line items that are not determined to be promotion weeks. In doing so, the detection circuitry 308 generates an example promotion data frame in which each line items corresponds to a promotion week. In some examples, the promotion data frame is organized by period such that line items for a UPC are time series line items.

Further, the detection model 310 can identify out-of-stock (OOS) weeks for a given UPC-market-period. For example, the detection model 310 determines a given line item corresponding to a particular UPC and period (e.g., $week_t$) as an OOS week when the UPC is associated with a low inventory for the period (e.g., $week_t$) (b) the UPC was on promotion an immediately preceding week (e.g., $week_{t-1}$), and (c) the UPC was on promotion an immediately following week (e.g., $week_{t+1}$). While a single-UPC promotion can include an OOS week, the promotion for a single-UPC event cannot begin or end with an OOS week.

The detection circuitry 308 of FIG. 3 applies the detection model 310 to the promotion data frame to detect single-UPC events (e.g., thereby operating on UPC-market-period data). In particular, the detection model 310 iterates through the promotion data frame to group together line items that correspond to a same UPC and have similar metric values. For example, the detection circuitry 308 selects a first UPC and applies the detection model 310 to line items corresponding to the UPC to determine whether to group one or more of the line items for the UPC such that a promotion spans one or more periods. To detect a single-UPC event, the detection model 310 as applied by the detection circuitry 308 is structured to detect a start of a promotion and a duration thereof, which is used to detect an end of the promotion.

The detection model 310 iterates through the promotion data frame and determines promotion distribution facts for each promotional week. The promotion distribution facts are used to detect whether two promotional weeks belong to the same promotion event. The promotion distribution facts can include (but are not limited to) percent of feature-only baseline volume (e.g., feature-only baseline volume/baseline volume), percent of display-only baseline volume (e.g., display-only baseline volume/baseline volume), percent of DF baseline volume (e.g., DF baseline volume/baseline volume), percent of TPR-only baseline volume (e.g., TPR-only baseline volume/baseline volume), and percent of promotion baseline volume (e.g., promotion baseline volume/baseline volume).

The detection model 310 of FIG. 3 can detect the start of a promotion in different manners. When the detection model 310 determines that a promotion week corresponds to a start of a promotional event, the detection model 310 adds a period corresponding to the promotion week as a start date for a corresponding promotion. In some examples, the detection model 310 detects the start of a promotion event between two promotional weeks for the first UPC when the two promotion weeks are not consecutive. For example, the UPC may be on promotion in a first period and in a second period. If there is no period between the first period and the second period, the detection model 310 does not determine that the second period is the start of a promotion event. On the other hand, when there is a third period between the first period and the second period in which no promotional activity is detected, the detection model 310 identifies the first period as the end of a first promotion and the second period as the start of a second promotion.

In some examples, the detection model 310 detects the start of the promotion event between two consecutive, promotional weeks when a difference between a discount distribution and/or a promotion distribution between the two promotional weeks satisfies a threshold level of difference. For example, the detection model 310 can determine that a first promotion week corresponding to the first UPC is consecutive with a second promotion week corresponding to the first UPC. However, when a discount distribution and/or a promotion distribution difference between the first promotion week relative to the second promotional week is beyond a threshold level of difference, this indicates that the first and second promotion weeks belong to separate promotion events. Accordingly, the detection model 310 identifies the second promotion week as a new event and provides a start date for the new event based on a period corresponding to the second promotion week. For example, the first UPC may be on promotion for buy-one-get-one free a week leading up to a holiday, and be on a second promotion a week after the holiday at a percentage discount. In some examples, the threshold level of difference can be identified in the data request 312 parameters.

In some examples, the detection model 310 detects the start of the promotion event between two promotion weeks by causal conditions corresponding to the two promotion weeks. For example, in some countries, a feature-type promotion week may not occur after a TPR-type promotion week. In some examples, disallowed causal conditions can be identified in the data request 312 parameters. In particular, the detection model 310 comprises one or more promotion distribution facts for the two promotion weeks to the causal condition parameters in the data request 312 to determine whether the two promotional weeks can belong to the same promotion event.

When the detection model 310 determines that two promotional weeks for the first UPC (1) are consecutive, (2) are similar in terms of discount and/or promotion distribution, and (3) correspond to an allowed combination of promotion types, the detection model 310 identifies the two promotional weeks as belonging to the same promotion event. Further, the detection model 310 determines that the promotion event starts at an earlier period of the two promotional weeks. For example, the detection model 310 can determine that a first promotion week and a second promotion week belong to a same promotion event that starts in the first promotion week. When third promotion week for the UPC is identified in the data frame, the detection model 310 can determine whether a third promotional week is (a) a start of a new event, (b) belongs to the same promotional event as the first and second promotion weeks, or (c) cannot be determined because additional data is needed.

At this stage, for a given UPC, consecutive rows (e.g., weeks) with the same start date are considered as belonging to the same event whose start week is given by the value of the start date. In some examples, the detection circuitry 308 splits an event into two or more distinct events depending on, for example, whether the events duration/length exceeds a limit (e.g., a maximum length/duration, a threshold duration, etc.). In some examples, the detection circuitry 308 determines an event length percentile(s) (e.g., a $99^{th}$ percent) across the events detected for the market and the category of the detection ID. For each detected single-UPC event, the detection circuitry 308 can compare a respective event length to the determine event length maximum to determine whether to split the single-UPC event. For example, the detection circuitry 308 can re-start a new event when the duration exceeds the maximum length. In some examples, the detection circuitry 308 removes single-UPC events in response to determining that one or more variables (e.g., discount, promotion volume, causal week, etc.) are below the expected threshold.

The detection circuitry 308 of FIG. 3 provides each single-UPC event with a unique event ID. In some examples, the event ID can be random. In some examples, the event ID can be consistent across single-UPC events. For example, the single-UPC event IDs can include a respective detection ID, an indication that the event is a single UPC event, a corresponding product ID (e.g., UPC), a start period, and/or other information.

The detection circuitry 308 stores the single-UPC events in a product-level dimension or portion of the events data-base 104. For example, the single-UPC events portion of the events database 104 can include different rows, each of which corresponds to a respective single-UPC event, and different columns, each of which corresponds to a variable. For example, the product-level portion of the events database 104 can include columns for, at least, detection ID, market ID, UPC, period start, period count, and event ID. That is, each row (e.g., line item, object, etc.) in the product-level portion of the events database 104 corresponds to a particular single-UPC event associated with a respective, unique event ID.

While the single-UPC events can be useful to identify how different products performed with a corresponding promotion, consumer's do not typically experience a product-level promotion event. Rather, typically consumer's experience a multi-product promotion event in which more than one product is under the same promotion (e.g., a similar offer across multiple products). For example, a multi-product promotion event may be run for multiple flavors of a salad dressing produced by a same manufacturer that are priced and promoted together. Accordingly, the detection circuitry 308 of FIG. 3 is structured to identify multi-product events in accordance with teachings of this disclosure. In particular, the detection circuitry 308 applies an example second (e.g., event-level, multi-product, etc.) detection model 314, which is structured to detect and group line promoted items (e.g., multiple flavors of ice cream at a similar price, any size from a given manufacturer at a similar discount, etc.). In doing so, the detection circuitry 308 can identify promotional events in a manner that consumers perceive promotions and market participants think about promotions and plan financials. The detection model 314 of FIG. 3 applies a clustering technique to the single-UPC events to detect a multi-product events.

To detect the multi-product events, the detection circuitry 308 generates another example data structure corresponding to at least a portion of the product-level portion of the events database 104. For example, the detection circuitry 308 can extract, via the data interface circuitry 302, single-UPC events and corresponding data from the portion of the product-level portion of the events database 104 and provide the data in an example multi-product detection frame. In some examples, the multi-product detection frame includes example columns corresponding to different variables, such as identification variables and promotion variables. For example, the multi-product detection frame can include columns for, at least, detection ID, market ID, event ID, product ID, period start, and period count. The detection circuitry 308 of FIG. 3 adds additional columns including (but not limited to) promotion price, discount, regular price, ACV selling, ACV promotion, ACV any feature, value (promotional sales), product size (e.g., 92 fluid ounce), brand name, and manufacturer name. The detection circuitry 308 can populate the multi-product detection frame by extracting and/or determining values for each variable and single-UPC event.

The detection model 314 of FIG. 3 detection multi-product events by grouping together single-UPC events that are similar in terms of a start period, an end period (e.g., last week of the respective event ID), a promotion price, a discount, a promotion distribution (WD) (e.g., promotion distribution in stores selling a respective UPC), a feature distribution (WD feature) (e.g., feature distribution in stores selling a respective UPC), and product size. Based on the data in the multi-product detection frame, the detection circuitry 308 of FIG. 3 adds and populates columns for the foregoing variables. For example, the detection circuitry 308 determines, for each row, a respective period end (e.g., a start period plus a period duration), a respective WD (e.g., ACV promotion divided by ACV selling, times 100), and a respective WD feature (e.g., ACV any feature divided by ACV promotion, times 100). In some examples, the detection circuitry 308 generates a respective short brand by keeping only the first word of the brand name (e.g., keeping Coca from Coca Cola®). In some examples, the detection circuitry 308 transforms the product size into a numeric variable. For example, the detection circuitry 308 can remove any non-numeric characters (e.g., changing 92 fluid ounces to 92). In some examples, the detection circuitry 308 standardizes clustering variable before applying the second detection model 314.

In this example, the detection model 314 applies a density-base spatial clustering of applications with noise (DB-SCAN) algorithm, which is a density-based clustering technique. Density-based clustering techniques characterize clusters as dense regions of data separated from other clusters by areas of low density. The DBSCAN algorithm uses two clustering parameters, including (a) a minimum number of points (minPts) to justify or form a cluster (e.g., a minimum cluster size) and (b) epsilon (c), which defines how far the detection model 314 is to search to find more points for a cluster. In some examples, the epsilon (c) is 1 and the minPts is 2 such that each cluster includes at least 2 single-UPC events. In some examples, the detection model 314 applies a hierarchical DBSCAN (HDBSCAN) algorithm, which uses only the minimum number of points parameter. While the detection model 314 of FIG. 3 uses a Manhattan distance, other distances can be used in additional or alternative examples, such as Euclidean, Minkowski, etc. Further, it is understood that other clustering algorithms can be used in additional or alternative examples, such DBSCAN, k-means clustering, agglomerative clustering, etc.

The detection circuitry 308 of FIG. 3 applies the detection model 314 to the multi-product detection frame a number of times. In particular, the second detection model 314 performs a loop (e.g., iterates) per manufacturer and per brand for a given selected manufacturer. Within each iteration, the second detection model 314 is executed to group together ones of the single-UPC events that are similar in terms of start period, end period, promotion price, discount, WD, feature WD, and product size based on the clustering algorithm. The detection model 314 outputs clusters of single-UPC events having similar execution metrics. In other words, two or more UPCs are grouped into a single event directly off of the multi-product detection frame based on how respective single-UPC events are executed in the market.

In some examples, there can be single-UPC events that are not grouped into a cluster. The detection circuitry 308 of FIG. 3 removes single-UPC events that were not included in a cluster. That is, the detection circuitry 308 removes rows not corresponding to a cluster from the multi-product detection frame such that only multi-product promotion event related data remains in the multi-product detection frame.

The detection circuitry 308 provides a cluster start period and a cluster end period for each single-UPC event in a multi-product promotion event. For example, the detection circuitry 308 can add and populate columns for the start periods and the end periods to the multi-product detection frame. The detection circuitry 308 of FIG. 3 is structured to identify whether any single-UPC events could be extended in duration by a week (e.g., due to an 00S week, a delay in the promotion execution, etc.). In particular, the detection circuitry 308 selects a first single-UPC event (e.g., a row) corresponding to a cluster and determines whether a corresponding UPC is associated with another promotion event one period before a start period of the first single-UPC event and/or one period after an end period of the first single-UPC event. When the detection circuitry 308 determines the UPC is associated with another promotion event one period before the start period of the first single-UPC event, the first single-UPC event cannot be extended in duration to start earlier. When the detection circuitry 308 determines the UPC is associated with another promotion event one period after the end period of the first single-UPC event, the first single-UPC event cannot be extended in duration to end later.

When the detection circuitry 308 determines the UPC is not associated with another promotion event one period before the start period of the first single-UPC event, the detection circuitry 308 whether a second single-UPC event similar to the first single-UPC event (e.g., in terms of promotion price and discount) that has the same end period, but a start period that is one period earlier (e.g., start period minus 1) can be found in the cluster. When the second single-UPC event is found, the detection circuitry 308 move the first single-UPC event's start period, extending the first single-UPC event's duration. In some examples, the detection circuitry 308 considers two, separate single-UPC events (e.g., e1 and e2) having similar promotion price values if their absolute relative promotion price deviation (abs(1−promotion price e1/promotion price e2)) is lower than 0.07. In some examples, the detection circuitry 308 considers two, separate single-UPC events (e.g., e1 and e2) having similar discount values if their absolute discount deviation (abs (discount e1−discount e2)) is lower than 0.05.

When the detection circuitry 308 determines the UPC is not associated with another promotion event one period after the end period of the first single-UPC event, the detection circuitry 308 whether a third single-UPC event similar to the first single-UPC event (e.g., in terms of promotion price and discount) that has the same start period, but an end period that is one period later (e.g., end period plus 1) can be found in the cluster. When the third single-UPC event is found, the detection circuitry 308 move the first single-UPC event's end period, extending the first single-UPC event's duration.

In some examples, the detection circuitry 308 ensures that new clusters defined by a concatenation of the cluster number, the start period ID, and the end period ID contain single-UPC events that are similar enough in terms of promotion price or discount. For each new cluster, the detection circuitry 308 determines a first standard deviation (std_1) corresponding to promotion prices in a cluster and a second corresponding standard deviation (std_2) corresponding to discounts in the cluster. When a minimum of first standard deviation and second standard deviation for a given cluster is less than 0.05, no further split is needed.

When the minimum of first standard deviation and the second standard deviation for the given cluster is greater than 0.05, the detection circuitry 308 determines whether (a) the first standard deviation is less than or equal to second standard deviation (e.g., indicative that the promotion price has a lower variability than the discount) or (b) the second standard deviation less than the first standard deviation (e.g., indicative that the discount has a lower variability than the promotion price). When the promotion price has the lower variability the detection circuitry 308 splits the given cluster into three groups. In some examples, the detection circuitry 308 assigns each line item corresponding to the given cluster based on a respective promotion price deviation relative to a median. For example, the detection circuitry 308 can assign a given line item to a first group when the promotion price deviation relative to the is less than –0.07, to a second group when the promotion price deviation relative to the median between –0.07 and 0.07, or to a third group when the promotion price deviation relative to the median is greater than 0.07.

When the discount has the lower variability, the detection circuitry 308 similarly splits the given cluster into three groups. In some examples, the detection circuitry 308 assigns each line item corresponding to the given cluster based on a respective discount deviation relative to a median (e.g., discount event minus discount median). For example, the detection circuitry 308 can assign a given line item to a first group when the discount deviation relative to the median is less than –0.00, to a second group when the discount deviation relative to the median between –0.05 and 0.05, or to a third group when the discount deviation relative to the median is greater than 0.05.

The detection circuitry 308 identifies groups of split clusters to identify final multi-UPC events that include single-UPC events having a threshold level of similarity in terms of promotion price and discount. A multi-UPC event must include more than one single-UPC event. Thus, if a cluster split results in a group with one single-UPC event, the group is removed from the multi-UPC event clusters. Otherwise, the detection circuitry re-names each respective multi-UPC event grouped from the split clusters.

The detection circuitry 308 of FIG. 3 provides each multi-UPC event with a respective, unique event ID. In some examples, the event ID can be random. In some examples, the event ID can be consistent across multi-UPC events and/or consistent with the single-UPC event ID naming convention. For example, the multi-UPC event IDs can include a respective detection ID, an indication that the event is a multi-UPC event, a corresponding product ID(s) (e.g., UPC(s)), a start period, and/or other information. For example, the UPC can be a first UPC in the cluster, a UPC in the cluster having the highest promotion value sales within the multi UPCs event, multiple UPCs, etc.

The detection circuitry 308 of FIG. 3 stores the multi-UPC event IDs (e.g., parent event IDs) with corresponding ones of the single-UPC events in the product-level dimension or portion of the events database 104. For example, the single-UPC events portion of the events database 104 can the single-UPC events, certain ones of which include an indication that respective single-UPCs are part of a multi-UPC event. That is, each row (e.g., line item, object, etc.) in the product-level portion of the events database 104 corresponds to a particular single-UPC event associated with a respective, unique event ID. The single-UPC events grouped into a multi-UPC event also include an indication of a respective multi-UPC event ID.

In some examples, the promotion analysis circuitry 102 includes means for detecting a promotion event. For example, the means for detecting a promotion event may be implemented by the detection circuitry 308. In some examples, the detection circuitry 308 may be instantiated by programmable circuitry such as the example programmable circuitry 1912 of FIG. 19. For instance, the detection circuitry 308 may be instantiated by the example microprocessor 2000 of FIG. 20 executing machine executable instructions such as those implemented by at least blocks 1300, 1316, 1500, 1518 of FIGS. 13-16. In some examples, the detection circuitry 308 may be instantiated by hardware logic circuitry, which may be implemented by an ASIC, XPU, or the FPGA circuitry 2100 of FIG. 21 configured and/or structured to perform operations corresponding to the machine readable instructions. Additionally or alternatively, the detection circuitry 308 may be instantiated by any other combination of hardware, software, and/or firmware. For example, the detection circuitry 308 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Apart from having single-UPC and multi-product promotional events identified in the events database 104, market participants often desire to drill down and identify contributions of the individual products to the whole event. For example, a multi-product promotion event may stretch over several varieties of a product, a few of which may be out of stock during the event. At a product level of granularity, this will result in promotion mechanics ending sooner for out of stock product than for the ones that had inventory. As another example, products which had been promoted in a feature at the start of a multi-product promotion event may continue to sell at their promotion price in subsequent weeks, when the feature no longer covers such product. In at least the foregoing examples, looking only at the product sales in store weeks marked with the presence of a feature would overestimate the performance of the multi-product event. Prior to examples disclosed herein, the market participants had no manner in which to identify such details.

Moreover, market participants desire to understand whether a promotion event brought on incremental sales at a product level and relative to a category. For example, incremental sales is a product level fact that identifies sales above an expected volume. While incremental sales are good for a manufacturer of a product, a retailer desires to know how incremental the promotion was to a corresponding category. In other words, the retailer may desire to know whether a promotion grew categorical sales for a particular store, or whether the promotion shifted sales from another product to the promoted product.

Based on at least the foregoing, the promotion analysis circuitry is expands/enriches the events database 104 by providing execution metrics and enriched characteristics with detected single-UPC and multi-product promotions. In particular, the promotion analysis circuitry 102 includes example expansion circuitry 316, which is structured to utilize data from different resources to describe, at least, a promotional event, the promotional events execution and consumer response, and competitive contextual details. For example, the expansion circuitry 316 determines how incremental a given promotion is to a corresponding brand and category. In some examples, the expansion circuitry 316 is instantiated by programmable circuitry executing expansion instructions and/or configured to perform operations such as those represented by the flowchart(s) of FIGS. 17-18.

The expansion circuitry 316 of FIG. 3 performs or executes enrichment projects, each of which correspond to a particular market and a particular product category and/or subcategory. In some examples, the expansion circuitry 316 defines (e.g., creates, etc.) an enrichment project for execution, and assigns the enrichment project a unique project ID, hereinafter referred to as an enrichment ID to make clear that the enrichment process is separated from a project ID associated with a data alignment project. A particular enrichment ID, which corresponds to a particular market and a particular category and/or subcategory, can include one or more multi-product events. While examples discussed below assume the enrichment ID corresponds to a product subcategory, an entire category often being too broad to show a meaningful reaction, other levels of granularity can be used in other examples. For example, the category/subcategory can correspond to a particular level in a multi-level hierarchy of products and/or classes thereof.

The expansion circuitry 316 of FIG. 3 performs an enrichment process for each multi-product promotion event in the selected market and subcategory, generating retail measurement metrics that describe and/or measure performance thereof. Further, each multi-product event is analyzed as a whole and at a product level to enable market particulars to deep dive into the events and truly understand performance. In particular, the expansion circuitry 316 of FIG. 3 outputs an example events report corresponding to the enrichment ID that includes parent-level promotion facts as well as product-level promotion facts. For example, if a multi-product promotion event includes four product, an output can include five data objects (e.g., rows, line items, etc.), one for an aggregated level and four for the individual products.

The expansion circuitry 316 of FIG. 3 iterates through the events database 104 to identify promotion events (e.g., multi-product promotion events and/or single-UPC promotion events) corresponding to the market and to the subcategory which have not been enriched by the expansion circuitry 316. The expansion circuitry 316 of FIG. 3 obtains (e.g., via the data interface circuitry 302) data corresponding to the enrichment ID from different resources to facilitate execution of the enrichment project. For example, the expansion circuitry 316 can obtain promotion-specific facts for each promotion event. In some examples, the promotion-specific facts include offer language used (e.g., buy two get one free) The one of the Item promoted in the feature/ad version having the highest # of stores associated with, in the weeks of the Event. The expansion circuitry 316 obtains data corresponding to the enrichment ID from different resources to facilitate execution of the enrichment project.

The expansion circuitry 316 of FIG. 3 utilizes aggregated data to determine impacts of promotions to their subcategory in terms of event incrementality. In particular, the expansion circuitry 316 of FIG. 3 models how incremental a given promotion is to a corresponding brand (e.g., manufacturer) and subcategory. For example, the expansion circuitry 316 evaluates multi-UPC events at the product level by deriving a measure of how much the event benefits a corresponding subcategory. To do so, the expansion circuitry 316 includes example uplift determiner circuitry 318, which is structured to determine an uplift (e.g., a factor, a multiplier, etc.) for each individual promotion mechanic (e.g., feature only, display only, feature and display, TPR only, etc.) by subcategory and market and applies the uplifts to the multi-UPC events. In some examples, the expansion circuitry 316 is instantiated by programmable circuitry executing expansion instructions and/or configured to perform operations such as those represented by the flowchart(s) of FIGS. 14-15.

The uplifts describe how much a given subcategory benefits from an equivalized unit sold under promotion. In other words, each multiplier represents, for each unit sold under a specific promotion mechanic, how many units the subcategory sells. Specifically, the uplift determiner circuitry 318 calculates results of an example statistical regression model(s) 320, the solution of which are the multipliers per promotion mechanic that describe how much the subcategory benefits from an equivalized unit sold under promotion. The multipliers are plausible in the interval between 0 and 1. Indeed, a subcategory should not sell less because of a promoted unit sold (e.g., the multiplier should be non-negative). Nor should the subcategory benefit over and above the promoted sales. For example, if a promotion event sells 2,000 equivalized units, 1,000 of which are sold under feature and display, and the remaining 1,000 of which are sold under a display-only promotion. Further, assuming determined multiplier for "feature and display" for a corresponding market and subcategory is 0.8, while the multiplier for "display only" for the corresponding market and subcategory is 0.6. In this example, the expansion circuitry 316 could use the multipliers to derive that 800 equivalized units sold under 'feature and display' are incremental to the subcategory (e.g., 0.8*1,000=800), while 600 equivalized units sold under display-only are incremental to the subcategory (e.g., 0.6*1,000=600). For the entire promotional event, 1,400 of its 2,000 equivalized units are hence incremental to the subcategory (e.g., 600+800=1,400). Put another way, the feature and display promotion caused a cannibalization of 200 of the 1,000 promoted units within the subcategory, while the display-only promotion caused a cannibalization of 400 of the other 1,000 promoted units. Accordingly, 600 equivalized units were cannibalized in the subcategory (e.g., 200+400=600), which yields 1,400 incremental equivalized units for the subcategory (e.g., 2,000-1,400=600).

The uplift determiner circuitry 318 does not make explicit use of the promotional events when determining the multipliers. Rather, the uplift determiner circuitry 318 obtains, via the data interface circuitry 302, data objects (e.g., data records, data structures, etc.) on a subcategory and market level from the market database 110. The market corresponding to the enrichment ID can correspond to a list of non-overlapping retailers from a specific country (e.g., distinguished, for example, by retailer, shop type, geography, etc.). Moreover, the uplift determiner circuitry 318 obtains data for the subcategory corresponding to the enrichment ID and other subcategories of a corresponding category. In particular, the group of retailers and subcategories should be sufficiently large such that the input data size allows for a statistical model to derive reliable multipliers.

The uplift determiner circuitry 318 of FIG. 3 obtains the data records for a fixed period of project (e.g., bimonthly granularity over 2 years). For example, a single data record in the input could pertain to a subcategory (e.g., traditional dairy yogurt bottle) of a category (e.g. of dairy yogurt) for a market (e.g., grocery stores in southeastern United States) for all of January and February 2018. Consequently, over two years, there would be twelve data records for this subcategory at this retailer, with the final one covering November and December 2019. However, examples disclosed herein are not limited thereto. Rather, the subcategory-market sales data can correspond to different levels of granularity (e.g., monthly, weekly, etc.) and/or duration (e.g., one year, less than one year, more than two years, etc.).

In some examples, the data records include calculated facts or metrics, such as (but not limited to) all markets (e.g., renamed as "mkt" in the process), product category (e.g., renamed as "cat" in the process), hierarchy subcategory (e.g., renamed as "subcat" in the process), all periods (e.g., renamed as "periods" in the process), units, equivalized units (e.g., renamed as "UnitsEq" in the process), number of store (e.g., renamed as "NumStores" in the process), display without feature EQ (e.g., renamed as "DispWoFeatUnitsEq" in the process), feature without display EQ (e.g., renamed as "FeatWoDispUnitsEq" in the process), feature and display (e.g., renamed as "FeatAndDispUnitsEq" in the process), and price decrease EQ (e.g., renamed as "TPRUnitsEq" in the process). For example, the data records can be comma-separated value (CSV) files having the following structure: mkt, subcat, period, UnitsEq, TPRUnitsEq, DispWoFeatUnitsEq, FeatWoDispUnitsEq, FeatAndDispUnitsEq, NumStores. In some examples, the NumStores variable refers to a number of stores of a retailer to control for potential retailer growth. The mkt, subcat, and period variables are to serve as keys in the sense that each unique combination of their values include a single variable value.

In some examples, the data records include data that has already been aggregated by market, subcategory, and period (e.g., bi-monthly in this example). Otherwise, the uplift determiner circuitry 318 aggregates the sales data by market, subcategory, and bi-monthly period.

The uplift determiner circuitry 318 of FIG. 3 re-formats the input data. For example, the uplift determiner circuitry 318 of FIG. 3 generates another example data frame (e.g., an uplift data frame) and/or another data structure based on the CSV files. In such examples, each line item (e.g., row) corresponds to a unique market-subcat-period combination. Further, the uplift determiner circuitry 318 can abbreviate names of subcategories, create new period names, generate a dictionary mapping subcategories (full and corresponding abbreviated names) and categories names, etc. For example, the uplift determiner circuitry 318 can abbreviate the names of the subcategories by only keeping the first letter of each word composing a given subcategories name (e.g. "grocery cereal and granola adult" becomes "GCAGA"), while ensuring the abbreviation is unique. In some such examples, the uplift determiner circuitry 318 stores the result in a subcategory column of the uplift data frame.

The uplift determiner circuitry 318 generates different data sets based on the input data. In particular, the uplift determiner circuitry 318 generates a first dataset by adding respective equivalized units for each promotion type over all periods. In doing so, the uplift determiner circuitry 318 thus generates a smaller data set of the form of (mkt, subcat, TPRUnitsEq, DispWoFeatUnitsEq, FeatWoDispUnitsEq, FeatAndDispUnitsEq). Based on the smaller data set, the uplift determiner circuitry 318 generates another fact for equivalized units for any promotion (e.g., AnyPromoUnitsEq). In particular, the uplift determiner circuitry 318 determines and adds a corresponding column for "AnyPromoUnitsEq" by adding the equivalized units over all promotion types.

Further, the uplift determiner circuitry 318 generates a second dataset corresponding to year-over-year differences for ones of the facts in the uplift data frame. For example, the uplift determiner circuitry 318 can determine a change of each input variable from a period to a corresponding period a year later. For example, instead of using the equivalized sales units of a subcategory at a retailer accumulated in January and February 2018, the uplift determiner circuitry 318 can operate on a difference of (a) the equivalized sales units accumulated in January and February 2019 and (b) the equivalized sales units accumulated in January and February 2018 of the subcategory at the retailer. For example, the uplift determiner circuitry 318 can compute the difference between a second year (e.g. 2019) and a previous year (e.g. 2018), and replace a corresponding original fact with the year-over-year difference.

Prior to computing the differences, the uplift determiner circuitry 318 can transform the input data to ensure that differences between the input variables are analogous differences for each of the six bi-monthly periods. For example, it may happen that for a specific combination of subcategory, period, and market, there is no record in the input data for the corresponding period in the other year. In such a case, the uplift determiner circuitry 318 drops the existing record from the data. In particular, prior to determining the differences, the uplift determiner circuitry 318 can remove line items from the uplift data frame having zero sales (e.g., keep only (mkt, cat, subcat, per) combinations with non-zero sales units in each year). In some examples, the uplift determiner circuitry 318 reduces the input data to those records which have positive equivalized sales units (e.g., UnitsEq>0). For example, a subcategory may not have experiences sales during a period at a retailer, but may nonetheless have a data point in the input data (e.g., with UnitsEq=0).

The uplift determiner circuitry 318 of FIG. 3 is structured to drop (e.g., remove) records for the same subcategory and retailer and the corresponding period in the other year. Thus, the uplift determiner circuitry 318 generates a data set of sales differences only for pairs of subcategory and retailer in which the sales really happened in both contributing periods (e.g., mkt, subcat, $\Delta$period, $\Delta$UnitsEq, $\Delta$TPRUnitsEq, $\Delta$DispWoFeatUnitsEq, $\Delta$FeatWoDispUnitsEq, $\Delta$FeatAndDispUnitsEq, $\Delta$NumStores). The uplift data frame includes most half as many records as the original input data set. In this example, the variable "$\Delta$period" refers to the pair of months (e.g., "JF" refers to "January and February") rather than the year. That is plausible because the remaining variables (e.g., $\Delta$UnitsEq, $\Delta$TPRUnitsEq, $\Delta$DispWoFeatUnitsEq, $\Delta$FeatWoDispUnitsEq, $\Delta$FeatAndDispUnitsEq, and $\Delta$NumStores) provide differences of both years that were present in the original input data.

The uplift determiner circuitry 318 of FIG. 3 standardizes each variable in the uplift data frame. For example, the uplift determiner circuitry 318 iterates by variable column (e.g., iterates through each of $\Delta$UnitsEq, $\Delta$TPRUnitsEq, $\Delta$DispWoFeatUnitsEq, $\Delta$FeatWoDispUnitsEq, $\Delta$FeatAndDispUnitsEq, and $\Delta$NumStores) to determine or compute (a) a mean across the observations (e.g., line items) and (b) a standard deviation across the observations. Further, the uplift determiner circuitry 318 generates standardized variables (e.g., $\Delta$DispWoFeatUnitsEq*, $\Delta$FeatWoDispUnitsEq*, $\Delta$FeatAndDispUnitsEq*, $\Delta$TPRUnitsEq*) by subtracting the mean from each variable and dividing the variables by the standard deviation. Doing so facilitates comparable columns for subsequent statistical procedures.

The uplift determiner circuitry 318 applies a principal component analysis technique or process to the data frame to determine example principal components. Principal component analysis is a technique for analyzing large datasets having a high number of dimensions/features per observation that increases the interpretability of data while preserving the maximum amount of information. By construction, principal components have desirable statistical properties that increase the chance for reliable results in subsequent statistical analysis. In particular, the uplift determiner circuitry 318 executes a principal components algorithm on the equivalized units (e.g., UnitsEq) per promotion mechanic (e.g., display-only, feature-only, display and feature, and TPR) to generate four principle components (e.g., PC1, PC2, PC3, and PC4). In other words, the second data set generated by the uplift determiner circuitry includes $\Delta$UnitsEq*, PC1, PC2, PC3, PC4, and $\Delta$NumStores*. The variables PC1, PC2, PC3, PC4 are linear combinations of the former variables ones, ensuring these new variables are non-colinear. To later transform the principal components back to the promotion types, the uplift determiner circuitry 318 generates and stores an example rotational matrix when executing the principal components algorithm.

The uplift determiner circuitry 318 applies different example statistical model 320 to the second data set (e.g., mkt, subcat, Δperiod, ΔUnitsEq*, PC1, PC2, PC3, PC4, and ΔNumStores*). In some examples, the statistical models 320 are multi-level models, which are statistical models of parameters that vary at more than one level. For example, the statistical models 320 can include different model specifications in terms of fixed and random variables (e.g., lists of fixed and random effects per statistical model 320), which define model interactions. The fixed effects are constant, exploratory/independent variables that likely have some effect on a response/dependent variable. The random effects are categorical variables to be controlled because the categorical variables likely influence patterns that might emerge.

In some examples, the statistical models are designed based on statistical model type, data used in the model, data preparation, etc. For example, different statistical model types allow application of different model classes, (e.g., models that allow random effects, models that do not allow for random effects, etc.). In some examples, the statistical model(s) uses promotional sale data as influencers. In additional or alternative examples, the statistical model(s) can use alternative data as influencers, such as promotion characteristics (e.g., "temporary decrease of price by 10%", where the approach is based rather on "100 kg of sales during the temporary price decrease"). Such choices directly benefit the plausibility of model results in the light of observed data. In some examples, the uplift determiner circuitry 318 can counter a risk of collinear observations of different promotion types by deriving principal components (PC) and using these as influences to the model. In some such examples, the uplift determiner circuitry 318 identify and defend against collinearity. Further, obtained model results can still be re-transformed to provide meaningful measures for the impact of the original data (e.g., the different observed promotion types).

In some examples, the statistical model(s) include linear mixed effect models with numerical algorithms group (NAG) routines. For example, the uplift determiner circuitry 318 can execute multiple statistical models 320 to test different randomizations of the PCs (e.g., randomized by mkt and/or subcat). For example, the uplift determiner circuitry 318 creates "dummy" variables for the randomized variables (e.g., random effects). In particular, the uplift determiner circuitry 318 of FIG. 3 can use the second data set to determine the most appropriate formulation of the statistical model. The process will run/test each of the models specified, and select one according to some model quality criteria. In particular, a statistical model 320 can be selected by randomizing PC1 by subcat and randomizing PC2 by market, in a manner consistent with example Equation (12).

$$\Delta UnitsEq^* = \alpha_s + \alpha_m + \beta 1_s PC1 + \beta 2_m PC2 + \beta 3 PC3 + \beta 4 PC4 + \gamma^* \Delta NumStores^* + \varepsilon \qquad \text{Equation (12)}$$

For each model, the uplift determiner circuitry 318 generates (a) a first data structure to store respective model coefficients, (b) a second data structure to store key performance indicators (KPIs) for measuring model quality, and (c) a third data structure to model coefficient after transformation (discussed below). The statistic models 320 each return several quantities that describe a "quality" of the model results. For the most part, these are individual numbers.

The uplift determiner circuitry 318 of FIG. 3 applies a transpose function to the data structure having the coefficients resulting from the statistical models 320 such that each row corresponds to a particular combination of (mkt, subcat) and one column per coefficient (e.g., a sum of the fixed and random coefficients associated with a respective variable of the column). At the end, the uplift determiner circuitry 318 determines, for each statistical model 320, an overall number of plausible effects (e.g., falling into the interval [0, 1]) and a number of plausible effects by promotion type (e.g., KPIs).

The uplift determiner circuitry 318 determines the multipliers for each promotion type from the uplifts of each principal component. In particular, the uplift determiner circuitry 318 makes use of the rotation four by four matrix that became available during determination of the principal components. In some examples, the matrix includes four rows and four columns (e.g., because there are four principal components).

Each column in the matrix can refer to one of the four principal components (e.g., r1, r2, r3, and r4), while each row can refer to one of the promotion mechanics for which the uplift determiner circuitry 318 determined the principal components (e.g., (ds) for DispWoFeatUnitsEq, (ft) for FeatWoDispUnitsEq, (DF) for FeatAndDispUnitsEq, (TPR) for TPRUnitsEq). It is important to correctly identify the references. The promotion mechanics should be ordered as the columns in the data set, which the uplift determiner circuitry 318 provided to the routine that determined the principal components. This convention may differ between implementations.

The model results are only commercially plausible if they satisfy certain conditions for each pair of market and subcategory. The expansion circuitry 316 includes example business rules 322, which are applied to the coefficients resulting from the selected model. An example first business rules 322 may be that a subcategory must not suffer from promotional sales of a product. An example second business rules 322 may be that a subcategory must not benefit more from promotion sales than the promoted product. An example third business rules 322 may be that a subcategory needs to benefit from sales under 'display only' at least as much as under 'TPR only'. An example fourth business rules 322 may be that a subcategory needs to benefit from sales under 'feature only' at least as much as under 'display only'. An example fifth business rules 322 may be that a subcategory needs to benefit from sales under 'feature and display' at least as much as under 'feature only'. These conditions are formulated as example business rules 322 for the corresponding multipliers, previously transformed based on the model result.

The uplift determiner circuitry 318 selects a model among the statistical models 320 executed based on a criteria. For example, the uplift determiner circuitry 318 can the statistical model 320 having a highest percentage of overall plausible coefficients (e.g., coefficients falling in the interval [0, 1]). The uplift determiner circuitry 318 selects the coefficients from the selected model to generate the uplifts.

The expansion circuitry 316 applies the determined uplifts to the single-UPC events and/or the multi-product events to determine incremental sales. As noted above, the expansion circuitry 316 obtains data corresponding to the enrichment ID from different resources to facilitate execution of the enrichment project. In particular, the expansion circuitry 316 obtains data from the events database 104 associated with one or more multi-product event IDs and/or single-UPC event IDs. For example, the expansion circuitry 316 can obtain promotional sales volume, sales total and sales per promotion types (e.g., feature and display, feature only, display only, TPR only), aggregated by market ID, period ID, and UPC, for the markets and products corresponding to the enrichment ID.

The expansion circuitry 316 keeps only the single-UPC events and child levels of the multi-product events. Further, the expansion circuitry 316 obtains baseline facts (e.g., feature-only baseline volume, DF baseline volume, display-only baseline volume, and TPR-only baseline volume) and adds the baseline facts to the data frame. The expansion circuitry 316 also obtains volume equivalized factors for each UPC associated with the enrichment ID (e.g., needed for computing promotional sales and incremental sales in equivalized units).

The expansion circuitry 316 determines events sales volume (e.g., units) per promotion type (DF units, feature-only units, display-only units, and TPR-only units). The expansion circuitry 316 determines an adjacent units fact, which is needed to align the event sales units per promotion type to census data. The expansion circuitry 316 determines the events sales in equalized units (e.g., UnitsEq), the events baseline sales in equalized units (e.g., baseline UnitsEq), and the events sales per promotion type in equivalized units (feature-only UnitsEq, DF UnitsEq, display-only UnitsEq, and TPR-only UnitsEq). In particular, the uplift determiner circuitry 318 determines UnitsEq (e.g., units times volume equivalized factors), baseline UnitsEq (e.g., baseline units times volume equivalized factors), feature-only UnitsEq (e.g., feature-only units times adjacent units times a respective volume equivalized factors), DF UnitsEq (e.g., DF units times adjacent units times a respective volume equivalized factors), display-only UnitsEq (e.g., display-only units times adjacent units times a respective volume equivalized factors), and TPR-only UnitsEq (e.g., TPR-only units time times adjacent units times a respective volume equivalized factor).

The expansion circuitry 316 retrieves the uplifts per market, category, subcategory generated by the uplift determiner circuitry 318 associated with the enrichment ID. The expansion circuitry 316 determines the events incremental sales in equivalized units and the incremental sales in equivalized units of the events to the category. For example, the expansion circuitry 316 can determine the events incremental sales in equivalized units by subtracting the events baseline sales in equalized units from the events sales in equalized units (e.g., UnitsEq–baseline UnitsEq). Further, the expansion circuitry 316 can determine the events incremental sales to the (sub)category in equalized units by adding the events incremental sales per promotion type. For example, the expansion circuitry 316 can multiply the events sales per promotion type in equivalized units by respective uplifts (e.g., factors) determined by the uplift determiner circuitry 318. In particular, the expansion circuitry 316 can multiply (a) feature-only UnitsEq by the uplift for feature-only UnitsEq, (b) display-only UnitsEq by the uplift for display-only UnitsEq, (c) DF UnitsEq by the uplift for DF UnitsEq, and (d) TPR-only UnitsEq by the uplift for TPR-only UnitsEq. Further, the expansion circuitry 316 can sum the events incremental sales per promotion type to determine the events incremental sales to the (sub)category in equivalized units.

In some examples, the expansion circuitry 316 applies example constraints to incremental data to ensure that the incremental sales to the (sub)category in equivalized units is between zero and the events incremental sales in equivalized units. For example, the expansion circuitry 316 can replace negative events incremental sales with a zero. Further, the expansion circuitry 316 determines a ratio of the incremental sales to the (sub)category in equivalized units to the events incremental sales in equivalized units, which is expected to be lower or equal to one (e.g., a predefined range). For the multi-product events, which have thus far been excluded from the computations, the expansion circuitry 316 sum the facts UnitsEq, baseline UnitsEq, events incremental sales in equivalized units, and the incremental sales to the (sub) category in equivalized units over the child levels.

In some examples, the promotion analysis circuitry 102 includes means for enriching (e.g., augmenting, supplementing, etc.) detected promotions with execution metrics. For example, the means for enriching promotion results may be implemented by example expansion circuitry 316. In some examples, the expansion circuitry 316 may be instantiated by programmable circuitry such as the example programmable circuitry 1912 of FIG. 19. For instance, the expansion circuitry 316 be instantiated by the example microprocessor 2000 of FIG. 20 executing machine executable instructions such as those implemented by at least blocks 1700, 1800 of FIGS. 17-18. In some examples, the expansion circuitry 316 may be instantiated by hardware logic circuitry, which may be implemented by an ASIC, XPU, or the FPGA circuitry 2100 of FIG. 21 configured and/or structured to perform operations corresponding to the machine readable instructions. Additionally or alternatively, the expansion circuitry 316 may be instantiated by any other combination of hardware, software, and/or firmware. For example, the expansion circuitry 316 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Figure 5A:
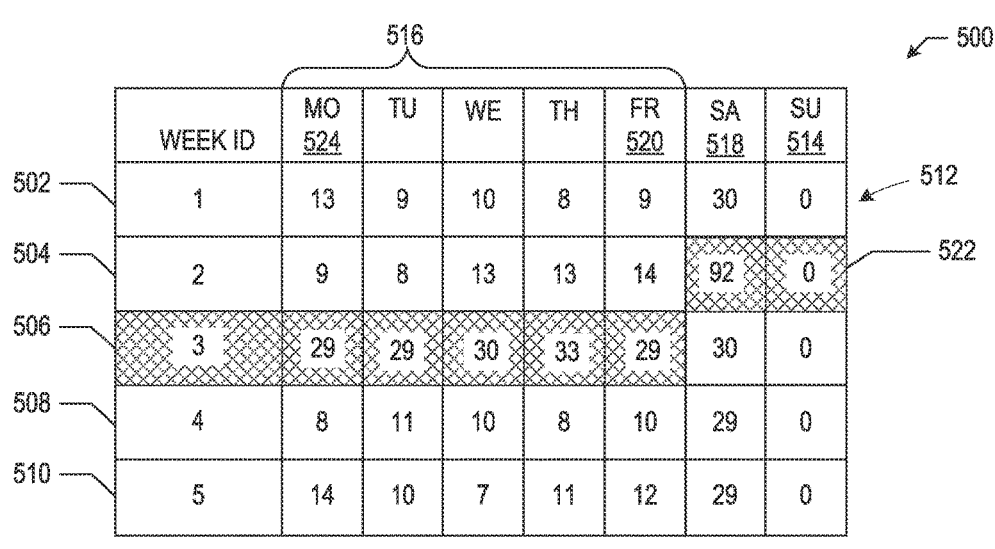
FIG. 5A is a first data structure illustrating example daily product-level sales for an example store across different weeks.
Figure 5B:
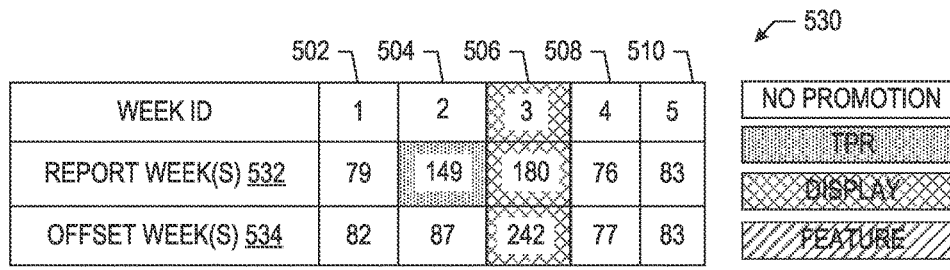
FIG. 5B is a second data structure illustrating example summaries of the daily product-level sales of FIG. 5A for an example reporting week and an example offset week.
Figure 5C:
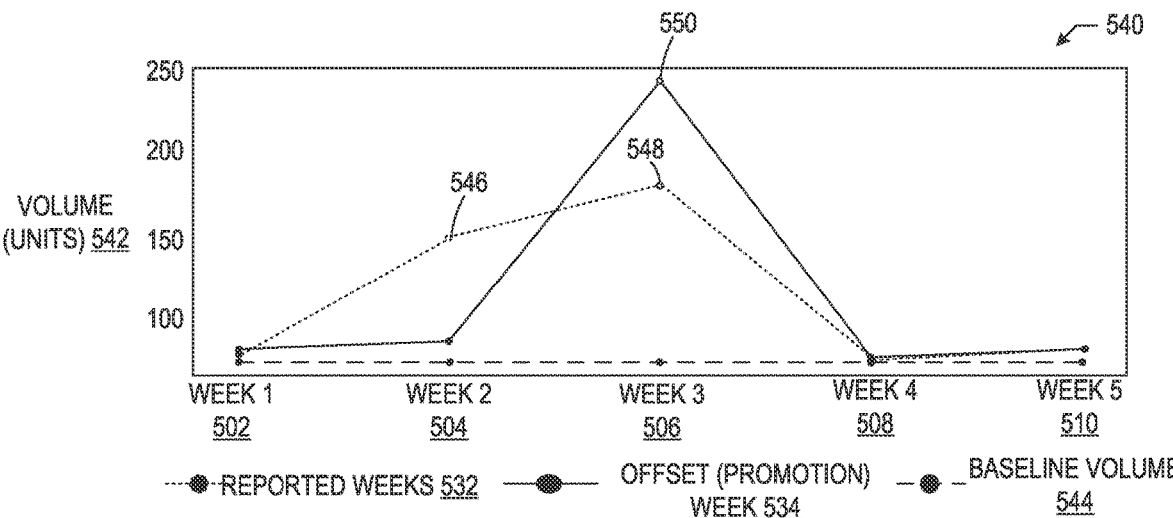
FIG. 5C is an example graph plotting the example summaries of FIG. 5B.

FIGS. 5A-5C provide an illustration of an example realignment problem. In particular, FIG. 5A illustrates a portion of an example table 500 that includes five example calendar weeks 502-510 of daily UPC sales from an example store (e.g., UPC-store sales data). That is, each example data cell 512 represents UPC-store sales data for a respective day in a respective calendar week 502-510. In this example, the store is closed on Sundays 514, meaning that zero products are sold in the store each Sunday (each data cell 512 in the Sunday 514 column includes a zero). As illustrated, an example first week (e.g., week 1) 502, an example fourth week (e.g., week 4) 508, and an example fifth week (e.g., week 5) 510 are typical (e.g., baseline) sales weeks in which no causal promotion activity occurred in the store. For example, the first, fourth, and fifth weeks 502, 508, 510 do not include a causal promotion flag nor higher than average (e.g., baseline) sales.

Rather, approximately ten product units are sold on average per weekday 516, and approximately thirty product units are sold on average each Saturday 518 (e.g., three times the units sold during the weekdays 516). This is illustrated in the first, fourth, and fifth weeks 502, 508, 510. However, as illustrated in the table 500, an example promotion 522 (e.g., a display, a feature, and/or a TPR) ran from a Saturday 518 in an example second week (e.g., week 2) 504 to a Friday 520 in an example third week (e.g., week 3) 506. That is, the promotion 522 (represented with a checkered background) ran for seven days, but the seven days are spread over two weeks 504, 506. During the promotion 522, approximately three times as many product units are sold (e.g., illustrated in the respective data cells 512).

FIG. 5B is another example table 530 that summarizes the five weeks 502-510 of FIG. 5A into two different types of periods. In particular, the data structure 530 includes example reporting weeks 532 that summarize daily sales for respective weeks 502-510 (e.g., each extending Monday 524 to a corresponding Sunday 514) and example offset weeks 534, each of which extend from a given Saturday 518 to a subsequent Friday 520, similar to the promotion 522. That is, the offset weeks 534 correspond to the promotion 522. As illustrated in the table 530, based on how the daily sales data are summarized, the report weeks 532 includes different values than the offset week 534. In particular, the reporting weeks 532 illustrates two sales peaks, including a first sales peak in the second week 504 and a second sales peak in the third week 506. Simply viewing the reporting weeks 532, a data analyst may assume that two promotions occurred (e.g., in the second and third weeks 504, 506) rather than the one promotion 522 that happened to span the second and third weeks 504, 506. On the other hand, the offset weeks 534 include only one sales peak, which is in the third week 506 having the promotion 522.

To improve an accuracy of the detection, description, and evaluation of a promotional event, it is important to realign the movement data in view of the promotional activity. In particular, disclosed examples aim to include promotional sales occurring in a promotion period that spans two reporting periods, in the reporting period tagged with corresponding promotion. In this example, the third week 506 of the reported weeks 532 is flagged as a causal promotion. However, the second week 504 in the reported weeks 532 is flagged as a TPR rather than a causal promotion. This is because promotional sales in the second week 504 result in a reduced price for the UPC and, therefore, a ppi less than a threshold ppi value (e.g., approximately 0.95).

FIG. 5C illustrates an example graph 540 comparing volumes (e.g., units) 542 of products sales for the different weeks 502-510 (e.g., week 1, week 2, week 3, week 4, week 5) represented in the reporting weeks 532 and in the offset weeks 534. For reference, an example baseline volume 544 is plotted as well, which corresponds to a baseline volume of 75 units. As illustrated in FIG. 5C, absent alignment, the reporting weeks 532 include two peaks, including an example first peak 546 and an example second peak 548. The offset weeks 534, on the other hand, include one peak (e.g., an example third peak 550), which corresponds to the promotion 522.

As noted above, at least one goal of the data cleaner circuitry 304 is to present promotional sales corresponding to a promotion week in one reporting week. In this example, the promotion 522 spans the second week 504 and the third week 506, meaning the promotional sales are in two reporting weeks 532. Because only the third week 506 is flagged as a promotion, the data cleaner circuitry 304 is structured to move promotional sales of the second week 504 to the third week 506. This is herein referred to as a forward shift. In some examples, the data cleaner circuitry 304 may perform a backwards shift in which promotional sales from a subsequent week (e.g., the third week 506) can be moved to a previous week (e.g., the second week 504). For example, if the previous week is flagged as display type promotion and the subsequent week is flagged as a TPR type promotion due to misalignment, the promotional sales would typically need to be moved from the subsequent week to the previous week. As discussed above, the alignment model(s) 306 disclosed herein adds UPC-store sales data only to promotion-tagged weeks, but can take UPC-store sales data from adjacent promotional and/or non-promotional weeks. In some examples, a sales data period (e.g., week) associated with a display and/or a feature is a promotional week, while a sales data period (e.g., week) associated with a TPR or no promotion is determined to be a non-promotional week. However, a TPR can be considered a promotional week in other examples.

FIG. 6 is a data structure 600 illustrating an example implementation of the alignment model 306 disclosed herein. As illustrated in FIG. 6, the data structure 600 includes the example reporting weeks 532 of FIGS. 5B-5C, which summarize daily product sales at an example store for the five example weeks 502-510 of FIGS. 5A-5C, and the offset week. Thus, the third week 506 of the reporting weeks 532 is flagged with a display promotion indicator (e.g., represented by lighter gray shading) and the second week 504 of the reporting weeks 532 is flagged with a TPR promotion indicator e.g., represented by darker gray shading). As discussed above, the second week 504 is flagged as a TPR due to misalignment in the UPC-store sales data. In particular, the TPR is classified as a non-promotion TPR for the alignment model 306.

As illustrated in the data structure 600 of FIG. 6, example baseline volume 544 for the UPC-store is 75 units each day. The alignment model 306 determines example incremental volume 602 (e.g., or value, depending on an iteration) based on the reporting week 532 data and the baseline volume 544 (or value). For example, the incremental volume 602 for a given week 502-510 can be determined by subtracting the baseline volume 544 for the week 502-510 from the sales volume of a corresponding reporting week 532.

As discussed above in relation to FIG. 5A, the UPC-store sales data for the weekdays 516 (e.g., Monday through Friday) of the third week 506 was correctly flagged as promotional sales. Further, the store is closed on Sundays, resulting in zero sales on Sunday. Thus, for the third week 506, only the sales data on Saturday was incorrectly flagged. In this example, each weekday 516 accounts for 12.5% of the UPC-store volume data for a given reporting week 532, while Saturdays 518 account for 37.5% of the UPC-store volume data for the reporting week 532. Applying example Equations (4) and (5), an example PWIWA (p) and an example factor (f) of corresponding to the UPC-store for the third week 506 are p=5*0.125=0.625 and $$f = \frac{1 - 0.625}{0.625} = 0.6,$$

respectively.

The alignment model 306 determines an example (e.g., volume) move 604 value for the third week 506. In this example, the alignment model 306 determines missing increments for the third week 506 based on an incremental volume 602 for the third week 506 and the factor, f In particular, the alignment model 306 can apply equation (4), above, to determine the missing increments for the third week 506. For example, the alignment model 306 of FIG. 6 determines that the missing increments (mi) in the third week 506 is 63 units (e.g., mi=f*inc=0.6·105=63 units).

To determine whether 63 units can be moved from the second week 504 to the third week 506, the alignment model 306 identifies an example incremental volume 602 of the second week 504. As illustrated in FIG. 6, the incremental volume 602 available in the second week 504 is 74 units. The minimum of the incremental volume 602 in the second week 504 (e.g., 74 units) and the missing increments in the third week 506 (e.g., 63 units) is 63 units. That is, the minimum amount of volume between 74 units and 63 units is 63 units. As such, an example (e.g., volume) move 604 instruction is illustrated in the second week 504 and an example (e.g. volume) add 606 instruction is illustrated in the third week 506. That is, the alignment model 306 moves 63 units from the second week 504 and add the 63 units to the third week 506.

The data structure 600 of FIG. 6 illustrates example new volumes 608 based on alignment. In particular, the new volume 608 for the second week 504 is 86 units (e.g., 149 units less 63 units) and the new volume 608 for the third week 506 is 243 units (e.g., 180 units plus 63 units). The new volume 608 for the first, fourth, and fifth week 502, 508, 510 is the same as the reporting weeks 532 summaries because no promotion activity was identified in those weeks. Further, as illustrated in FIG. 6, the new volumes 608 are closer to the offset weeks 534 that align with the promotion 522 identified in relation to FIGS. 5A-5C of the example.

FIG. 7 illustrates an example data frame 700 (e.g., a first data frame, a detection data frame, etc.) for storing detection data in accordance with teachings of this disclosure. The data frame 700 includes example columns 702, each of which corresponds to a particular variable or type of data. For example, the data frame 700 of FIG. 7 includes variables discussed above, including detection ID 702A, market ID 702B, UPC 702C, period ID 702D, volume 702E, value 702F, promotion (e.g., promo) price 702G, discount 702H, regular price 7021, and all commodity value (ACV) 702J. While not explicitly illustrated in FIG. 7, the data frame 700 can include additional variable discussed above and/or other variables based on the extracted data.

The data frame 700 of FIG. 7 includes example rows 704, each of which corresponds to a particular detection ID, product (e.g., UPC) and a particular period (e.g., period ID) associated with the detection ID and the market ID. For example, the data frame 700 of FIG. 7 includes multiple rows, each of which correspond to the same detection ID (e.g., detection ID 12), the same market ID (e.g., market ID 5246995), but to different periods (e.g., period 1007, 1010, etc.) and to different UPCs (e.g., 48905574, 2207814, etc.).

The detection circuitry 308 of FIG. 3 can add columns 702 to the data frame 700 to facilitate promotion detection. Further, the detection circuitry 308 can populate cells in those columns 702 based on data in the data frame 700 and/or data external to the data frame 700. For example, the data frame 700 of FIG. 7 illustrates an example promotion (e.g., promo) week column 702K and an example out-of-stock (OOS) week column 702L added to the data frame 700. These columns 706, 708 are populated with flags or counters indicating that a particular row 704 corresponds to a promotion week and/or an OOS week. That is, the detection circuitry 308 can tag a line item as a promotion week and/or an OOS week by adding such an indication to a corresponding cell in a respective column 702A-L.

The data frame 700 of FIG. 7 is sorted first by detection ID, followed by market ID, UPC, and period ID. It is understood that the data frame 700 is organized as such to more easily detection promotion events, and can be organized differently in other examples. Further, FIG. 7 is provided as an illustrative example, and can change based on specific sales data used to generate and/or populate the data frame 700. As discussed above, the detection circuitry 308 identifies lines items (e.g., rows) in the data frame associated with a promotion to identify promotion periods for a particular UPC and market ID. The detection circuitry 308 can identify a promotion week based on a discount and/or based on causal data. For example, the detection circuitry 308 can identify a given row in the data frame 700 as discount week when a corresponding value in a discount column satisfies the discount parameter(s) in the data request 312. When the detection circuitry 308 identifies the discount week, the detection circuitry 308 tags the given row as a promotion week by including a "1" in the promotion week column. When the detection circuitry 308 identifies a causal week, the detection circuitry 308 tags the corresponding row as a promotion week (e.g., by including a "1" in the promotion week column).

For each flagged promotion week identified in the data frame 700, the detection circuitry 308 can determine an example promotion week lag (e.g., a value in a cell for a given UPC immediately prior to a given cell), an example promotion week lead (e.g., a value in a cell for a given UPC immediately after to a given cell), an example period ID lag (e.g., a period ID in a cell for a given UPC immediately prior to a given cell), and an example period ID lead (e.g., a period ID in a cell for a given UPC immediately after to a given cell). The promotion week lag and lead indicate whether a given UPC was also on promotion before a given promotion and/or after the given promotion, respectively. The period ID lag and lead indicate period IDs associated with the promotion lag and lead.

The detection circuitry 308 can identify an OOS week for a causal week indicated for a given row when (a) the promotion week lag is 1, (b) the promotion week lead is 1, (c) the period ID lag corresponds to the period ID of the given row minus one, (d) the period ID lead corresponds to the period ID of the given row plus one, and/or (e) when the given row is not associated with low inventory. The detection circuitry 308 iterates through rows (e.g., combination of detection ID, market ID, UPC, and period ID) in the data frame 700 to identify promotion weeks and OOS weeks as defined in the data request 312. As such, the detection circuitry 308 can identify rows 704 in the data frame 700 not associated with a promotion (e.g., non-promotional rows), and remove such rows from the data frame 700. When the detection circuitry 308 iterates through the data frame 700, the detection circuitry 308 filters out (e.g., removes) rows that are not associated with a promotion week. That is, the detection circuitry 308 removes rows that do not include a promotion week indicator.

By removing the non-promotion weeks, the detection circuitry 308 generates another example data frame (e.g., a second data frame, a promotion data frame, etc.) in which each row corresponds to promotional activity. In particular, the rows of the promotion data frame will include a UPC associated with a promotional period. In some examples, the detection circuitry 308 generates the promotion data frame based on the data frame 700 of FIG. 7 by keeping only relevant columns (e.g., removing columns not relevant for single-UPC detection).

The detection model 310 then iterates through the rows of the promotion data frame and determines lag values for certain variables (e.g., corresponding to respective columns). For example, the detection model 310 of FIG. 3 determines an example first lag (e.g., lag 1) and an example second lag (e.g., lag 2) for at least the OOS week, period ID, discount, percent of promotional baseline units, percent of DF baseline units, percent of display-only baseline units, percent of feature-only baseline units, percent of display-only baseline units, and promotion price columns. In some examples, the first lag value for a variable of a given row can correspond to a value in a cell of a row immediately adjacent the given row (e.g., before the given row). In some examples, the second lag value for a variable of a given row can correspond to a value in a cell of a row immediately adjacent the first lag cell (e.g., before the row corresponding to the first lag value).

The detection model 310 then iterates through the rows of the promotion data frame and determines difference values for certain variables (e.g., corresponding to respective columns). For example, the detection model 310 of FIG. 3 determines an example period difference for each row by subtracting a respective first lag value from a corresponding period ID value. A promotion event for a particular UPC-market can include one or more promotion weeks and/or one or more OOS weeks. However, as disclosed herein, the OOS week(s) in a promotion event is to be situated between two promotion weeks that correspond to the same promotion event. To account for OOS weeks, the detection model 310 determines whether to use the first lag value or the second lag value for at least the OOS week, period ID, discount, percent of promotional baseline units, percent of DF baseline units, percent of display-only baseline units, percent of feature-only baseline units, percent of display-only baseline units, and promotion price variables. For example, the detection model 310 determines to use the second lag value if the first lag value corresponds to an OOS week. That is, when an immediately adjacent week is an OOS week, the detection model 310 uses a difference between a given week (week t) two weeks prior (e.g., week t–2). Otherwise, the detection model 310 determines to use the first lag value (e.g., corresponding to week t–1). In doing so, the detection model 310 prevents a promotion event from starting or ending with an OOS week.

FIG. 8A-8C illustrate another example data frame 800 for detecting multi-product events. In particular, FIG. 8A illustrates a first portion of the data frame 800, which includes different columns representing different variable. The data frame 800 of FIG. 8A includes an example project ID column 802A, an example market ID column 802B, an example event ID column 802C, an example UPC column 802D, an example start column 802E, an example duration column 802F, an example end column 802G. FIG. 8B illustrates a second portion of the data frame 800, which includes different columns representing different variable. The data frame 800 of FIG. 8B includes an example promotion price column 802H, an example discount column 802I, an example regular price column 802J, an example WD column 802K, an example WD feature column 802L, an example size column 802M, an example brand column 802N, an example short brand column 802O, and an example manufacturer column 802P.

FIG. 8C illustrates a third portion of the data frame 800, which includes different columns representing different variable. The data frame 800 of FIG. 8C includes an example value column 802Q, an example index column 802R, an example brand column 802S, an example label column 802T, and an example cluster column 80U. Each of the first, second, and third portions of the data frame 800 include different rows 804, each of which corresponds to a particular project ID, a particular market ID, a particular UPC, and a particular period.

While an example manner of implementing the promotion analysis circuitry 102 of FIG. 1 is illustrated in FIG. 3, one or more of the elements, processes, and/or devices illustrated in FIG. 3 may be combined, divided, re-arranged, omitted, eliminated, and/or implemented in any other way. Further, the example data interface circuitry 302, the example data cleaner circuitry 304, the example detection circuitry 308, the example expansion circuitry 316, the example uplift determiner circuitry 318, the example data aggregator circuitry 324, the example trend identifier circuitry 326, and/or, more generally, the example promotion analysis circuitry 102 of FIG. 3, may be implemented by hardware alone or by hardware in combination with software and/or firmware. Thus, for example, any of the example data interface circuitry 302, the example data cleaner circuitry 304, the example detection circuitry 308, the example expansion circuitry 316, the example uplift determiner circuitry 318, the example data aggregator circuitry 324, the example trend identifier circuitry 326 and/or, more generally, the example promotion analysis circuitry 102, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example promotion analysis circuitry 102 of FIG. 3 may include one or more elements, processes, and/or devices in addition to, or instead of, those illustrated in FIG. 3, and/or may include more than one of any or all of the illustrated elements, processes and devices.

Flowchart(s) representative of example machine readable instructions, which may be executed by programmable circuitry to implement and/or instantiate the promotion analysis circuitry 102 of FIG. 3 and/or representative of example operations which may be performed by programmable circuitry to implement and/or instantiate the promotion analysis circuitry 102 of FIG. 3, are shown in FIGS. 9-18. The machine readable instructions may be one or more executable programs or portion(s) of one or more executable programs for execution by programmable circuitry such as the processor circuitry 1912 shown in the example processor platform 1900 discussed below in connection with FIG. 19 and/or may be one or more function(s) or portion(s) of functions to be performed by the example programmable circuitry (e.g., an FPGA) discussed below in connection with FIGS. 20 and/or 21. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 9-18, many other methods of implementing the example promotion analysis circuitry 102 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 9-18 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 9:
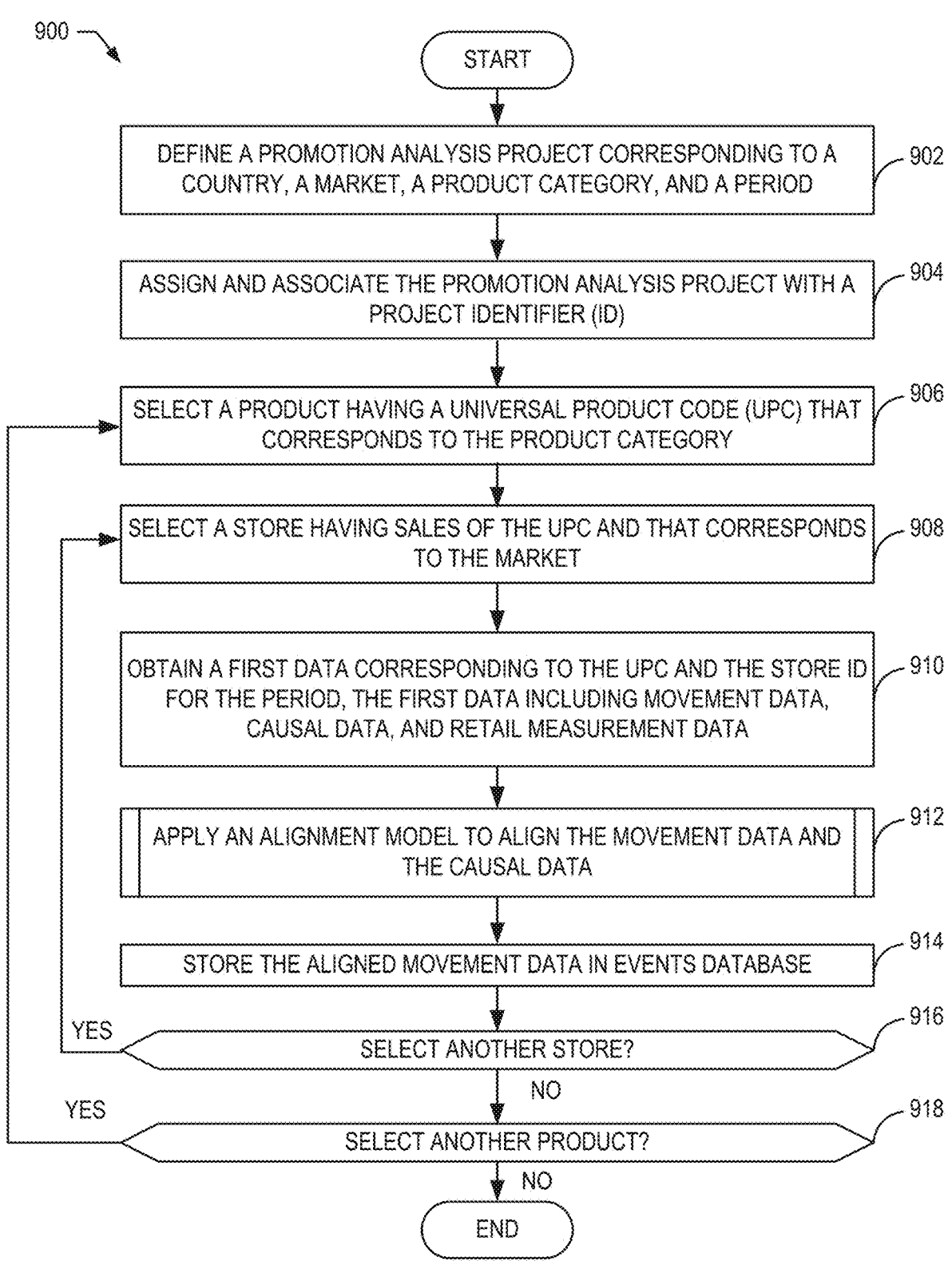

FIG. 9 is a flowchart representative of example machine readable instructions and/or example operations 900 that may be executed, instantiated, and/or performed by programmable circuitry to align sales data with causal data to generate sales data that represents prices and volume sold during a promoted time period. The example machine-readable instructions and/or the example operations 900 of FIG. 9 begin at block 902, at which example promotion analysis circuitry 102 defines an example promotion analysis project corresponding to a country, a market, a product category, and a period, the promotion analysis project associated with a project identifier (ID). In particular, the promotion analysis circuitry 102 defines the promotion analysis project by selecting the country, selecting a market associated with the country, selecting a product category (and/or subcategory) of interest that is sold in the market, and selecting a period of time (e.g., a reporting period, a week ending period). In some examples, the market is associated with a unique market ID and the period is associated with a unique period ID. In some examples, the selected period is a most recent period that has not undergone an alignment process. At block 904, the promotion analysis circuitry 102 assigns and associated the promotion analysis project a unique project identifier (ID). The project ID is a unique identifier associated with the promotion analysis project that can be used to store and identify the respective project in a database (e.g., example events database 104).

At block 906, example data cleaner circuitry 304 selects a product having a universal project code (UPC) that corresponds to the product category. In particular, the data cleaner circuitry 304 selects a UPC corresponding to the product category and that is sold in the market. At block 908, the data cleaner circuitry 304 selects a store having sales of the UPC and that corresponds to the market ID. In some examples, the store is associated with a unique store ID.

At block 910, the data cleaner circuitry 304 obtains first data corresponding to the UPC and to the store ID for the period, the first data including sales (e.g., movement) data, causal data, and retail measurement data. For example, the movement data can include point of sales (POS) sales data collected from respective stores that includes product volume and value data representing product movement data. For example, the data cleaner circuitry 304 can obtain UPC-store volume and UPC-store value data corresponding to sales of the UPC at the store during the period from an example sales data database 108, which is structured to collect and/or store point-of-sale (POS) sales data indicative of products sold in respective example stores 116. The causal data can include causal promotion information, including display indicator(s) and feature indicator(s). The retail measurement data includes UPC-store baseline volume, UPC-store baseline value, and UPC-store regular price data corresponding sales of the UPC at the store during historical periods. In some examples, the data cleaner circuitry 304 obtains the causal data and/or the retail measurement data from an example market database 110.

At block 912, the data cleaner circuitry 304 applies an example alignment model 306 to the first data to align the movement data and the causal data. In particular, the data cleaner circuitry 304 is structured to align sales data corresponding to a promotion with a reporting period tagged with the promotion. The application of the alignment model 306 is discussed in further detail in relation to FIG. 10, below. Control then advances to block 914 at which the data cleaner circuitry 304 stores aligned movement (e.g., sales) data in an example events database 104. In doing so, market participants can view the aligned movement data.

At block 916, the promotion analysis circuitry 102 determines whether to select another store. For example, the promotion analysis circuitry 102 may iterate through each store in the market that includes sales of the UPC. When the promotion analysis circuitry 102 identifies another store in the market having sales of the UPC (block 916=YES), control returns to block 908 at which the promotion analysis circuitry 102 selects another store associated with another unique store ID. On the other hand, when the promotion analysis circuitry 102 fails to identify another store in the market having sales of the UPC (block 916=NO), control advances to block 918.

At block 918, the promotion analysis circuitry 102 determines whether to select another product associated with another UPC. For example, the promotion analysis circuitry 102 may iterate through each product sold in the market that corresponds to the product category. When the promotion analysis circuitry 102 identifies another UPC that corresponds to the product category and the market (block 918=YES), control returns to block 906 at which the promotion analysis circuitry 102 selects another UPC corresponding to the product category and that is sold in the market. On the other hand, when the promotion analysis circuitry 102 fails to identify another UPC that corresponds to the product category and the market (block 918=NO), the alignment process for the project ID ends. In some examples, the promotion analysis circuitry 102 can define another project to begin another alignment process.

Figure 10:
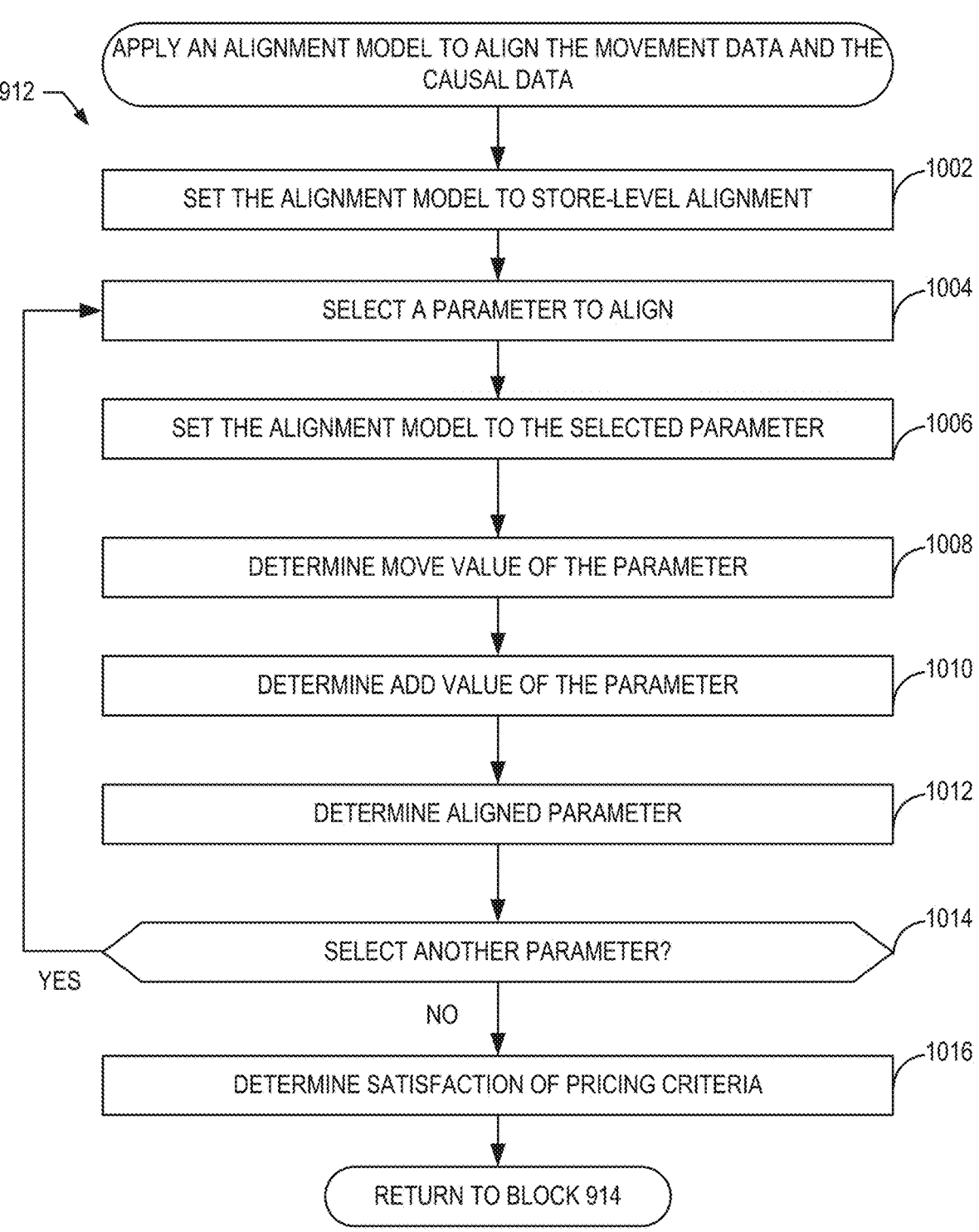

FIG. 10 is a flowchart representative of example machine readable instructions and/or example operations 912 that may be executed, instantiated, and/or performed by programmable circuitry to align the movement data with the causal data. The example machine-readable instructions and/or the example operations 912 of FIG. 10 begin at block 1002, at which the data cleaner circuitry 304 sets the alignment model 306 to a store-level alignment. That is, the store-level alignment can differ from a market-level alignment.

At block 1004, the data cleaner circuitry 304 selects a parameter to align. For example, the data cleaner circuitry 304 is structured to align the UPC-store value data separately from the UPC-store volume data. In some examples, the data cleaner circuitry 304 determines to align the UPC-store volume data. In other examples, the data cleaner circuitry 304 determines to align the UPC-store value data. At block 1006, the data cleaner circuitry 304 sets the alignment model 306 to the selected parameter. For example, the data cleaner circuitry 304 may set the alignment model 306 to volume alignment or to value alignment.

At block 1008, the data cleaner circuitry 304 determines a move value of the selected parameter. In particular, the data cleaner circuitry 304 applies the alignment model 306 to the first data to identify whether a portion(s) of the UPC-store volume/value data is to be added to a different period associated with a causal promotion period. The goal is to have all the sales that occurred during the causal promotion period in the reporting week that is flagged as a promotion. To determine the move value, the data cleaner circuitry 304 determines an example PWIWA and an example first UPC-store volume/value increment for the promotional week as well as a second UPC-store volume/value increment from a previous week. For example, the second UPC-store volume/value increment can be obtained from the retail measurement data retrieved from the retail measurement database.

At block 1010, the data cleaner circuitry 304 determines an add value of the selected parameter. In some examples, the add value is the move value. However, the data cleaner circuitry 304 is structured to not move more UPC-store volume/value than available in a week. To determine whether the move value can be moved to the current week, the data cleaner circuitry 304 considers the available increments of the previous week. In particular, the alignment model 306 determines to a minimum of (a) the UPC-store volume increment of the adjacent week, and (b) the missing increment of the promotional flagged week. The identified minimum is the add that is moved from the previous week to the current period.

At block 1012, the data cleaner circuitry 304 determines an example aligned parameter. That is, the data cleaner circuitry 304 determines new UPC-store volume/value data by adding the add value to the promotion period. In particular, the minimum of the UPC-store volume increment of the adjacent week and the missing increment of the promotional flagged week is moved from the adjacent week and added the promotional flagged week.

At block 1014, the data cleaner circuitry 304 determines whether to select another parameter. For example, the data cleaner circuitry 304 can determine to select UPC-store volume data if the UPC-store volume data has yet to be aligned or can determine to select UPC-store value data if the UPC-store value data has yet to be aligned. When the data cleaner circuitry 304 determines the UPC-store volume and/or value data has yet to be aligned, the data cleaner circuitry 304 can determine to select another parameter (e.g., block 1014=YES), at which control returns to block 1004. On the other hand, when the data cleaner circuitry 304 determines the UPC-store volume and value data have been aligned, the data cleaner circuitry 304 can determine not to select another parameter (e.g., block 1014=NO), at which control advances to block 1016.

At block 1016, the data cleaner circuitry 304 determines satisfaction of pricing criteria. In particular, the data cleaner circuitry 304 can determine whether a new volume (e.g., new volume and a new value satisfy an example Equation (6) to ensure that a new actual price is not greater than the corresponding baseline price. In doing so, the data cleaner circuitry 304 ensures that the ppi is not greater than one. For example, the data cleaner circuitry 304 can determine whether the aligned sales data satisfies pricing criteria. In some examples the pricing criteria is determined in a manner consistent with example Equations (6)-(9). Control then returns to block 914 of FIG. 9.

FIG. 11 is a flowchart representative of example machine readable instructions and/or example operations 1100 that may be executed, instantiated, and/or performed by programmable circuitry to align sales data with causal data to generate sales data that represents prices and volume sold during a promoted time period at a market level. The example machine-readable instructions and/or the example operations 1100 of FIG. 11 begin at block 1102, at which the data cleaner circuitry 304 identifies a project ID, the project ID associated with a country, a market ID, a product category, and a period. For example, the project ID can be a project ID generated by the promotion analysis circuitry 102 corresponding to a promotion analysis project. In some examples, the market is associated with a unique market ID and the period is associated with a unique period ID. The project ID is a unique identifier associated with the promotion analysis project that can be used to store and identify the respective project in a database (e.g., example events database 104).

At block 1104, example data cleaner circuitry 304 selects a product having a universal project code (UPC) that corresponds to the product category. In particular, the data cleaner circuitry 304 selects a UPC corresponding to the product category and that is sold in the market. At block 1106, the data cleaner circuitry 304 identifies stores corresponding to the market ID having sales associated with the UPC. In some examples, the stores are associated with respective store IDs.

At block 1108, the data cleaner circuitry 304 obtains first data corresponding to the UPC, the store ID, and to the market ID for the period, the first data including sales (e.g., movement) data, causal data, and retail measurement data. For example, the movement data can include point of sales (POS) sales data collected from respective stores that includes product volume and value data representing product movement data. For example, the data cleaner circuitry 304 can obtain UPC-store volume and UPC-store value data corresponding to sales of the UPC at the store during the period from an example sales data database 108, which is structured to collect and/or store point-of-sale (POS) sales data indicative of products sold in respective example stores 116. The causal data can include causal promotion information, including display indicator(s) and feature indicator(s). The retail measurement data includes UPC-store baseline volume, UPC-store baseline value, and UPC-store regular price data corresponding sales of the UPC at the store during historical periods. In some examples, the data cleaner circuitry 304 obtains the causal data and/or the retail measurement data from an example market database 110.

At block 1110, the data cleaner circuitry 304 aggregate instances of UPC-store sales data for the product to generate UPC-market sales data. For example, the data cleaner circuitry 304 can identify and aggregate instances of UPC-store volume data for the product to generate UPC-market volume data. Similarly, the data cleaner circuitry 304 can identify and aggregate instances of UPC-store value data for the product to generate UPC-market value data.

At block 1112, the data cleaner circuitry 304 applies an example alignment model 306 to the movement data and the causal data. In particular, the data cleaner circuitry 304 is structured to align sales data corresponding to a promotion with a reporting period tagged with the promotion. The application of the alignment model 306 is discussed in further detail in relation to FIG. 12, below. Control then advances to block 1114 at which the data cleaner circuitry 304 stores aligned movement (e.g., sales) data in an example events database 104. In doing so, market participants can view the aligned movement data.

At block 1116, the promotion analysis circuitry 102 determines whether to select another product. For example, the promotion analysis circuitry 102 may iterate through each product corresponding to the product category having sales in the market ID corresponding to the project ID. When the promotion analysis circuitry 102 identifies another product corresponding to the project category of the project ID and having sales in the market ID corresponding to the project ID (block 1116=YES), control returns to block 1104 at which the data cleaner circuitry 304 selects another product associated with another UPC. On the other hand, when the data cleaner circuitry 304 fails to identify another product (block 1116=NO), the data alignment at the market level for the project ID ends. In some examples, the promotion analysis circuitry 102 can define another project to begin another alignment process.

Figure 12:
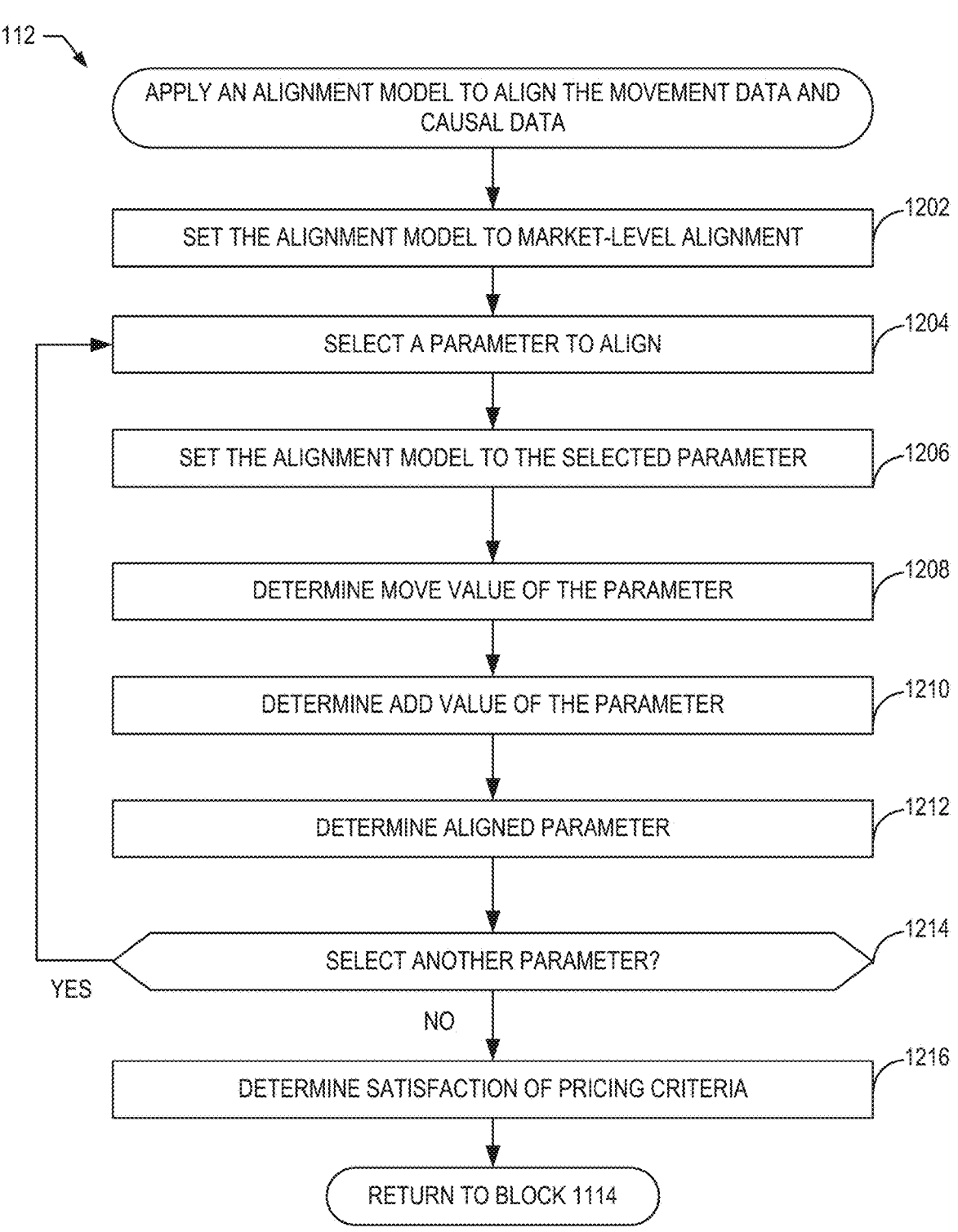

FIG. 12 is a flowchart representative of example machine readable instructions and/or example operations 1112 that may be executed, instantiated, and/or performed by programmable circuitry to apply an alignment model to align the movement data and the causal data. The example machine-readable instructions and/or the example operations 1112 of FIG. 12 begin at block 1202, at which the data cleaner circuitry 304 sets the alignment model 306 to a market-level alignment. That is, the market-level alignment can differ from the store-level alignment.

At block 1204, the data cleaner circuitry 304 selects a parameter to align. For example, the data cleaner circuitry 304 is structured to align the UPC-market value data separately from the UPC-market volume data. In some examples, the data cleaner circuitry 304 determines to align the UPC-market volume data. In other examples, the data cleaner circuitry 304 determines to align the UPC-market value data. At block 1206, the data cleaner circuitry 304 sets the alignment model 306 to the selected parameter. For example, the data cleaner circuitry 304 may set the alignment model 306 to volume alignment or to value alignment.

At block 1208, the data cleaner circuitry 304 determines a move value of the selected parameter. In particular, the data cleaner circuitry 304 applies the alignment model 306 to the first data to identify whether a portion(s) of the UPC-market volume/value data is to be added to a different period associated with a causal promotion period. The goal is to have all the sales that occurred during the causal promotion period in the reporting week that is flagged as a promotion. To determine the move value, the data cleaner circuitry 304 determines an example PWIWA and an example first UPC-market volume/value increment for the promotional week as well as a second UPC-market volume/value increment from a previous week. For example, the second UPC-market volume/value increment can be obtained from the retail measurement data retrieved from the retail measurement database.

At block 1210, the data cleaner circuitry 304 determines an add value of the selected parameter. In some examples, the add value is the move value. However, the data cleaner circuitry 304 is structured to not move more UPC-market volume/value than available in a week. To determine whether the move value can be moved to the current week, the data cleaner circuitry 304 considers the available increments of the previous week. In particular, the alignment model 306 determines to a minimum of (a) the UPC-store volume increment of the adjacent week, and (b) the missing increment of the promotional flagged week. The identified minimum is the add that is moved from the previous week to the current period.

At block 1212, the data cleaner circuitry 304 determines an example aligned parameter. That is, the data cleaner circuitry 304 determines new UPC-market volume/value data by adding the add value to the promotion period. In particular, the minimum of the UPC-market volume increment of the adjacent week and the missing increment of the promotional flagged week is moved from the adjacent week and added the promotional flagged week.

At block 1214, the data cleaner circuitry 304 determines whether to select another parameter. For example, the data cleaner circuitry 304 can determine to select UPC-market volume data if the UPC-market volume data has yet to be aligned or can determine to select UPC-market value data if the UPC-market value data has yet to be aligned. When the data cleaner circuitry 304 determines the UPC-market volume and/or value data has yet to be aligned, the data cleaner circuitry 304 can determine to select another parameter (e.g., block 1214=YES), at which control returns to block 1204. On the other hand, when the data cleaner circuitry 304 determines the UPC-market volume and value data have been aligned, the data cleaner circuitry 304 can determine not to select another parameter (e.g., block 1214=NO), at which control advances to block 1216.

At block 1216, the data cleaner circuitry 304 determines satisfaction of pricing criteria. In particular, the data cleaner circuitry 304 can determine whether a new volume (e.g., new volume and a new value satisfy an example Equation (6) to ensure that a new actual price is not greater than the corresponding baseline price. In doing so, the data cleaner circuitry 304 ensures that the ppi is not greater than one. For example, the data cleaner circuitry 304 can determine whether the aligned sales data satisfies pricing criteria. In some examples the pricing criteria is determined in a manner consistent with example Equations (6)-(9). Control then returns to block 1114 of FIG. 11.

FIG. 13 is a flowchart representative of example machine readable instructions and/or example operations 1300 that may be executed, instantiated, and/or performed by programmable circuitry to detect product-level promotions (e.g., single-UPC events). The example machine-readable instructions and/or the example operations 1300 of FIG. 13 begin at block 1302, at which the detection circuitry 308 defines a detection project and corresponding project identifier (detection ID) based on an example data request (e.g., data request 312). For example, the detection circuitry 308 defines the detection project for which to execute a detection process, and assigns a respective, unique project detection ID to the detection project (referred to as an detection ID to make clear that the detection process is separated from a project ID associated with a data alignment project). In particular, the detection circuitry 308 of FIG. 3 defines a detection project by identifying a country, and selecting a particular market (e.g., a market ID) and a particular product category corresponding to the country.

At block 1304, the detection circuitry 308 extract default and country-specific parameters (e.g., detection parameters) corresponding to the detection ID based on the data request 312. In particular, the default and country-specific define parameters of detection the define certain aspects of a promotion. In some examples, the default parameters include (but are not limited to) an example maximum event length, an example minimum number of weeks, and/or an example maximum number of weeks. In some examples, the default parameters include (but are not limited to) an example TPR limit, an example discount definition, an example discount minimum, an example discount maximum, an example discount tolerance, an example promotion distribution minimum, an example promotion distribution tolerance, an example causal promotion minimum, an example causal promotion maximum, an example causal promotion tolerance, and/or an example minimum incremental ratio.

At block 1306, the detection circuitry 308 obtains and aggregates data corresponding to the detection ID based on the data request 312. In particular, the data request 312 can include detection project-specific parameters that specify data to be extracted to run the detection project such as (but not limited to) the country, the selected product category, the selected market (e.g., market ID), and a corresponding remaining (e.g., competitive) market (e.g., to obtain the category-market percentile), an example end period (e.g., a last period to be analyzed), and/or a number of weeks (e.g. 26) in which to detect the single-UPC events (e.g., a duration of the detection period). In particular, the detection circuitry 308 obtains all available UPC-store-period sales data from the events database 104 that is associated with the data request 312. Further, the detection circuitry 308 obtains baseline data and/or causal data that corresponds to the UPC-store-period sales data extracted from the events database 104. In this example, the detection circuitry 308 obtains UPC-store-period all commodity value (ACV) data for each UPC and period ID corresponding to the detection ID. In some examples, the detection circuitry 308 obtains the sales data, the retail measurement data, and/or the causal data by product (e.g., UPC), by store (e.g., store IDs associated with the market ID), and by period (e.g., period ID) such that the data is extracted and stored in an organized manner. Further, the detection circuitry 308 of FIG. 3 aggregates the extracted UPC-store-period sales data to the market level (e.g., UPC-market-period) to generate detection data. In some examples, the detection circuitry 308 generates an example detection data structure such as, but not limited to, a data frame, etc. in which to store detection data.

At block 1308, the detection circuitry 308 splits the sales data into promotion-type groups. For example, the detection circuitry 308 can split the extracted data into the different promotion-type groups including (but not limited to) feature only, display only, display and feature (e.g., DF), TPR only, any TPR, etc. In some examples, the detection circuitry 308 adds each promotion-type group to a respective portion (e.g., column) in the data structure (e.g., data frame).

At block 1310, for ones of the promotion-type groups, the detection circuitry 308 summarizes (e.g., aggregates) the UPC-market-period data by combinations of (1) detection ID, (2) market ID, (3) UPC, and (4) period ID to generate detection data, the detection data stored in a detection data structure. In particular, the detection circuitry 308 summarizes the UPC-market-period sales data and/or other corresponding data for combinations of market ID, UPC, and period ID by promotion type and add the promotion-type UPC-market-period sales data to the detection. For example, the detection circuitry 308 can generate values including, but not limited to, feature-only volume, feature-only value, DF volume, DF value, display-only volume, display-only value, TPR-only volume, TPR-only value, any TPR volume, and any TPR value, promotion volume, promotion, feature-only baseline volume, feature-only baseline value, DF baseline volume, DF baseline value, display-only baseline volume, display-only baseline value, TPR-only baseline volume, TPR-only baseline value, any TPR baseline volume, any TPR baseline value, promotion baseline volume, and promotion baseline value, ACV, ACV feature, and/or ACV promotion.

At block 1312, the detection circuitry 308 derives detection facts from the summarized data, the detection facts added to the detection data structure. For example, the detection circuitry can derive detection facts including, but not limited to, promotion price, discount, percent of promotional baseline units, a percent of display-only baseline units, an example percent of feature-only baseline units, and an example percent of DF baseline units.

At block 1314, the detection circuitry 308 selects a UPC. For example, the detection circuitry 308 selects a UPC available in the detection data structure and identifies corresponding portions (e.g., rows and columns) having data associated therewith. For example, the detection circuitry 308 can identify rows in the detection data structure corresponding to the UPC. At block 1316, the detection circuitry 308 identifies a promotion week(s) and/or a low inventory week(s) corresponding to the UPC. For example, the detection circuitry 308 iterates through rows of the detection data structure corresponding to the UPC to detect promotion weeks and/or low inventors weeks based on parameters in the data structure 312. The detection circuitry 308 can identify a promotion week based on a discount and/or based on causal data. When the detection circuitry 308 identifies a promotion week and/or a low inventory week, the detection circuitry 308 provides such an indication(s) in the detection data structure. Control then advances to block 1318 at which the detection circuitry 308 determines whether to select another UPC. For example, the detection circuitry 308 can iterate through the detection data structure to apply the data request 312 parameters to the UPCs available in the detection data structure. When the detection circuitry 308 identifies another UPC for which to apply the data request 312 parameters (e.g., block 1318=YES), control returns to block 1314. When the detection circuitry 308 fails identifies another UPC for which to apply the data request 312 (e.g., block 1318=YES), control advances to block 1320.

At block 1320, the detection circuitry 308 generates a promotion data structure by removing entries in the detection data structure except for promotions not associated with a low inventory week. At block 1322, the detection circuitry 308 detects single-UPC events by applying an example promotion-level detection model 310 to the promotion data structure to cluster ones of the entries in the promotion data structure. The detection circuitry 308 applies the detection model 310 to the promotion data frame to detect the single-UPC events (e.g., thereby operating on UPC-market-period data). In particular, the detection model 310 iterates through the promotion data frame to group together line items that correspond to a same UPC and have similar metric values. For example, when the detection model 310 determines that two promotional weeks for a first UPC (1) are consecutive, (2) are similar in terms of discount and/or promotion distribution, and (3) correspond to an allowed combination of promotion types, the detection model 310 identifies the two promotional weeks as belonging to the same promotion event.

At block 1324, the detection circuitry 308 stores detected product-level events. For example, the detection circuitry 308 generates a product-level events database entry by providing each single-UPC event with a unique event ID. The detection circuitry 308 stores the single-UPC events in a product-level dimension or portion of the events database 104, in which different rows correspond a respective single-UPC events and different columns correspond to respective variables. For example, the product-level portion of the events database 104 can include columns for, at least, detection ID, market ID, UPC, period start, period count, and event ID.

FIG. 14 is a flowchart representative of example machine readable instructions and/or example operations 1316 that may be executed, instantiated, and/or performed by programmable circuitry to identify a promotion week(s) and/or a low inventory week(s) corresponding to the UPC. The example machine-readable instructions and/or the example operations 1316 of FIG. 14 begin at block 1402, at which the detection circuitry 308 iterates through the detection data structure to identify a promotion week(s) for the UPC based on corresponding discount-related detection facts relative to a discount definition. In particular, the detection circuitry 308 determines whether a given line item (e.g., row) for the UPC as a promotion week by comparing a corresponding value in a discount column of the in the detection data structure with a discount parameter in the data request 312. The detection circuitry 308 identifies the given line item as a discount week when the discount value satisfies the discount parameter(s) in the data request 312. When the detection circuitry 308 identifies the discount week, the detection circuitry 308 tags the given line item as a promotion week.

At block 1406, the detection circuitry 308 iterates through the detection data structure to identify a low inventory week(s) for the UPC. For example, the detection circuitry 308 detects low UPC inventory for a given line item when a respective UPC-market-period sales volume is less than or equal to an example factor (e.g., 0.1) times a corresponding UPC-market-period baseline volume. In some examples, the detection circuitry 308 flags the corresponding row a low inventory week upon such detection.

At block 1408, the detection circuitry 308 iterates through the detection data structure to identify a promotion week(s) for the UPC based on corresponding causal-related detection facts relative to a causal definition. For example, the detection circuitry 308 determines whether a given line item is associated with discount week and/or is not associated with a low inventory. When the given line item is not associated with the discount week and/or is associated with low inventory, the detection circuitry 308 identifies whether the line item is associated with causal week. In particular, the detection circuitry 308 identifies the line item as a causal week when (a) a summation of a corresponding percent of feature-only baseline volume, a corresponding a percent of DF baseline volume, and a corresponding percent of display-only baseline volume satisfies the discount parameters in the data request 312, (b) a corresponding promotion volume satisfies the incremental ratio parameters in the data request 312 times the respective promotion baseline volume, and (c) a summation of display-only sales volume, feature-only sales volume, and DF sales volume satisfies the incremental ratio parameters in the data request 312 times a summation of display-only baseline volume, feature-only baseline volume, and DF baseline volume. When the detection circuitry 308 identifies the causal week, the detection circuitry 308 tags the corresponding row as a promotion week.

At block 1410, the detection circuitry 308 iterates through the detection data structure to identify an out-of-stock (OOS) period for the UPC. For example, the detection model 310 determines a given line item corresponding to the UPC and a period (e.g., week) as an OOS week when the UPC is associated with a low inventory for the period (e.g., $week_t$) (b) the UPC was on promotion an immediately preceding week (e.g., $week_{t-1}$), and (c) the UPC was on promotion an immediately following week (e.g., $week_{t+1}$). When the detection circuitry 308 identifies the OOS week, the detection circuitry 308 tags the corresponding row as an OOS week. Control then returns to block 1318 (FIG. 13).

FIG. 15 is a flowchart representative of example machine readable instructions and/or example operations 1500 that may be executed, instantiated, and/or performed by programmable circuitry to detect a multi-product event. The example machine-readable instructions and/or the example operations 1500 of FIG. 15 begin at block 1502, at which the detection circuitry 308 generates a detection data structure by extracting data of interest from an events database 104, the data of interest including product-level events. For example, the detection circuitry 308 extract, via the data interface circuitry 302, single-UPC events and corresponding data from the portion of the product-level portion of the events database 104 and provides the data in an example multi-product detection data structure. In some examples, the multi-product detection data structure includes rows for each single-UPC event in the detection duration defined by the detection ID and columns corresponding to different variables, such as identification variables and promotion variables. For example, the multi-product detection data structure can include columns for, at least, detection ID, market ID, event ID, product ID, period start, and period count. In some examples, the multi-product detection data structure includes additional columns including (but not limited to) promotion price, discount, regular price, ACV selling, ACV promotion, ACV any feature, value (promotional sales), product size (e.g., 92 fluid ounce), brand name, and manufacturer name. The detection circuitry 308 can populate the multi-product detection data structure by extracting and/or determining values for each variable and single-UPC event.

At block 1504, the detection circuitry 308 determines promotion distribution facts, and adds the promotion distribution facts to the multi-product detection data structure. For example, the detection circuitry 308 determines, at least, promotion distribution in stores selling a respective UPC (e.g., 100 times a ration of ACV promotion to ACV selling) and feature distribution in stores selling a respective UPC (e.g., 100 times a ration of ACV feature to ACV promotion). In some examples, the detection circuitry 308 determines a period end by adding a promotion duration to a promotion period start. At block 1506, the detection circuitry 308 transforms product sizes to numeric variables. For example, the detection circuitry 308 can change 92 fluid ounces to "92".

At block 1508, the detection circuitry 308 selects a manufacturer. That is, the detection circuitry 308 iterates through manufacturers identified in the multi-product detection data structure. For example, the detection circuitry 308 can select a manufacturer for which a detection model 314 has yet to be applied for the detection ID.

At block 1510, the detection circuitry 308 executes a cluster algorithm per brand associated with the manufacturers to label product-level events. In particular, the detection circuitry 310 applies an example detection model 314 to each of the brands associated with the manufacturers. The detection model 314 applies a clustering technique to the single-UPC events to detect a multi-product events. In some examples, the detection model 314 applies a density-base spatial clustering of applications with noise (DBSCAN) algorithm, but can be another clustering algorithm in other examples. The detection model 314 of FIG. 3 detection multi-product events by grouping together single-UPC events that are similar in terms of a start period, an end period (e.g., last week of the respective event ID), a promotion price, a discount, a promotion distribution (WD), a feature distribution (WD feature), and product size.

At block 1512, the detection circuitry 308 generates clusters based on the labels, and assigns each cluster a respective cluster ID. The detection model 314 outputs clusters of single-UPC events having similar execution metrics. In other words, two or more UPCs are grouped into a single event directly off of the multi-product detection frame based on how respective single-UPC events are executed in the market. At block 1514, the detection circuitry 308 determines whether to select another manufacturer. When the detection circuitry 308 determines to select another manufacturer (e.g., block 1514=YES), control returns to block 1508. Otherwise, control advances to block 1516.

At block 1516, for ones of the product-level events of a given cluster ID, the detection circuitry 308 determines a start period and an end period. The detection circuitry 308 provides a cluster start period and a cluster end period for each single-UPC event in a multi-product promotion event. For example, the detection circuitry 308 can add and populate columns for the start periods and the end periods to the multi-product detection data structure. In some examples, the detection circuitry 308 extend a single-UPC event in duration by a week (e.g., due to an 00S week, a delay in the promotion execution, etc.) For example, if a UPC corresponding to the single UPC event is associated with another promotion event one period before the start period of the single-UPC event or one period after the end period of the single-UPC event, the single-UPC event cannot be extended.

At block 1518, the detection circuitry 308 generates second clusters by concatenating, for the ones of the product-level events, a respective cluster ID, start period, and end period. At block 1520, the detection circuitry 308 splits ones of the second clusters. An example implementation of a cluster splitting process is discussed in relation to FIG. 16, below. Control then advances to block 1522 at which the detection circuitry 308 assigned detected multi-product events a unique, respective multi-product event ID. In some examples, the multi-product event IDs can include a respective detection ID, an indication that the event is a multi-product event, a corresponding product ID(s) (e.g., UPC(s)), a start period, and/or other information. For example, the UPC can be a first UPC in the cluster, a UPC in the cluster having the highest promotion value sales within the multi UPCs event, multiple UPCs, etc.

At block 1524, the detection circuitry 308 stores the detected multi-product event. For example, the detection circuitry 308 can generate a multi-product events database entry by providing each single-UPC event with a respective multi-product event ID. For example, the single-UPC events portion of the events database 104 can the single-UPC events, certain ones of which include an indication that respective single-UPCs are part of a multi-UPC event. That is, each row (e.g., line item, object, etc.) in the product-level portion of the events database 104 corresponds to a particular single-UPC event associated with a respective, unique event ID.

FIG. 16 is a flowchart representative of example machine readable instructions and/or example operations 1518 that may be executed, instantiated, and/or performed by programmable circuitry to split ones of the second clusters. The example machine-readable instructions and/or the example operations 1518 of FIG. 16 begin at block 1602, at which the detection circuitry 308 selects a second cluster of the second clusters.

At block 1604, the detection circuitry 308 determines a first coefficient of variation for a corresponding promotion price and a second coefficient of variation for a corresponding discount for ones of the product-level events in the selected second cluster.

At block 1606, the detection circuitry 308 selects a product-level event.

At block 1608, the detection circuitry 308 determines whether the first coefficient of variation and/or the second coefficient of variation is less than a first threshold value. When the first coefficient of variation and/or the second coefficient of variation is less than a first threshold value (e.g., block 1608=YES), control advances to block 1610. At block 1610, the detection circuitry 308 determines not to split the selected second cluster. Control then advances to block 1616 at which detection circuitry 308 determines whether to select another second cluster of the second clusters.

On the other hand, when the first coefficient of variation and/or the second coefficient of variation is not less than a first threshold value (e.g., block 1608=NO), control advances to block 1612. At block 1612, the detection circuitry 308 determines to split the selected second cluster. At block 1614, the detection circuitry 308 add an indication of the split to the multi-product detection data structure. Control then advances to block 1616 at which the detection circuitry 308 determines whether to select another second cluster of the second clusters. When the detection circuitry 308 determines to select another second cluster (e.g., block 1616=YES), control returns to block 1602. Otherwise, control advances to block 1618. At block 1618, the detection circuitry 308 removes a split indication when a cluster split includes one product-level event in the cluster split. Control then returns to block 1522 (FIG. 15).

FIG. 17 is a flowchart representative of example machine readable instructions and/or example operations 1700 that may be executed, instantiated, and/or performed by programmable circuitry to enrich promotion events with different information. The example machine-readable instructions and/or the example operations 1700 of FIG. 17 begin at block 1702, at which the expansion circuitry 316 defines an enrichment project and assigns the enrichment project an enrichment ID.

At block 1704, the enrichment circuitry 316 obtains promotion uplift data, promotion event data, and product data corresponding to the enrichment ID. At block 1706, the enrichment circuitry 316 applies the multipliers to determine incremental sales.

At block 1708, the enrichment circuitry 316 applies a constraint to the incremental sales. At block 1710, the enrichment circuitry 316 outputs enriched promotion event data with incremental sales facts. At block 1712, the enrichment circuitry 316 stores the enriched promotion even data and the corresponding incremental sales facts in the events database 104. At block 1714, the enrichment circuitry 316 generates a report. At block 1716, the enrichment circuitry 316 publishes the report.

FIG. 18 is a flowchart representative of example machine readable instructions and/or example operations 1706 that may be executed, instantiated, and/or performed by programmable circuitry to determine multipliers for each promotion type based on uplifts to a subcategory. The example machine-readable instructions and/or the example operations 1706 of FIG. 18 begin at block 1802, at which the uplift determiner circuitry 318 identifies a period.

At block 1804, the uplift determiner circuitry 318 identifies a period corresponding to the enrichment ID. At block 1806, the uplift determiner circuitry 318 extracts data corresponding to the period. At block 1808, the uplift determiner circuitry 318 aggregates the data by market, product category, product sub-category, and by promotion period. At block 1810, the uplift determiner circuitry 318 applies a statistical model 320 to determine different coefficients. At block 1812, the uplift determiner circuitry 318 determine first multipliers based on the coefficients. In particular, ones of the first multipliers corresponding to respective promotion characteristics. At block 1814, the uplift determiner circuitry 318 enforces business rules to determine whether the first multipliers satisfy a market/sub-category condition(s). At block 1816, the uplift determiner circuitry 318 determines whether to apply another statistical model 320.

At block 1818, the uplift determiner circuitry 318 determines promotion characteristic (e.g., promotion mechanics) multipliers. In particular, the uplift determiner circuitry 318 selects a statistical model of the statistical models 320 based on the business rules 322. For example, the uplift determiner circuitry 318 can the statistical model 320 having a highest percentage of overall plausible coefficients (e.g., coefficients falling in the interval [0, 1]). For example, the uplift determiner circuitry 318 selects the coefficients from the selected model to generate the uplifts. The promotion characteristic multipliers correspond to respective multipliers associated with the selected statistical model 320. At block 1820, the uplift determiner circuitry 318 stores the promotion characteristic multipliers with the enrichment ID.

Figure 19:
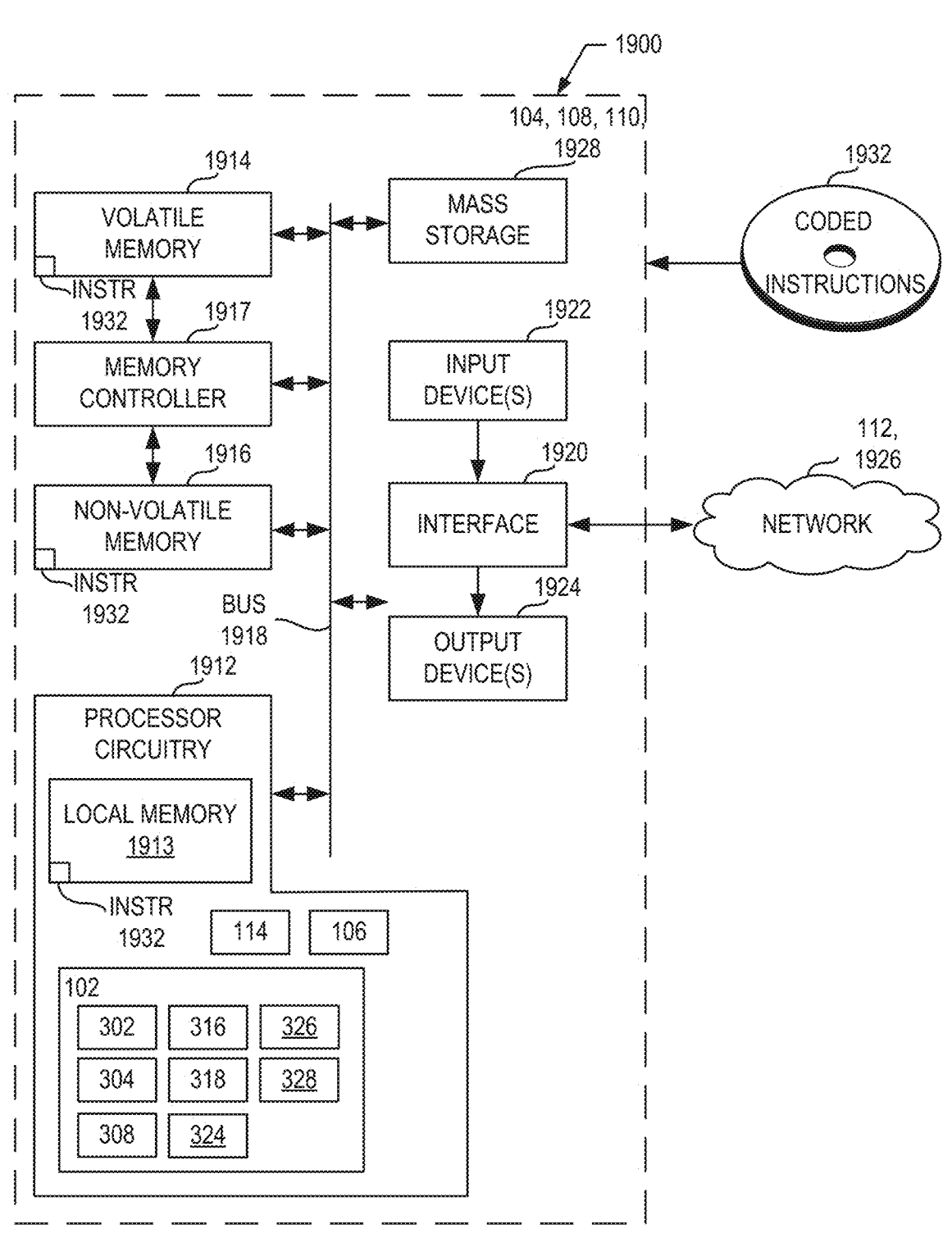
FIG. 19 is a block diagram of an example processing platform including programmable circuitry structured to execute, instantiate, and/or perform the example machine readable instructions and/or perform the example operations of FIGS. 9-18 to implement the promotion analysis circuitry 102 of FIG. 3.

FIG. 19 is a block diagram of an example programmable circuitry platform 1900 structured to execute and/or instantiate the example machine-readable instructions and/or the example operations of FIGS. 9-18 to implement the promotion analysis circuitry 102 of FIG. 3. The programmable circuitry platform 1900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1900 of the illustrated example includes programmable circuitry 1912. The programmable circuitry 1912 of the illustrated example is hardware. For example, the programmable circuitry 1912 can be implemented by one or more integrated circuits, logic circuits, FPGAs, microprocessors, CPUs, GPUs, DSPs, and/or microcontrollers from any desired family or manufacturer. The programmable circuitry 1912 may be implemented by one or more semiconductor based (e.g., silicon based) devices. In this example, the programmable circuitry 1912 implements the example data interface circuitry 302, the example data cleaner circuitry 304, the example detection circuitry 308, the example expansion circuitry 316, the example uplift determiner circuitry 318, and the example data aggregator circuitry 324.

The programmable circuitry 1912 of the illustrated example includes a local memory 1913 (e.g., a cache, registers, etc.). The programmable circuitry 1912 of the illustrated example is in communication with main memory 1914, 1916, which includes a volatile memory 1914 and a non-volatile memory 1916, by a bus 1918. The volatile memory 1914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1916 may be implemented by flash memory and/or any other desired type of memory device. Access to the main memory 1914, 1916 of the illustrated example is controlled by a memory controller 1917. In some examples, the memory controller 1917 may be implemented by one or more integrated circuits, logic circuits, microcontrollers from any desired family or manufacturer, or any other type of circuitry to manage the flow of data going to and from the main memory 1914, 1916.

The programmable circuitry platform 1900 of the illustrated example also includes interface circuitry 1920. The interface circuitry 1920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1922 are connected to the interface circuitry 1920. The input device(s) 1922 permit(s) a user (e.g., a human user, a machine user, etc.) to enter data and/or commands into the programmable circuitry 1912. The input device(s) 1922 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1924 are also connected to the interface circuitry 1920 of the illustrated example. The output device(s) 1924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1920 of the illustrated example, thus, typically includes a graphics driver card, a graphics driver chip, and/or graphics processor circuitry such as a GPU.

The interface circuitry 1920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1926. The communication can be by, for example, an Ethernet connection, a digital subscriber line (DSL) connection, a telephone line connection, a coaxial cable system, a satellite system, a beyond-line-of-site wireless system, a line-of-site wireless system, a cellular telephone system, an optical connection, etc.

The programmable circuitry platform 1900 of the illustrated example also includes one or more mass storage discs or devices 1928 to store firmware, software, and/or data. Examples of such mass storage discs or devices 1928 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1932, which may be implemented by the machine readable instructions of FIGS. 9-18, may be stored in the mass storage device 1928, in the volatile memory 1914, in the non-volatile memory 1916, and/or on at least one non-transitory computer readable storage medium such as a CD or DVD which may be removable.

Figure 20:
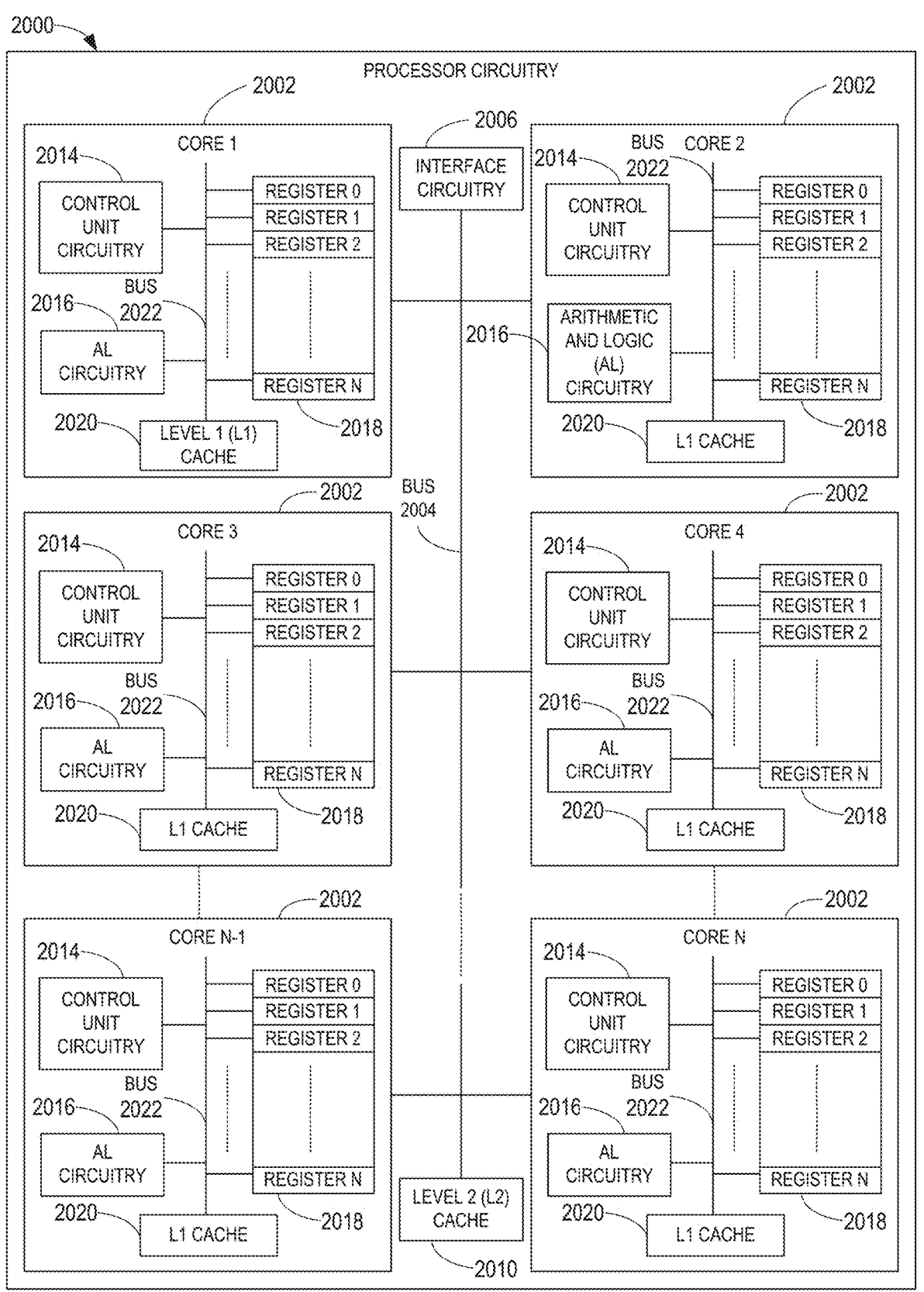
FIG. 20 is a block diagram of an example implementation of the programmable circuitry of FIG. 19.

FIG. 20 is a block diagram of an example implementation of the programmable circuitry 1912 of FIG. 19. In this example, the programmable circuitry 1912 of FIG. 19 is implemented by a microprocessor 2000. For example, the microprocessor 2000 may be a general-purpose microprocessor (e.g., general-purpose microprocessor circuitry). The microprocessor 2000 executes some or all of the machine-readable instructions of the flowcharts of FIGS. 9-18 to effectively instantiate the circuitry of FIG. 3 as logic circuits to perform operations corresponding to those machine readable instructions. In some such examples, the circuitry of FIG. 3 is instantiated by the hardware circuits of the microprocessor 2000 in combination with the machine-readable instructions. For example, the microprocessor 2000 may be implemented by multi-core hardware circuitry such as a CPU, a DSP, a GPU, an XPU, etc. Although it may include any number of example cores 2002 (e.g., 1 core), the microprocessor 2000 of this example is a multi-core semiconductor device including N cores. The cores 2002 of the microprocessor 2000 may operate independently or may cooperate to execute machine readable instructions. For example, machine code corresponding to a firmware program, an embedded software program, or a software program may be executed by one of the cores 2002 or may be executed by multiple ones of the cores 2002 at the same or different times. In some examples, the machine code corresponding to the firmware program, the embedded software program, or the software program is split into threads and executed in parallel by two or more of the cores 2002. The software program may correspond to a portion or all of the machine readable instructions and/or operations represented by the flowcharts of FIGS. 9-18.

The cores 2002 may communicate by a first example bus 2004. In some examples, the first bus 2004 may be implemented by a communication bus to effectuate communication associated with one(s) of the cores 2002. For example, the first bus 2004 may be implemented by at least one of an Inter-Integrated Circuit (I2C) bus, a Serial Peripheral Interface (SPI) bus, a PCI bus, or a PCIe bus. Additionally or alternatively, the first bus 2004 may be implemented by any other type of computing or electrical bus. The cores 2002 may obtain data, instructions, and/or signals from one or more external devices by example interface circuitry 2006.

The cores 2002 may output data, instructions, and/or signals to the one or more external devices by the interface circuitry 2006. Although the cores 2002 of this example include example local memory 2020 (e.g., Level 1 (L1) cache that may be split into an L1 data cache and an L1 instruction cache), the microprocessor 2000 also includes example shared memory 2010 that may be shared by the cores (e.g., Level 2 (L2 cache)) for high-speed access to data and/or instructions. Data and/or instructions may be transferred (e.g., shared) by writing to and/or reading from the shared memory 2010. The local memory 2020 of each of the cores 2002 and the shared memory 2010 may be part of a hierarchy of storage devices including multiple levels of cache memory and the main memory (e.g., the main memory 1914, 1916 of FIG. 19). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2002 may be referred to as a CPU, DSP, GPU, etc., or any other type of hardware circuitry. Each core 2002 includes control unit circuitry 2014, arithmetic and logic (AL) circuitry (sometimes referred to as an ALU) 2016, a plurality of registers 2018, the local memory 2020, and a second example bus 2022. Other structures may be present. For example, each core 2002 may include vector unit circuitry, single instruction multiple data (SIMD) unit circuitry, load/store unit (LSU) circuitry, branch/jump unit circuitry, floating-point unit (FPU) circuitry, etc. The control unit circuitry 2014 includes semiconductor-based circuits structured to control (e.g., coordinate) data movement within the corresponding core 2002. The AL circuitry 2016 includes semiconductor-based circuits structured to perform one or more mathematic and/or logic operations on the data within the corresponding core 2002. The AL circuitry 2016 of some examples performs integer based operations. In other examples, the AL circuitry 2016 also performs floating-point operations. In yet other examples, the AL circuitry 2016 may include first AL circuitry that performs integer-based operations and second AL circuitry that performs floating-point operations. In some examples, the AL circuitry 2016 may be referred to as an Arithmetic Logic Unit (ALU).

The registers 2018 are semiconductor-based structures to store data and/or instructions such as results of one or more of the operations performed by the AL circuitry 2016 of the corresponding core 2002. For example, the registers 2018 may include vector register(s), SIMD register(s), general-purpose register(s), flag register(s), segment register(s), machine-specific register(s), instruction pointer register(s), control register(s), debug register(s), memory management register(s), machine check register(s), etc. The registers 2018 may be arranged in a bank as shown in FIG. 20. Alternatively, the registers 2018 may be organized in any other arrangement, format, or structure, such as by being distributed throughout the core 2002 to shorten access time. The second bus 2022 may be implemented by at least one of an I2C bus, a SPI bus, a PCI bus, or a PCIe bus.

Each core 2002 and/or, more generally, the microprocessor 2000 may include additional and/or alternate structures to those shown and described above. For example, one or more clock circuits, one or more power supplies, one or more power gates, one or more cache home agents (CHAs), one or more converged/common mesh stops (CMS s), one or more shifters (e.g., barrel shifter(s)) and/or other circuitry may be present. The microprocessor 2000 is a semiconductor device fabricated to include many transistors interconnected to implement the structures described above in one or more integrated circuits (ICs) contained in one or more packages.

The microprocessor 2000 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 2000, in the same chip package as the microprocessor 2000 and/or in one or more separate packages from the microprocessor 2000.

Figure 21:
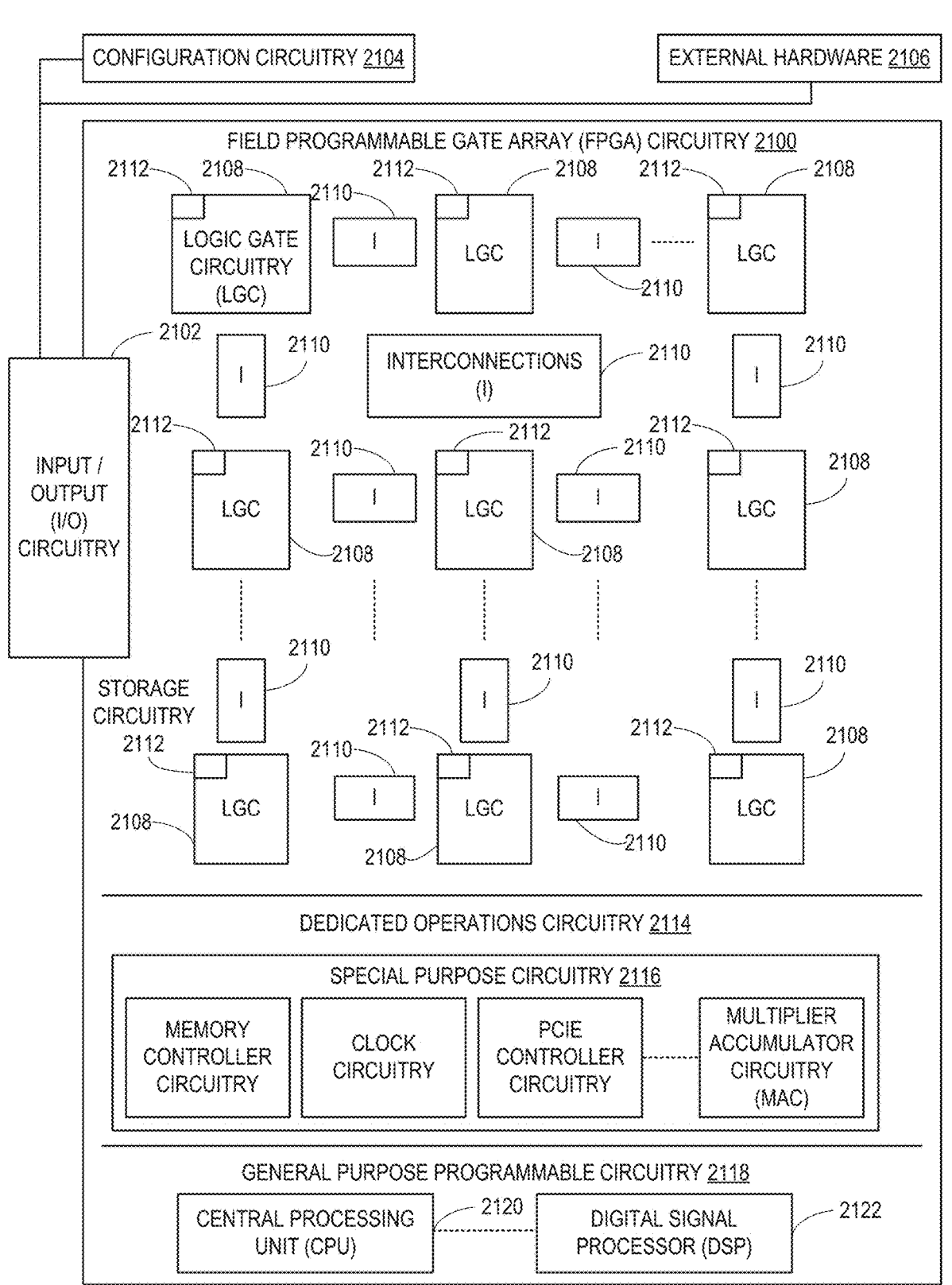
FIG. 21 is a block diagram of another example implementation of the programmable circuitry of FIG. 19.

FIG. 21 is a block diagram of another example implementation of the programmable circuitry 1912 of FIG. 19. In this example, the programmable circuitry 1912 is implemented by FPGA circuitry 2100. For example, the FPGA circuitry 2100 may be implemented by an FPGA. The FPGA circuitry 2100 can be used, for example, to perform operations that could otherwise be performed by the example microprocessor 2000 of FIG. 20 executing corresponding machine readable instructions. However, once configured, the FPGA circuitry 2100 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 2000 of FIG. 20 described above (which is a general purpose device that may be programmed to execute some or all of the machine readable instructions represented by the flowchart(s) of FIGS. 9-18 but whose interconnections and logic circuitry are fixed once fabricated), the FPGA circuitry 2100 of the example of FIG. 21 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 9-18. In particular, the FPGA circuitry 2100 may be thought of as an array of logic gates, interconnections, and switches. The switches can be programmed to change how the logic gates are interconnected by the interconnections, effectively forming one or more dedicated logic circuits (unless and until the FPGA circuitry 2100 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 9-18. As such, the FPGA circuitry 2100 may be configured and/or structured to effectively instantiate some or all of the operations/functions corresponding to the machine readable instructions of the flowchart(s) of FIGS. 9-18 as dedicated logic circuits to perform the operations/functions corresponding to those software instructions in a dedicated manner analogous to an ASIC. Therefore, the FPGA circuitry 2100 may perform the operations/functions corresponding to the some or all of the machine readable instructions of FIGS. 9-18 faster than the general-purpose microprocessor can execute the same.

In the example of FIG. 21, the FPGA circuitry 2100 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 2100 of FIG. 21 may access and/or load the binary file to cause the FPGA circuitry 2100 of FIG. 21 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 2100 of FIG. 21 to cause configuration and/or structuring of the FPGA circuitry 2100 of FIG. 21, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 2100 of FIG. 21 may access and/or load the binary file to cause the FPGA circuitry 2100 of FIG. 21 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 2100 of FIG. 21 to cause configuration and/or structuring of the FPGA circuitry 2100 of FIG. 21, or portion(s) thereof.

The FPGA circuitry 2100 of FIG. 21, includes example input/output (I/O) circuitry 2102 to obtain and/or output data to/from example configuration circuitry 2104 and/or external hardware 2106. For example, the configuration circuitry 2104 may be implemented by interface circuitry that may obtain a binary file, which may be implemented by a bit stream, data, and/or machine-readable instructions, to configure the FPGA circuitry 2100, or portion(s) thereof. In some such examples, the configuration circuitry 2104 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 2106 may be implemented by external hardware circuitry. For example, the external hardware 2106 may be implemented by the microprocessor 2000 of FIG. 20.

The FPGA circuitry 2100 also includes an array of example logic gate circuitry 2108, a plurality of example configurable interconnections 2110, and example storage circuitry 2112. The logic gate circuitry 2108 and the configurable interconnections 2110 are configurable to instantiate one or more operations/functions that may correspond to at least some of the machine readable instructions of FIGS. 9-18 and/or other desired operations. The logic gate circuitry 2108 shown in FIG. 21 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2108 to enable configuration of the electrical structures and/or the logic gates to form circuits to perform desired operations/functions. The logic gate circuitry 2108 may include other electrical structures such as look-up tables (LUTs), registers (e.g., flip-flops or latches), multiplexers, etc.

The configurable interconnections 2110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2108 to program desired logic circuits.

The storage circuitry 2112 of the illustrated example is structured to store result(s) of the one or more of the operations performed by corresponding logic gates. The storage circuitry 2112 may be implemented by registers or the like. In the illustrated example, the storage circuitry 2112 is distributed amongst the logic gate circuitry 2108 to facilitate access and increase execution speed.

The example FPGA circuitry 2100 of FIG. 21 also includes example dedicated operations circuitry 2114. In this example, the dedicated operations circuitry 2114 includes special purpose circuitry 2116 that may be invoked to implement commonly used functions to avoid the need to program those functions in the field. Examples of such special purpose circuitry 2116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2100 may also include example general purpose programmable circuitry 2118 such as an example CPU 2120 and/or an example DSP 2122. Other general purpose programmable circuitry 2118 may additionally or alternatively be present such as a GPU, an XPU, etc., that can be programmed to perform other operations.

Although FIGS. 20 and 21 illustrate two example implementations of the programmable circuitry 1912 of FIG. 19, many other approaches are contemplated. For example, FPGA circuitry may include an on-board CPU, such as one or more of the example CPU 2120 of FIG. 20. Therefore, the programmable circuitry 1912 of FIG. 19 may additionally be implemented by combining at least the example microprocessor 2000 of FIG. 20 and the example FPGA circuitry 2100 of FIG. 21. In some such hybrid examples, one or more cores 2002 of FIG. 20 may execute a first portion of the machine readable instructions represented by the flowchart(s) of FIGS. 9-18 to perform first operation(s)/function(s), the FPGA circuitry 2100 of FIG. 21 may be configured and/or structured to perform second operation(s)/function(s) corresponding to a second portion of the machine readable instructions represented by the flowcharts of FIG. 9-18, and/or an ASIC may be configured and/or structured to perform third operation(s)/function(s) corresponding to a third portion of the machine readable instructions represented by the flowcharts of FIGS. 9-18.

It should be understood that some or all of the circuitry of FIG. 3 may, thus, be instantiated at the same or different times. For example, same and/or different portion(s) of the microprocessor 2000 of FIG. 20 may be programmed to execute portion(s) of machine-readable instructions at the same and/or different times. In some examples, same and/or different portion(s) of the FPGA circuitry 2100 of FIG. 21 may be configured and/or structured to perform operations/functions corresponding to portion(s) of machine-readable instructions at the same and/or different times.

In some examples, some or all of the circuitry of FIG. 3 may be instantiated, for example, in one or more threads executing concurrently and/or in series. For example, the microprocessor 2000 of FIG. 20 may execute machine readable instructions in one or more threads executing concurrently and/or in series. In some examples, the FPGA circuitry 2100 of FIG. 21 may be configured and/or structured to carry out operations/functions concurrently and/or in series. Moreover, in some examples, some or all of the circuitry of FIG. 3 may be implemented within one or more virtual machines and/or containers executing on the microprocessor 2000 of FIG. 20.

In some examples, the programmable circuitry 1912 of FIG. 19 may be in one or more packages. For example, the microprocessor 2000 of FIG. 20 and/or the FPGA circuitry 2100 of FIG. 21 may be in one or more packages. In some examples, an XPU may be implemented by the programmable circuitry 1912 of FIG. 19, which may be in one or more packages. For example, the XPU may include a CPU (e.g., the microprocessor 2000 of FIG. 20, the CPU 2120 of FIG. 21, etc.) in one package, a DSP (e.g., the DSP 2122 of FIG. 21) in another package, a GPU in yet another package, and an FPGA (e.g., the FPGA circuitry 2100 of FIG. 21) in still yet another package.

Figure 22:
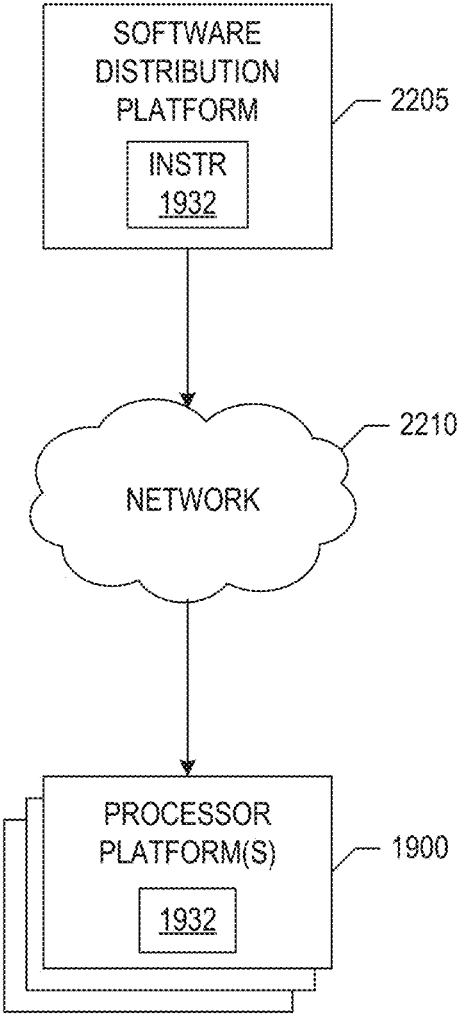
FIG. 22 is a block diagram of an example software/firmware/instructions distribution platform (e.g., one or more servers) to distribute software, instructions, and/or firmware (e.g., corresponding to the example machine readable instructions of FIGS. 9-18) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers). In general, the same reference numbers will be used throughout the drawing(s) and accompanying written description to refer to the same or like parts. The figures are not necessarily to scale. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

A block diagram illustrating an example software distribution platform 2205 to distribute software such as the example machine readable instructions 1932 of FIG. 19 to other hardware devices (e.g., hardware devices owned and/or operated by third parties from the owner and/or operator of the software distribution platform) is illustrated in FIG. 22. The example software distribution platform 2205 may be implemented by any computer server, data facility, cloud service, etc., capable of storing and transmitting software to other computing devices. The third parties may be customers of the entity owning and/or operating the software distribution platform 2205. For example, the entity that owns and/or operates the software distribution platform 2205 may be a developer, a seller, and/or a licensor of software such as the example machine readable instructions 1932 of FIG. 19. The third parties may be consumers, users, retailers, OEMs, etc., who purchase and/or license the software for use and/or re-sale and/or sub-licensing. In the illustrated example, the software distribution platform 2205 includes one or more servers and one or more storage devices. The storage devices store the machine readable instructions 1932, which may correspond to the example machine readable instructions of FIGS. 9-18, as described above. The one or more servers of the example software distribution platform 2205 are in communication with an example network 2210, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1932 from the software distribution platform 2205. For example, the software, which may correspond to the example machine readable instructions of FIG. 9-18, may be downloaded to the example programmable circuitry platform 1900, which is to execute the machine readable instructions 1932 to implement the promotion analysis circuitry 102. In some examples, one or more servers of the software distribution platform 2205 periodically offer, transmit, and/or force updates to the software (e.g., the example machine readable instructions 1932 of FIG. 19) to ensure improvements, patches, updates, etc., are distributed and applied to the software at the end user devices. Although referred to as software above, the distributed "software" could alternatively be firmware.

From the foregoing, it will be appreciated that example systems, apparatus, articles of manufacture, and methods have been disclosed that detect and analyze promotion events to reduce costs associated with data collection, improve efficiency and accuracy at which data is collected to reduce and/or otherwise minimize computing resource waste. Example methods, systems, articles of manufacture, and apparatus disclosed herein analyze market data by mining through billions of data points to find and/or otherwise determine key promotion insights that help retailers and manufacturers optimize their in-market promotion strategies.

Prior to examples disclosed herein, market participants evaluated performance of a promotion event in-house in a shipment and spend focused manner (e.g., which lacks clarity on in-store promotion execution and consumer response), hired consulting firms (e.g., which is expensive and time consuming for even a few promotions), and/or relied on a human workforce to manually detect and analyze promotion events. These previous approached were extremely costly, time-consuming, and error-prone due. Moreover, these previous approached resulted in huge amounts of computational waste and resource consumption due to pluralities of market participants attempting to make the same and/or similar calculations independently. Disclosed examples enable a centralized, scalable, continuous system that provides accurate, and cost effective promotion analysis across multiple products, multiple stores, and multiple retailers in the way shoppers experience them (e.g., multiple items, an offer for a specified duration, etc.).

Examples disclosed herein detect and analyze promotional events using technological tools in a manner that causes those technological tools to operate with less error and avoid human discretion. While examples disclosed herein improve the technical field of market research and the operation of technical tools therein, at least some benefits of examples disclosed herein allow market analysts to make evidence-based promotion strategies, develop marketing strategies, prioritize and scale the most efficient event types, and focus on meaningful modifications to old and/or new events.

Example methods, systems, articles of manufacture, and apparatus disclosed herein allow new conclusions to be drawn from data that otherwise would not be readily apparent with traditional techniques. Upon detection of events, promotional trends and/or key performance indicators are exposed to improve promotion decisions in the future. Example enrichment facts for the promotion event provide unique offer details, execution details, and competitive contextual details (including in-store and in market) about events to enable true understanding of promotion events that are drivers of success.

Disclosed systems, apparatus, articles of manufacture, and methods improve the efficiency of using a computing device by providing unified promotion detection across markets and retail banners. Disclosed examples implement a centralized resource that provides enriched promotion event facts of promotions executed across market participants, preventing a need for market participants to prevent the need for these facts to be independently determined, thereby improving efficiency and accuracy at which data is collected to reduce and/or otherwise minimize computing resource waste. Moreover, examples disclosed herein group detected promotions of different products that belong to the same promotion events, preventing the unnecessary competition of computing resources needed for market participants to independently attempt to identify and group such information across resources. Disclosed systems, apparatus, articles of manufacture, and methods are accordingly directed to one or more improvement(s) in the operation of a machine such as a computer or other electronic and/or mechanical device.

Example methods, systems, articles of manufacture, and apparatus are disclosed herein to detect and analyze promotional events. Other examples include:

Example 1 includes an apparatus comprising interface circuitry to receive movement data corresponding to sales of products; machine readable instructions; and programmable circuitry to at least one of instantiate or execute the machine readable instructions to generate sales data by aligning the movement data with pre-defined reporting periods, the sales data including sales volumes and sales values for different products relative to a market; generate a data structure having data objects, ones of the data object to include respective sales volumes and sales values aggregated by product and reporting period; remove ones of the data objects not associated with a promotion; and detect product-level promotion events in the data structure; and cluster ones of the product-level promotion events based on promotion execution variables.

Example 2 includes the apparatus of example 1, wherein the programmable circuitry is to identify a first product having first movement data that overlaps with a first pre-defined reporting period and a second pre-defined reporting period, the second pre-defined reporting period immediately adjacent the first pre-defined reporting period, the first movement data having a promotion indicator; determine promotional sales in the first movement data missing from the first pre-defined reporting period relative to the first product; select one of (a) the promotional sales in the first movement data missing from the first pre-defined reporting period or (b) an amount of first incremental sales corresponding to the second predefined reporting period of the immediately adjacent week based on a selection criterion; and move the selected one from the second pre-defined reporting period to the first pre-defined reporting period.

Example 3 includes the apparatus of, wherein the selection criterion is a minimum value, the programmable circuitry is to select the one of (a) the promotional sales in the first movement data missing from the first pre-defined reporting period or (b) the amount of first incremental sales corresponding to the second predefined reporting period of the immediately adjacent week having a lower value.

Example 4 includes the apparatus of, wherein the programmable circuitry is to determine the promotional sales in the first movement data missing from the first pre-defined reporting period based on (a) a percentage of the promotional sales in the first movement data that are correctly flagged and (b) an amount of second incremental sales corresponding to the first predefined reporting period.

Example 6 includes the apparatus of, wherein the programmable circuitry is to determine the promotional sales in the first movement data when the first movement data includes a promotion tag.

Example 6 includes the apparatus of, wherein the programmable circuitry is to determine the promotional sales in the first movement data when the first movement data is associated with a promotion price index (PPI) value that satisfies a PPI threshold.

Example 7 includes the apparatus of any preceding clause, wherein the programmable circuitry is to identify a first data object corresponding to a first promotion week and a second data object corresponding to second promotion week; and identify the second promotion week as a start of a new promotion event when the first promotion week and the second promotion week are not consecutive.

Example 8 includes the apparatus of any preceding clause, wherein the programmable circuitry is to identify a first data object corresponding to a first promotion week and a second data object corresponding to second promotion week; and identify the second promotion week as a start of a new promotion event when (a) the first promotion week and the second promotion week are consecutive, (b) a difference between a first discount corresponding to the first promotion week relative to a second discount corresponding to the second promotion week satisfies a first criterion, and (c) a difference between a first promotion price corresponding to the first promotion week relative to a second promotion price corresponding to the second promotion week satisfies a second criterion.

Example 9 includes the apparatus of any preceding clause, wherein the programmable circuitry is to identify a first data object corresponding to a first promotion week and a second data object corresponding to second promotion week; and identify the second promotion week as a start of a new promotion event when a difference between a first promotion price corresponding to the first promotion week relative to a second promotion price corresponding to the second promotion week satisfies a second criterion.

Example 10 includes the apparatus of any preceding clause, wherein the programmable circuitry is to cluster the ones of the product-level promotion events using a density-based clustering algorithm.

Example 11 includes the apparatus of any preceding clause, wherein the programmable circuitry is to split a first product-level promotion of the product-level promotion events when a direction of the first product-level promotion exceeds threshold promotion duration, a first portion of the first product-level promotion to include a maximum amount of promotion weeks, a second portion of the first product-level promotion to start at a first promotion week after the maximum.

Example 12 includes a non-transitory machine readable storage medium comprising instructions to cause programmable circuitry to at least generate sales data by aligning movement data corresponding to sales of products with pre-defined reporting periods, the sales data including sales volumes and sales values for different products relative to a market; generate a data structure having data objects, ones of the data object to include respective sales volumes and sales values aggregated by product and reporting period; remove ones of the data objects not associated with a promotion; and detect product-level promotion events in the data structure; and group ones of the product-level promotion events based on promotion execution variables.

Example 13 includes the non-transitory machine readable storage medium of example 12, wherein the instructions are to cause programmable circuitry to identify a first product having first movement data that overlaps with a first pre-defined reporting period and a second pre-defined reporting period, the second pre-defined reporting period adjacent the first pre-defined reporting period, the first movement data having a promotion indicator; determine promotional sales in the first movement data missing from the first pre-defined reporting period relative to the first product; select one of (a) the promotional sales in the first movement data missing from the first pre-defined reporting period or (b) an amount of first incremental sales corresponding to the second pre-defined reporting period of the adjacent week based on a selection criterion; and move the selected one from the second pre-defined reporting period to the first pre-defined reporting period.

Example 14 includes the non-transitory machine readable storage medium of example 13, wherein the selection criterion is a minimum value, the instructions are to cause programmable circuitry to select the one of (a) the promotional sales in the first movement data missing from the first pre-defined reporting period or (b) the amount of first incremental sales corresponding to the second predefined reporting period of the adjacent week having a lower value.

Example 15 includes the non-transitory machine readable storage medium of any ones of examples 13-14, wherein the instructions are to cause programmable circuitry to determine the promotional sales in the first movement data missing from the first pre-defined reporting period based on (a) a percentage of the promotional sales in the first movement data that are correctly flagged and (b) an amount of second incremental sales corresponding to the first pre-defined reporting period.

Example 16 includes the non-transitory machine readable storage medium of any ones of examples 13-15, wherein the instructions are to cause programmable circuitry to determine the promotional sales in the first movement data when the first movement data includes a promotion tag.

Example 17 includes the non-transitory machine readable storage medium of any ones of examples 13-16, wherein the instructions are to cause programmable circuitry to determine the promotional sales in the first movement data when the first movement data is associated with a promotion price index (PPI) value that satisfies a PPI threshold.

Example 18 includes the non-transitory machine readable storage medium of any ones of examples 12-17, wherein the instructions are to cause programmable circuitry to identify a first data object corresponding to a first promotion week and a second data object corresponding to second promotion week; and identify the second promotion week as a start of a new promotion event when the first promotion week and the second promotion week are not consecutive.

Example 19 includes the non-transitory machine readable storage medium of any ones of examples 12-18, wherein the instructions are to cause programmable circuitry to identify a first data object corresponding to a first promotion week and a second data object corresponding to second promotion week; and identify the second promotion week as a start of a new promotion event when (a) the first promotion week and the second promotion week are consecutive, (b) a difference between a first discount corresponding to the first promotion week relative to a second discount corresponding to the second promotion week satisfies a first criterion, and (c) a difference between a first promotion price corresponding to the first promotion week relative to a second promotion price corresponding to the second promotion week satisfies a second criterion.

Example 20 includes the non-transitory machine readable storage medium of any ones of examples 12-19, wherein the instructions are to cause programmable circuitry to identify a first data object corresponding to a first promotion week and a second data object corresponding to second promotion week; and identify the second promotion week as a start of a new promotion event when a difference between a first promotion price corresponding to the first promotion week relative to a second promotion price corresponding to the second promotion week satisfies a second criterion.

Example 21 includes the non-transitory machine readable storage medium of any ones of examples 12-20, wherein the instructions are to cause programmable circuitry to group the ones of the product-level promotion events using a density-based clustering algorithm.

Example 22 includes the non-transitory machine readable storage medium of any ones of examples 12-21, wherein the instructions are to cause programmable circuitry to split a first product-level promotion of the product-level promotion events when a direction of the first product-level promotion exceeds threshold promotion duration, a first portion of the first product-level promotion to include a maximum amount of promotion weeks, a second portion of the first product-level promotion to start at a first promotion week after the maximum.

Example 23 includes a method comprising generating, by executing machine-readable instructions with programmable circuitry, sales data by aligning movement data movement data corresponding to product sales with pre-defined reporting periods, the sales data including sales volumes and sales values for different products relative to a market; generating, by executing the machine-readable instructions with the programmable circuitry, a data structure having data objects, ones of the data object to include respective sales volumes and sales values aggregated by product and reporting period; removing, by executing the machine-readable instructions with the programmable circuitry, ones of the data objects not associated with a promotion; and detecting, by executing the machine-readable instructions with the programmable circuitry, product-level promotion events in the data structure; and clustering, by executing the machine-readable instructions with the programmable circuitry, ones of the product-level promotion events based on promotion execution variables.

Example 24 includes the method of example 23, further including identifying a first product having first movement data that overlaps with a first pre-defined reporting period and a second pre-defined reporting period, the second pre-defined reporting period immediately adjacent the first pre-defined reporting period, the first movement data having a promotion indicator; determining promotional sales in the first movement data missing from the first pre-defined reporting period relative to the first product; selecting one of (a) the promotional sales in the first movement data missing from the first pre-defined reporting period or (b) an amount of first incremental sales corresponding to the second pre-defined reporting period of the immediately adjacent week based on a selection criterion; and moving the selected one from the second pre-defined reporting period to the first pre-defined reporting period.

Example 25 includes the method of example 24, wherein the selection criterion is a minimum value, the selecting including selecting the one of (a) the promotional sales in the first movement data missing from the first pre-defined reporting period or (b) the amount of first incremental sales corresponding to the second predefined reporting period of the immediately adjacent week having a lower value.

Example 26 includes the method of any ones of examples 24-25, wherein the determining of the promotional sales in the first movement data missing from the first pre-defined reporting period is based on (a) a percentage of the promotional sales in the first movement data that are correctly flagged and (b) an amount of second incremental sales corresponding to the first predefined reporting period.

Example 27 includes the method of any ones of examples 24-26, wherein the determining of the promotional sales in the first movement data is in response to the first movement data including a promotion tag.

Example 28 includes the method of any ones of examples 24-27, wherein the determining of the promotional sales in the first movement data is in response to the first movement data being associated with a promotion price index (PPI) value that satisfies a PPI threshold.

Example 29 includes the method of any ones of examples 24-28, further including identifying a first data object corresponding to a first promotion week and a second data object corresponding to second promotion week; and identifying the second promotion week as a start of a new promotion event when the first promotion week and the second promotion week are not consecutive.

Example 30 includes the method of any ones of examples 24-29, further including identifying a first data object corresponding to a first promotion week and a second data object corresponding to second promotion week; and identifying the second promotion week as a start of a new promotion event when (a) the first promotion week and the second promotion week are consecutive, (b) a difference between a first discount corresponding to the first promotion week relative to a second discount corresponding to the second promotion week satisfies a first criterion, and (c) a difference between a first promotion price corresponding to the first promotion week relative to a second promotion price corresponding to the second promotion week satisfies a second criterion.

Example 31 includes the method of any ones of examples 24-30, further including identifying a first data object corresponding to a first promotion week and a second data object corresponding to second promotion week; and identifying the second promotion week as a start of a new promotion event when a difference between a first promotion price corresponding to the first promotion week relative to a second promotion price corresponding to the second promotion week satisfies a second criterion.

Example 32 includes the method of any ones of examples 24-31, wherein the clustering of the ones of the product-level promotion events is based on a density-based clustering algorithm.

Example 33 includes the method of any ones of examples 24-32, further including splitting a first product-level promotion of the product-level promotion events when a direction of the first product-level promotion exceeds threshold promotion duration, a first portion of the first product-level promotion to include a maximum amount of promotion weeks, a second portion of the first product-level promotion to start at a first promotion week after the maximum.

Example 34 includes an apparatus comprising interface circuitry to obtain first sales data corresponding to a first product, a first retailer, and a first time period, the sales data associated with a promotion; machine readable instructions; and programmable circuitry to at least one of instantiate or execute the machine readable instructions to determine promotional sales missing from the first sales data, the missing promotional sales corresponding to the promotion; identify a minimum of (a) a first amount of sales, the first amount of sales corresponding to the promotional sales missing from the first sales data, and (a) a second amount of sales, the second amount of sales corresponding to incremental sales of the first product relative to the first retailer and a second time period, the second time period associated with a first temporary price reduction; and generate aligned first sales data by moving the minimum the first amount of sales and the second amount of sales from the second time period to the first time period.

Example 35 includes the apparatus of example 34, wherein the programmable circuitry is to determine a first sales increment corresponding to the first product, the first retailer, and the first time period based on the sales data and baseline sales data for the product, the baseline sales data indicative of product sales that would occur without the promotion; determine a weight for the first time period, the weight to represent promotional sales correctly identified in the sales data for the first period; and determine the promotional sales missing from the sales data based on the first sales increment and the weight for the first time period.

Example 36 includes the apparatus of any ones of examples 34-35, wherein the programmable circuitry is to store the aligned first sales data in a database.

Example 37 includes the apparatus of any ones of examples 34-36, wherein the programmable circuitry is to associate the aligned first sales data with the promotion.

Example 38 includes the apparatus of any ones of examples 34-37, wherein the first sales data corresponds to units of the first product sold relative to the first retailer in the first time period.

Example 39 includes the apparatus of any ones of examples 34-38, wherein the first sales data corresponds to value of sales of the first product relative to first store and the first time period.

Example 40 includes the apparatus of any ones of examples 34-39, wherein the programmable circuitry is to determine a price of the first product corresponding to the promotion based on the aligned first sales data; compare the price of the first product to a baseline price for the first product; and when the price of the product fails to satisfy a price criterion, adjust a value of sales of the first product relative to first store and the first time period.

Example 41 includes the apparatus of any ones of examples 34-40, wherein the first retailer includes a plurality of stores, and the first sales data corresponds to market-level sales data.

Example 42 includes the apparatus of any ones of examples 34-41, wherein the first retailer corresponds to a particular store, and the first sales data corresponds to store-level sales data.

Example 43 includes the apparatus of any ones of examples 34-42, wherein the promotion is at least one of (a) a feature, (b) a display, or (c) a promotional temporary price reduction.

Example 44 includes the apparatus of any ones of examples 34-43, wherein the promotion is a second temporary price reduction (TPR), the programmable circuitry is to determine if the second TPR is a promotional TPR; when the second TPR is not a promotional TPR, flag the second TPR as non-causal; and determine zero promotional sales are missing from the first sales data.

Example 45 includes a non-transitory machine readable storage medium comprising instructions to cause programmable circuitry to at least interface circuitry to obtain first sales data corresponding to a first product, a first retailer, and a first time period, the sales data associated with a promotion; machine readable instructions; and programmable circuitry to at least one of instantiate or execute the machine readable instructions to determine promotional sales missing from the first sales data, the missing promotional sales corresponding to the promotion; identify a minimum of (a) a first amount of sales, the first amount of sales corresponding to the promotional sales missing from the first sales data, and (a) a second amount of sales, the second amount of sales corresponding to incremental sales of the first product relative to the first retailer and a second time period, the second time period associated with a first temporary price reduction; and generate aligned first sales data by moving the minimum the first amount of sales and the second amount of sales from the second time period to the first time period.

Example 46 includes non-transitory machine readable storage medium of example 45, wherein the instructions are to cause the programmable circuitry to determine a first sales increment corresponding to the first product, the first retailer, and the first time period based on the sales data and baseline sales data for the product, the baseline sales data indicative of product sales that would occur without the promotion; determine a weight for the first time period, the weight to represent promotional sales correctly identified in the sales data for the first period; and determine the promotional sales missing from the sales data based on the first sales increment and the weight for the first time period.

Example 47 includes non-transitory machine readable storage medium of any ones of examples 45-46, wherein the instructions are to cause the programmable circuitry to store the aligned first sales data in a database.

Example 48 includes non-transitory machine readable storage medium of any ones of examples 45-47, wherein the instructions are to cause the programmable circuitry to associate the aligned first sales data with the promotion.

Example 49 includes non-transitory machine readable storage medium of any ones of examples 45-48, wherein the first sales data corresponds to units of the first product sold relative to the first retailer in the first time period.

Example 50 includes non-transitory machine readable storage medium of any ones of examples 45-49, wherein the first sales data corresponds to value of sales of the first product relative to first store and the first time period.

Example 51 includes non-transitory machine readable storage medium of any ones of examples 45-50, wherein the instructions are to cause the programmable circuitry to determine a price of the first product corresponding to the promotion based on the aligned first sales data; compare the price of the first product to a baseline price for the first product; and when the price of the product fails to satisfy a price criterion, adjust a value of sales of the first product relative to first store and the first time period.

Example 52 includes non-transitory machine readable storage medium of any ones of examples 45-51, wherein the first retailer includes a plurality of stores, and the first sales data corresponds to market-level sales data.

Example 53 includes non-transitory machine readable storage medium of any ones of examples 45-52, wherein the first retailer corresponds to a particular store, and the first sales data corresponds to store-level sales data.

Example 54 includes non-transitory machine readable storage medium of any ones of examples 45-53, wherein the promotion is at least one of (a) a feature, (b) a display, or (c) a promotional temporary price reduction.

Example 55 includes non-transitory machine readable storage medium of any ones of examples 45-54, wherein the promotion is a second temporary price reduction (TPR), the instructions are to cause the programmable circuitry to determine if the second TPR is a promotional TPR; when the second TPR is not a promotional TPR, flag the second TPR as non-causal; and determine zero promotional sales are missing from the first sales data.

Example 56 includes a method comprising: determining, by executing a machine-readable instruction with programmable circuitry, promotional sales missing from the first sales data, the missing promotional sales corresponding to the promotion; identifying, by executing a machine-readable instruction with the programmable circuitry, a minimum of (a) a first amount of sales, the first amount of sales corresponding to the promotional sales missing from the first sales data, and (a) a second amount of sales, the second amount of sales corresponding to incremental sales of the first product relative to the first retailer and a second time period, the second time period associated with a first temporary price reduction; and generating, by executing a machine-readable instruction with the programmable circuitry, aligned first sales data by moving the minimum of the first amount of sales and the second amount of sales from the second time period to the first time period.

Example 57 includes the method of example 56, further including determining a first sales increment corresponding to the first product, the first retailer, and the first time period based on the sales data and baseline sales data for the product, the baseline sales data indicative of product sales that would occur without the promotion; determining a weight for the first time period, the weight to represent promotional sales correctly identified in the sales data for the first period; and determining the promotional sales missing from the sales data based on the first sales increment and the weight for the first time period.

Example 58 includes the method of any one of examples 56-57, wherein the method further includes storing the aligned first sales data in a database.

Example 59 includes the method of any one of examples 56-58, wherein the method further includes associating the aligned first sales data with the promotion.

Example 60 includes the method of any one of examples 56-59, wherein the first sales data corresponds to units of the first product sold relative to the first retailer in the first time period.

Example 61 includes the method of any one of examples 56-60, wherein the first sales data corresponds to value of sales of the first product relative to first store and the first time period.

Example 62 includes the method of any one of examples 56-61, wherein the method further includes determining a price of the first product corresponding to the promotion based on the aligned first sales data; comparing the price of the first product to a baseline price for the first product; and when the price of the product fails to satisfy a price criterion, adjusting a value of sales of the first product relative to first store and the first time period.

Example 63 includes the method of any one of examples 56-62, wherein the first retailer includes a plurality of stores, and the first sales data corresponds to market-level sales data.

Example 64 includes the method of any one of examples 56-63, wherein the first retailer corresponds to a particular store, and the first sales data corresponds to store-level sales data.

Example 65 includes the method of any one of examples 56-64, wherein the promotion is at least one of (a) a feature, (b) a display, or (c) a promotional temporary price reduction.

Example 66 includes the method of any one of examples 56-65, wherein the promotion is a second temporary price reduction (TPR), the method includes determining if the second TPR is a promotional TPR; when the second TPR is not a promotional TPR, flagging the second TPR as non-causal; and determining zero promotional sales are missing from the first sales data.

Example 67 includes an apparatus comprising interface circuitry to obtain aligned sales data corresponding to products, the products corresponding to a market and a category; computer readable instructions; and programmable circuitry to instantiate event detection circuitry to identify product-level promotions based on the aligned sales data and corresponding baseline data for the products; and group ones of the product-level promotions to identify promotion events; and expansion circuitry to determine uplift factors for different promotion characteristics based on the market and the category; and apply the uplift factors to the product-level promotions and the promotion events to identify incremental sales.

Example 68 includes the apparatus of example 67, wherein the programmable circuitry includes one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to machine-readable data, and one or more registers to store a result of the one or more first operations, the machine-readable data in the apparatus; a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations; or Application Specific Integrated Circuitry (ASIC) including logic gate circuitry to perform one or more third operations.

Example 69 includes the apparatus of any ones of examples 67-68, wherein the programmable circuitry is to instantiate the event detection circuitry to define parameters of a promotion detection request; aggregate aligned sales data and the baseline data to a market level to generate market level data; split the market level data into respective groups based on a promotion type; generate detection data by aggregating the market level data in each group by combinations of (a) product identifier, and (b) period identifier; and calculating facts based on the aggregated market level data; and identify the product-level promotions in the detection data based on the parameters of the promotion detection request and the detection data.

Example 70 includes the apparatus of any ones of examples 67-69, wherein the calculated facts include discounts and promotional prices for respective ones of the combinations.

Example 71 includes the apparatus of any ones of examples 67-70, wherein the programmable circuitry is to instantiate the expansion circuitry to extract market data corresponding to the market and the category; determine a respective difference for each promotion characteristic based on a first period and a corresponding second period, the corresponding second being an adjacent year; standardize the promotion characteristic differences; and determine a respective principal component for each promotion characteristic difference.

Example 72 includes the apparatus of example 71, wherein the programmable circuitry is to instantiate the expansion circuitry to execute a plurality of statistical models based on the principal components, ones of the plurality of statistical models different from other ones of the plurality of statistical models another; select a statistic model of the plurality of statistical models based on a selection criterion; determine multipliers for each promotion characteristic by applying a rotation matrix to coefficients associated with the principal components output by the selected statistical model; and determine the uplift factors for the promotion characteristics based on the multipliers.

Example 73 includes the apparatus of any ones of examples 71-72, wherein the multipliers satisfy a business rule.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A system for centralized processing of promotion event data from a plurality of entities, the system comprising:
  a first networked database to collect movement data from point-of-sale (POS) devices, the movement data corresponding to sales of products during a promotion, the POS devices including first POS devices associated with a first entity and second POS devices associated with a competitor entity, the movement data including universal product code (UPC) sales volume data and UPC sales value data for the products, the products including a first product and the movement data including first movement data for the first product, the first movement data misaligned with a first reporting period associated with the promotion;
  machine-readable instructions; and
  at least one programmable circuit to at least one of instantiate or execute the machine-readable instructions to:
    correct the misaligned first movement data for the first product by:
      determining promotional sales in the first movement data missing from the first reporting period relative to the first product;
      selecting a minimum value of (a) the promotional sales in the first movement data missing from the first reporting period or (b) an amount of first incremental sales corresponding to a second reporting period, the second reporting period immediately adjacent the first reporting period, the first movement data overlapping with the first reporting period and the second reporting period; and
      moving the selected minimum value from the second reporting period to the first reporting period to generate adjusted sales data for the first product, the adjusted sales data including (a) UPC-market sales volume data corresponding to aggregated UPC sales volume data for the first entity and the competitor entity for the first product and (b) UPC-market sales value data corresponding to aggregated UPC sales value data for the first entity and the competitor entity for the first product;
    generate sales data for the other ones of the products for corresponding reporting periods by aggregating the movement data for the first entity and the competitor entity for the other ones of the products, the sales data including UPC-market sales volume data and UPC-market sales value data for the other ones of the products for the first entity and the competitor entity;
    generate, based on the adjusted sales data for the first product and the sales data for the other ones of the products, a data structure having data objects, ones of the data objects including respective UPC-market sales volume data and UPC-market sales value data aggregated by product and reporting period and respective discount indicators by product and reporting period;
    remove ones of the data objects not associated with the promotion from the data structure;
    detect product-level promotion events in the data structure based on one or more of the discount indicators or inventory indicators, the inventory indicators based on the UPC-market sales value data;
    cluster ones of the product-level promotion events based on promotion execution variables to identify a group of first ones of the products promoted during the promotion;
    store the clustered ones of the product-level promotion events in a second networked database;
    generate a model indicative of incremental sales of the products in the group resulting from the promotion; and
    execute the model to output, via an application platform in communication with the second networked database, a graphical user interface identifying the clustered ones of the product-level promotion events and the incremental sales of the products in the group resulting from the promotion.

2. The system of claim 1, wherein one or more of the at least one programmable circuit is to determine the promotional sales in the first movement data missing from the first reporting period based on (a) a percentage of the promotional sales in the first movement data that are correctly flagged and (b) an amount of second incremental sales corresponding to the first reporting period.

3. The system of claim 1, wherein one or more of the at least one programmable circuit is to determine the promotional sales in the first movement data responsive to the first movement data including a promotion tag.

4. The system of claim 1, wherein one or more of the at least one programmable circuit is to determine the promotional sales in the first movement data responsive to the first movement data being associated with a promotion price index (PPI) value that satisfies a PPI threshold.

5. The system of claim 1, wherein one or more of the at least one programmable circuit is to:
  identify a first data object corresponding to a first promotion week and a second data object corresponding to a second promotion week; and
  identify the second promotion week as a start of a new promotion event when the first promotion week and the second promotion week are not consecutive.

6. The system of claim 1, wherein one or more of the at least one programmable circuit is to:
  identify a first data object corresponding to a first promotion week and a second data object corresponding to a second promotion week; and identify the second promotion week as a start of a new promotion event when (a) the first promotion week and the second promotion week are consecutive, (b) a difference between a first discount corresponding to the first promotion week relative to a second discount corresponding to the second promotion week satisfies a first criterion, and (c) a difference between a first promotion price corresponding to the first promotion week relative to a second promotion price corresponding to the second promotion week satisfies a second criterion.

7. The system of claim 1, wherein one or more of the at least one programmable circuit is to:

identify a first data object corresponding to a first promotion week and a second data object corresponding to a second promotion week; and identify the second promotion week as a start of a new promotion event when a difference between a first promotion price corresponding to the first promotion week relative to a second promotion price corresponding to the second promotion week satisfies a second criterion.

8. The system of claim 1, wherein one or more of the at least one programmable circuit is to cluster the ones of the product-level promotion events using density-based clustering.

9. The system of claim 1, wherein one or more of the at least one programmable circuit is to split a first product-level promotion of the product-level promotion events into a first portion and a second portion when a duration of the first product-level promotion exceeds a threshold promotion duration, the first portion of the first product-level promotion to include a maximum amount of promotion weeks, the second portion of the first product-level promotion to start at a first promotion week after the maximum.

10. A non-transitory machine-readable storage medium comprising machine-readable instructions to cause at least one programmable circuit to at least:

correct misaligned first movement data for a first product by:

determining promotional sales in the first movement data missing from a first reporting period relative to the first product, the first movement data included in movement data collected from point-of-sale (POS) devices, the POS devices including first POS devices associated with a first entity and second POS devices associated with a competitor entity, the movement data corresponding to sales of products during a promotion, the movement data including universal product code (UPC) sales volume data and UPC sales value data for the products, the products including the first product, the first reporting period associated with the promotion, the first movement data misaligned with the first reporting period;

selecting a minimum value of (a) the promotional sales in the first movement data missing from the first reporting period or (b) an amount of first incremental sales corresponding to a second reporting period, the second reporting period immediately adjacent the first reporting period, the first movement data overlapping with the first reporting period and the second reporting period; and moving the selected minimum value from the second reporting period to the first reporting period to generate adjusted sales data for the first product, the adjusted sales data including (a) UPC-market sales volume data corresponding to aggregated UPC sales volume data for the first entity and the competitor entity for the first product and (b) UPC-market sales value data corresponding to aggregated UPC sales value data for the first entity and the competitor entity for the first product;

generate sales data for the other ones of the products for corresponding reporting periods by aggregating the movement data for the first entity and the competitor entity for the other ones of the products, the sales data including UPC-market sales volume data and UPC-market sales value data for the other ones of the products for the first entity and the competitor entity;

generate, based on the adjusted sales data for the first product and the sales data for the other ones of the products, a data structure having data objects, ones of the data objects including respective UPC-market sales volume data and UPC-market sales value data aggregated by product and reporting period and respective discount indicators by product and reporting period;

remove ones of the data objects not associated with the promotion;

detect product-level promotion events in the data structure based on one or more of the discount indicators or inventory indicators, the inventory indicators based on the UPC-market sales value data;

cluster ones of the product-level promotion events based on promotion execution variables to identify a group of first ones of the products promoted during the promotion;

store the clustered ones of the product-level promotion events in a networked database;

generate a model indicative of incremental sales of the products in the group resulting from the promotion; and execute the model to output, via an application platform in communication with the networked database, a graphical user interface identifying the clustered ones of the product-level promotion events and the incremental sales of the products in the group resulting from the promotion.

11. The non-transitory machine-readable storage medium of claim 10, wherein the machine-readable instructions are to cause one or more of the at least one programmable circuit to determine the promotional sales in the first movement data responsive to the first movement data being associated with a promotion price index (PPI) value that satisfies a PPI threshold.

12. The non-transitory machine-readable storage medium of claim 10, wherein the machine-readable instructions are to cause one or more of the at least one programmable circuit to:

identify a first data object corresponding to a first promotion week and a second data object corresponding to a second promotion week; and identify the second promotion week as a start of a new promotion event when the first promotion week and the second promotion week are not consecutive.

13. The non-transitory machine-readable storage medium of claim 10, wherein the machine-readable instructions are to cause one or more of the at least one programmable circuit to:

identify a first data object corresponding to a first promotion week and a second data object corresponding to a second promotion week; and identify the second promotion week as a start of a new promotion event when (a) the first promotion week and the second promotion week are consecutive, (b) a difference between a first discount corresponding to the first promotion week relative to a second discount corresponding to the second promotion week satisfies a first criterion, and (c) a difference between a first promotion price corresponding to the first promotion week relative to a second promotion price corresponding to the second promotion week satisfies a second criterion.

14. The non-transitory machine-readable storage medium of claim 10, wherein the machine-readable instructions are to cause one or more of the at least one programmable circuit to:

identify a first data object corresponding to a first promotion week and a second data object corresponding to a second promotion week; and identify the second promotion week as a start of a new promotion event when a difference between a first promotion price corresponding to the first promotion week relative to a second promotion price corresponding to the second promotion week satisfies a second criterion.

15. The non-transitory machine-readable storage medium of claim 10, wherein the machine-readable instructions are to cause one or more of the at least one programmable circuit to cluster the ones of the product-level promotion events using density-based clustering.

16. The system of claim 1, wherein one or more of the at least one programmable circuit is to apply a constraint to the model based on promotion mechanic data, the promotion mechanic data indicative of the promotion being associated with (a) an advertisement, (b) an in-store display, (b) the advertisement and the in-store display, or (c) a temporary price reduction.

17. The non-transitory machine-readable storage medium of claim 10, wherein the machine-readable instructions are to cause one or more of the at least one programmable circuit to apply a constraint to the model based on promotion mechanic data, the promotion mechanic data indicative of the promotion being associated with (a) an advertisement, (b) an in-store display, (b) the advertisement and the in-store display, or (c) a temporary price reduction.

\* \* \* \* \*